(12) United States Patent
Shiozawa et al.

(10) Patent No.: US 8,483,926 B2
(45) Date of Patent: Jul. 9, 2013

(54) DEVICE AND METHOD FOR ESTIMATING FRICTIONAL CONDITION OF GROUND CONTACT SURFACE OF WHEEL

(75) Inventors: Yuuki Shiozawa, Isehara (JP); Masaaki Nawano, Yokosuka (JP); Hiroshi Mouri, Yokohama (JP); Masatsugu Yokote, Yokohama (JP); Masahiro Kubota, Yokohama (JP); Kenichi Seki, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 540 days.

(21) Appl. No.: 12/595,021

(22) PCT Filed: Apr. 16, 2008

(86) PCT No.: PCT/JP2008/057452
§ 371 (c)(1),
(2), (4) Date: Oct. 7, 2009

(87) PCT Pub. No.: WO2008/133150
PCT Pub. Date: Nov. 6, 2008

(65) Prior Publication Data
US 2010/0114449 A1 May 6, 2010

(30) Foreign Application Priority Data

| Apr. 17, 2007 | (JP) | 2007-108070 |
| Apr. 17, 2007 | (JP) | 2007-108071 |
| Apr. 17, 2007 | (JP) | 2007-108072 |
| Apr. 17, 2007 | (JP) | 2007-108073 |
| Jan. 16, 2008 | (JP) | 2008-007162 |
| Jan. 16, 2008 | (JP) | 2008-007163 |

(51) Int. Cl.
B60L 7/18 (2006.01)
B60T 8/172 (2006.01)
G06F 19/00 (2006.01)

(52) U.S. Cl.
USPC .............................. 701/90; 701/73; 303/150

(58) Field of Classification Search
USPC ................... 701/90, 73, 80, 74, 89; 303/150
See application file for complete search history.

(56) References Cited

U.S. PATENT DOCUMENTS

| 6,453,228 B1* | 9/2002 | Shimada | 701/89 |
| 6,473,682 B1* | 10/2002 | Nakamura | 701/74 |
| 6,941,213 B2* | 9/2005 | Yasui et al. | 701/80 |
| 2002/0111752 A1 | 8/2002 | Nakamura | |
| 2004/0019417 A1 | 1/2004 | Yasui et al. | |
| 2004/0133324 A1 | 7/2004 | Yasui et al. | |
| 2006/0074541 A1* | 4/2006 | Ono et al. | 701/80 |

FOREIGN PATENT DOCUMENTS

| JP | 10-044954 A | 2/1998 |
| JP | 2002-154418 A | 5/2002 |
| JP | 2003-160041 A | 6/2003 |
| JP | 2003-312465 A | 11/2003 |

(Continued)

Primary Examiner — Tan Q Nguyen
(74) Attorney, Agent, or Firm — Foley & Lardner LLP

(57) ABSTRACT

Apparatus for estimating a ground contact surface gripping characteristic of a vehicle wheel of a vehicle comprises an input section and an output section. The input section sets an input representing a ratio of a wheel force acting on the vehicle wheel in the ground contact surface, and a wheel slipping degree of the vehicle wheel. The output section determines, from the input, an output representing a grip characteristic parameter indicative of the gripping characteristic of the vehicle wheel.

65 Claims, 64 Drawing Sheets

FOREIGN PATENT DOCUMENTS

| JP | 2004-130965 A | 4/2004 |
| JP | 2006-034012 A | 2/2006 |
| JP | 2006-273108 A | 10/2006 |
| JP | 2007-112367 A | 5/2007 |

* cited by examiner

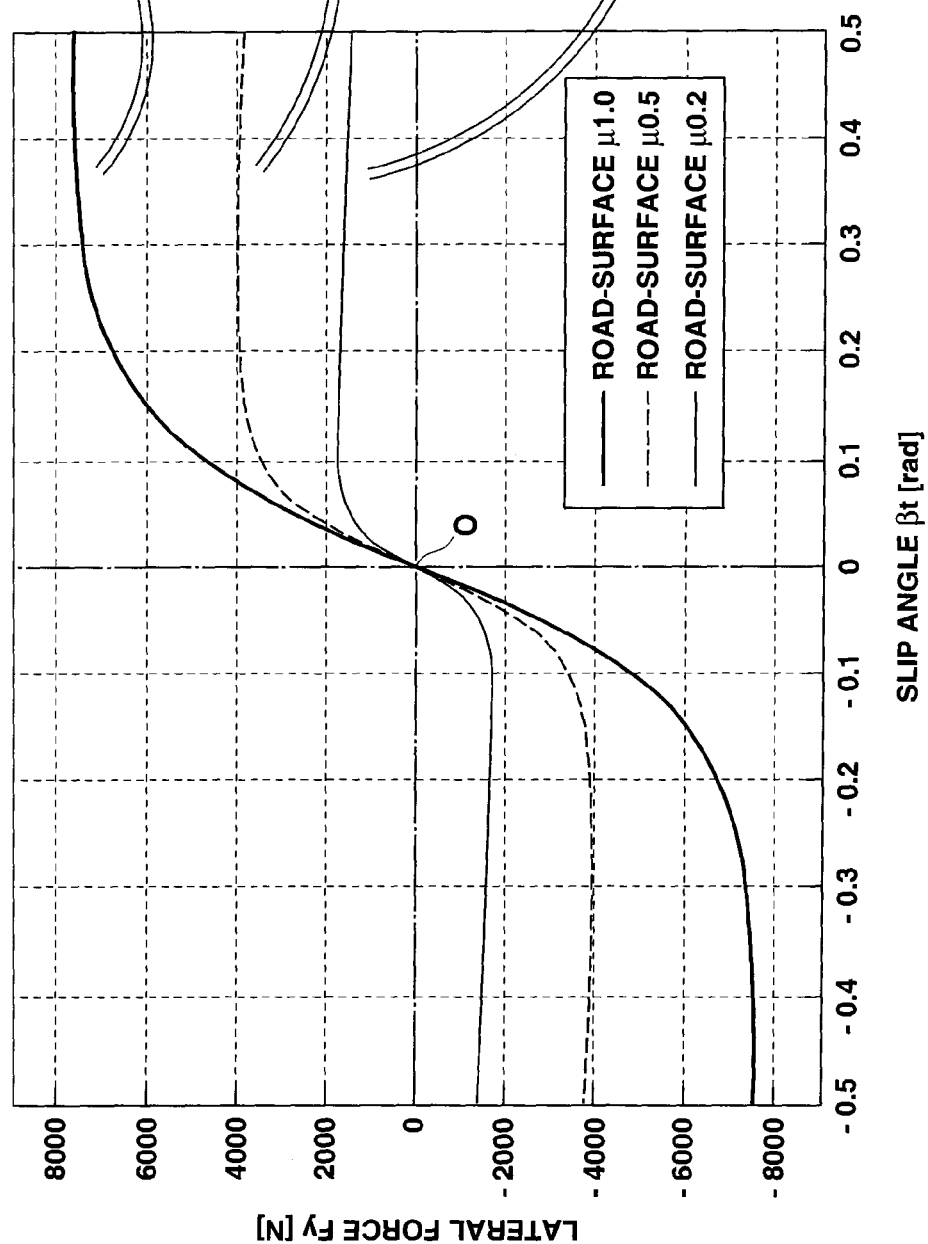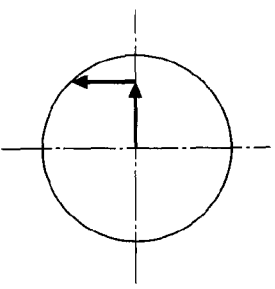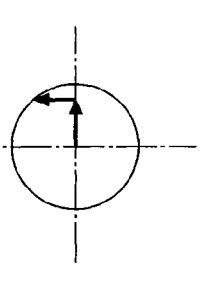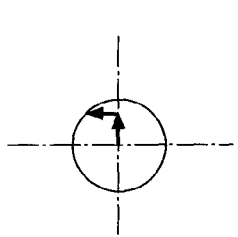

FIG.6A
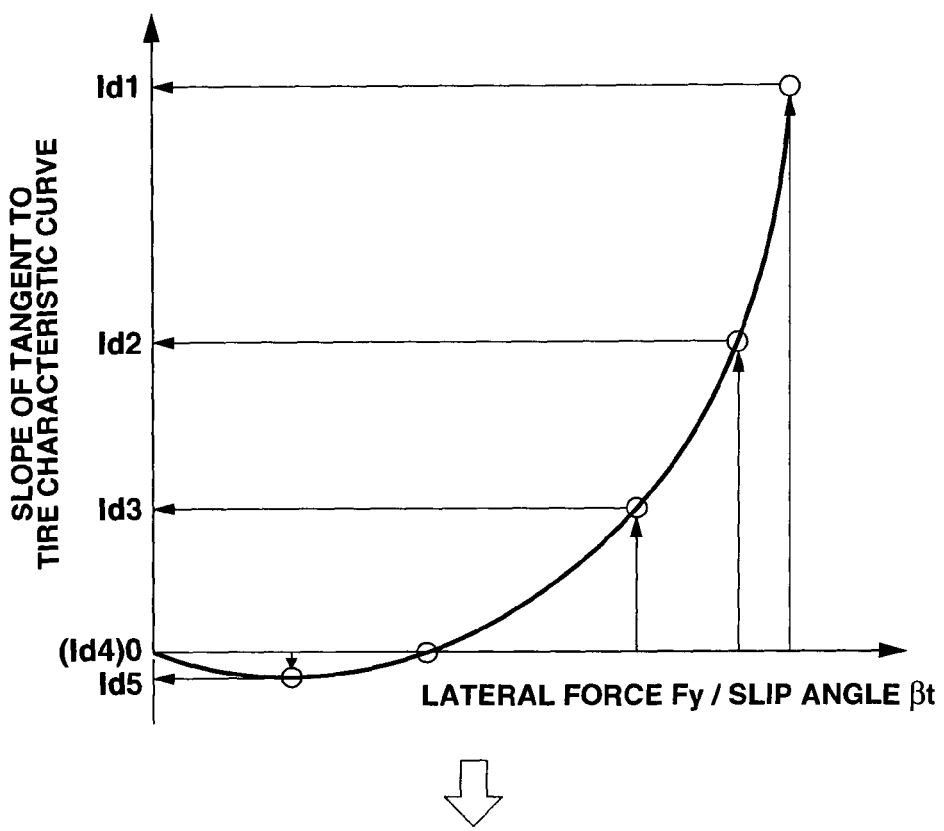
FIG.6B
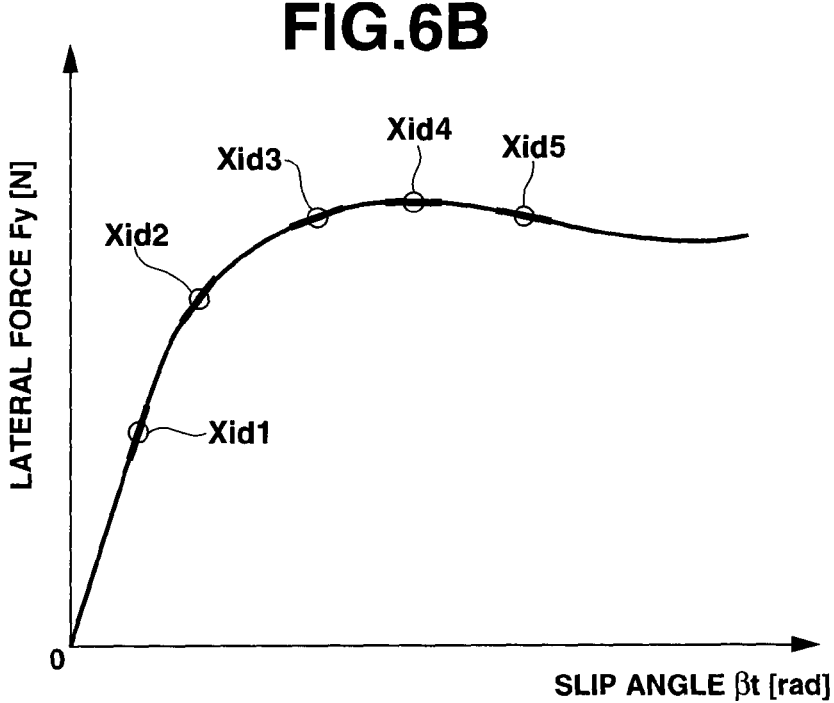

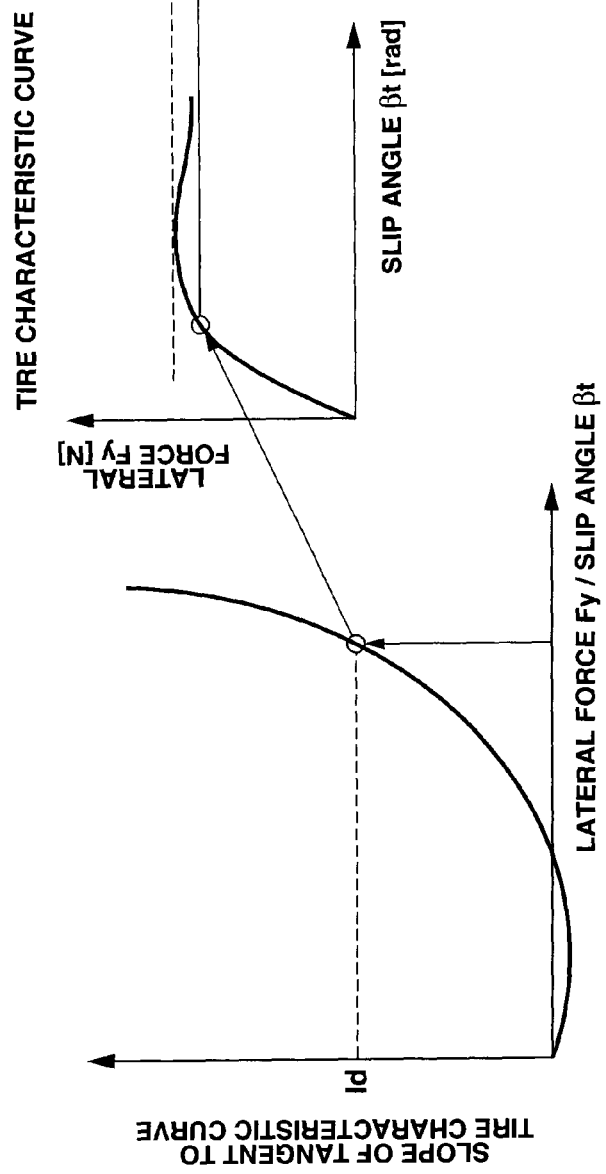
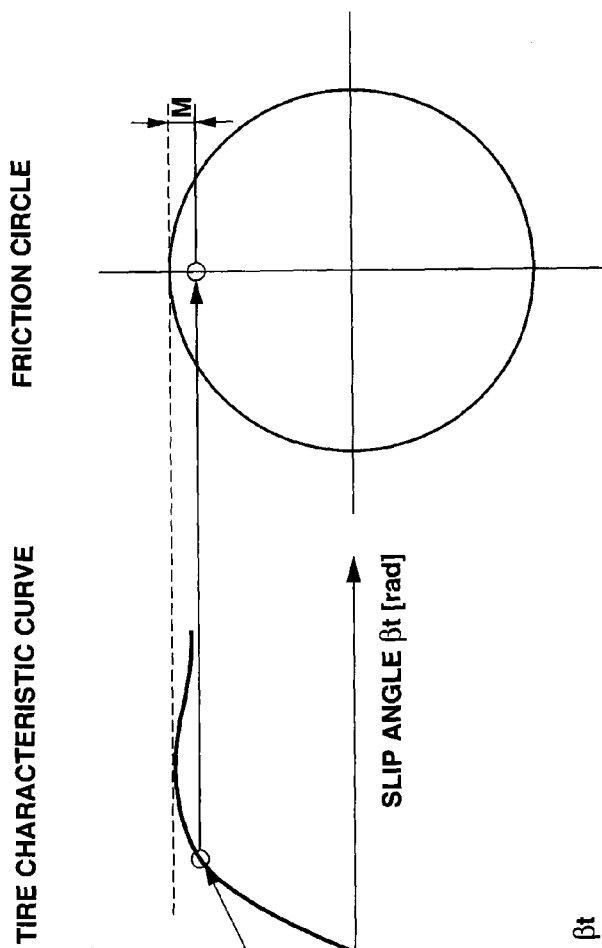
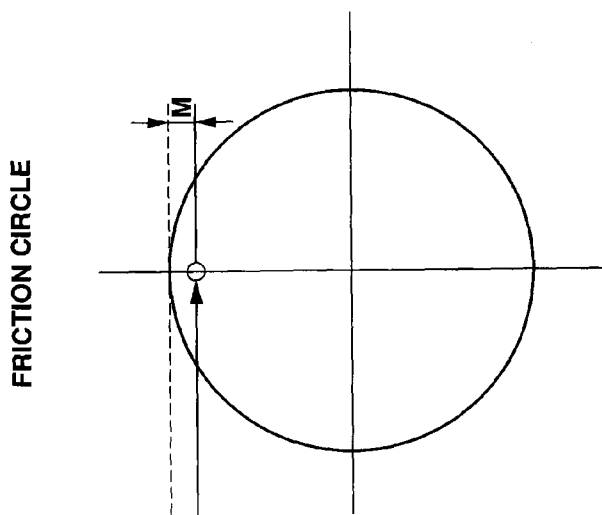

Gx : LONGITUDINAL-G
Gy : LATERAL-G
Ay : ACCELERATION IN TURNING-RADIUS DIRECTION

Gx : LONGITUDINAL-G
Gy : LATERAL-G
Ay : ACCELERATION IN TURNING-RADIUS DIRECTION
$\dot{V}x$ : CHANGE IN LONGITUDINAL VELOCITY
$\dot{V}y$ : CHANGE IN LATERAL VELOCITY

FRICTION CIRCLE

TIRE CHARACTERISTIC CURVE

FIG.44A    FIG.44B
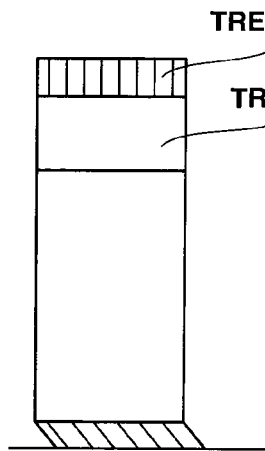
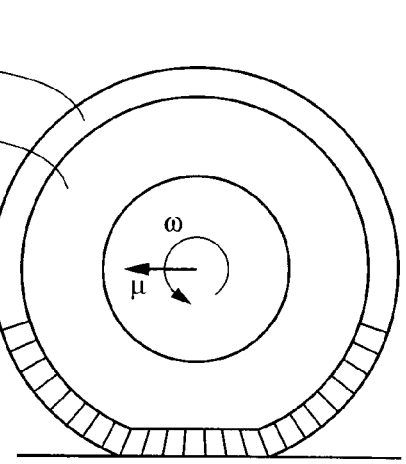
FIG.45
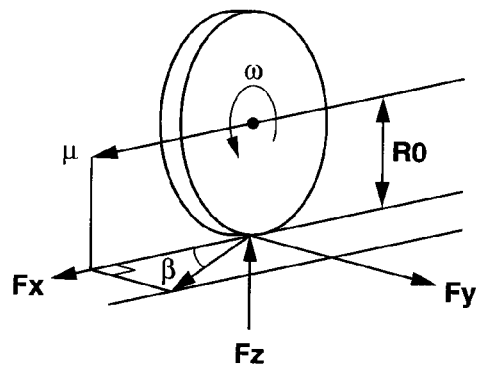
FIG.46
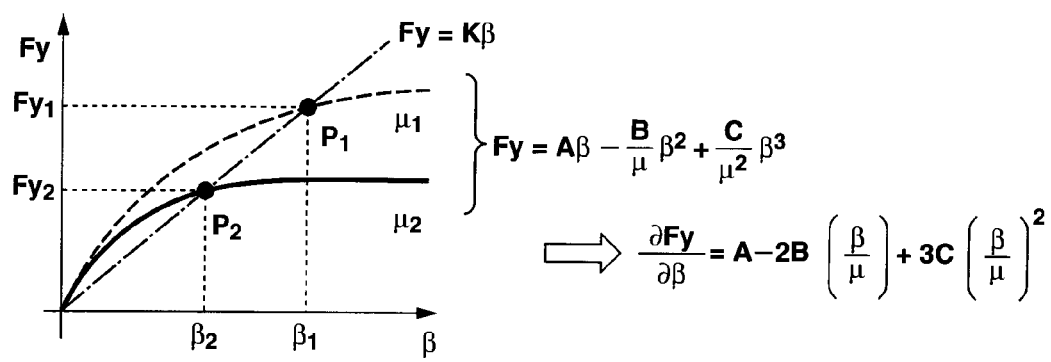

NONDIMENSIONALIZED SO THAT SLIP RATE AT PEAK OF LONGITUDINAL FORCE BECOMES EQUAL TO 1

DEVICE AND METHOD FOR ESTIMATING FRICTIONAL CONDITION OF GROUND CONTACT SURFACE OF WHEEL

TECHNICAL FIELD

The present invention relates to device or apparatus and method for estimating a friction state in a contact surface between a vehicle wheel and a ground, or a road surface gripping state of a vehicle wheel, or a margin with respect to a friction limit. Furthermore, the present invention relates to apparatus and method for estimating vehicle state quantity, and apparatus and method for controlling vehicle behavior.

BACKGROUND ART

As earlier technology of this kind, there is a system of estimating a tire friction state from deviations between lateral acceleration and yaw rate calculated from a vehicle model and actual lateral acceleration and actual yaw rate (cf. patent document 1). In accordance with the estimated tire friction state, this system estimates a vehicle state or controls a vehicle behavior.

Another system is arranged to plot a point corresponding to actual wheel slip rate and a road surface friction coefficient in a two-dimensional map having a horizontal axis representing the wheel slip rate and a vertical axis representing the road surface friction coefficient, and to estimate the tire friction state from the slope of a straight line passing through the plotted point and the origin (cf. patent document 2). In accordance with the estimated tire friction state, this system controls the wheel longitudinal (drive/brake) force.

Patent Document 1: Published Japanese Patent Application Pub. No. H10-44954
Patent Document 2: Published Japanese Patent Application Pub. No 2006-34012

SUMMARY OF THE INVENTION

However, the system according to the earlier technique of patent document 1 may be unable to detect the tire friction state accurately from the lateral acceleration or yaw rate because of limitation existing in the response speed and sensitivity in sensing the lateral acceleration and yaw rate. Furthermore, the system according to the earlier technique of patent document 2 is unable to grasp the tire frictional limit, and hence unable to detect the margin to the tire frictional limit. A task of the present invention is to estimate tire frictional state, grip state or margin to frictional limit more properly.

According to the present invention, apparatus for estimating a gripping characteristic of a vehicle wheel of a vehicle on a ground surface, comprises an input section (or input setting section) and an output section (or output setting section). The input section sets an input which is a ratio of a wheel force acting on the vehicle wheel in a contact surface of the vehicle wheel on the ground surface, and a wheel slipping degree of the vehicle wheel. The output section determines, from the input, an output representing a grip characteristic parameter indicative of the gripping characteristic of the vehicle wheel. Moreover, a method for estimating a gripping characteristic of a vehicle wheel of a vehicle on a ground surface, comprises an input step (or input setting step) and an output step (output setting step). The input step is a step of setting an input which is a ratio of a wheel force acting on the vehicle wheel in a contact surface of the vehicle wheel on the ground surface, and a wheel slipping degree of the vehicle wheel. The output step is a step of determining, from the input, an output which is a grip characteristic parameter indicative of the gripping characteristic of the vehicle wheel.

BRIEF DESCRIPTION OF THE DRAWINGS

FIG. 2 is a view for illustrating the technology underlying the first embodiment, and more specifically a characteristic view showing tire characteristic curves and friction circles for various values of a road surface μ.

FIG. 6 is a view for illustrating the technology underlying the first embodiment, and more specifically a view used for explaining a process of determining the tangent slope of the tire characteristic curve from lateral force Fy and slip angle βt.

FIG. 7 is a view for illustrating the technology underlying the first embodiment, and more specifically a view for showing relation among the characteristic curve (grip characteristic curve)(lateral force characteristic index map), a tire characteristic curve and friction circle.

FIG. 44 is a view showing a tire model for explaining the underlying technologies of the first and second embodiments theoretically.

FIG. 45 is a view showing the tire lateral force and longitudinal force for explaining the underlying technologies of the first and second embodiments theoretically.

FIG. 46 is an Fy-β diagram at the time of turning operation for explaining the underlying technology of the first embodiment in the lateral direction theoretically.

FIG. 63 is obtained by rotating the plane, shown in FIG. 62, containing the Z axis and extending in the direction of the resultant force, through 90 degrees.

BEST MODES FOR CARRYING OUT THE INVENTION

The following is explanation on embodiments of the present invention using the drawings.

(First Embodiment)

(Technology Underlying First Embodiment)

First, the explanation is directed to technology on which the first embodiment is based.

Figure 1:
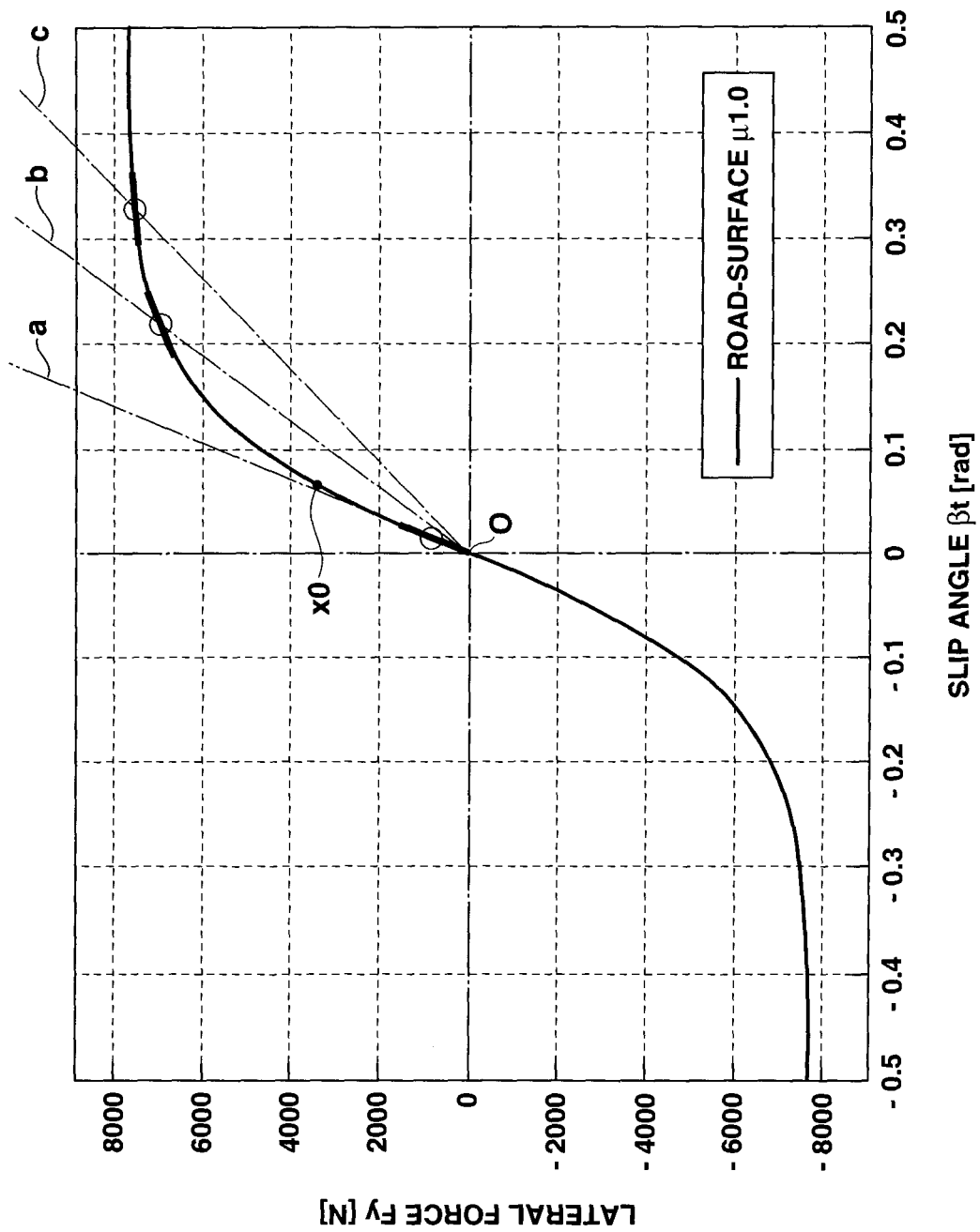
FIG. 1 is a view for illustrating the technology underlying a first embodiment according to the present invention, and more specifically a characteristic view showing a tire characteristic curve.

FIG. 1 shows a tire characteristic curve, which represents a general relationship between a wheel slip angle $\beta t$ and a lateral force Fy of a wheel. For example, by tuning a tire model in accordance with experimental data, it is possible to obtain an equivalent characteristic diagram (tire characteristic curve) for two wheels corresponding to front and rear wheels. Lateral force Fy is a quantity typified by a cornering force and a side force. (In this embodiment, the lateral force corresponds to a wheel force acting on a wheel in a ground contact surface, and the wheel slip angle corresponds to a wheel slip or slipping degree.)

As shown in FIG. 1, in the tire characteristic curve, the relationship between slip angle $\beta t$ and lateral force Fy changes from linear to nonlinear as the absolute value of slip angle $\beta t$ increases. That is, the relationship between slip angle $\beta t$ and lateral force Fy is linear when slip angle $\beta t$ is in a predetermined range from zero. The relationship between slip angle $\beta t$ and lateral force Fy becomes nonlinear when slip angle $\beta t$ (absolute value) increases. Thus, the tire characteristic curve includes a linear segment and a nonlinear segment.

The transition from a linear form to a nonlinear form is clear when attention is paid to the slope (gradient) of a tangent line tangent to the tire characteristic curve. The slope of the tangent line to the tire characteristic curve can be expressed by a ratio of a change in slip angle βt and a change in lateral force Fy, that is a partial differential coefficient of lateral force Fy with respect to slip angle βt. The slope of tangent to the tire characteristic curve (corresponding to a grip characteristic parameter) can be seen as the slope of a tangent line to the tire characteristic at an intersection point (marked by ○ in FIG. 1) between the tire characteristic curve and an arbitrary straight line a, b, c . . . intersecting the tire characteristic curve. It is possible to estimate the frictional state of a tire if a position on such a tire characteristic curve is determined, that is if slip angle βt and lateral force Fy are known. When, for example, the location is at a point x0 which is in the nonlinear region on the tire characteristic curve but which is close to the linear region, as shown in FIG. 1, then it is possible to estimate that the tire friction state is stable. From the judgment that the tire friction state is stable, it is possible to estimate that the tire is still at a level capable of achieving its performance properly, or the vehicle is in a stable state.

FIG. 2 shows tire characteristic curves and friction circles for various road surface μ values. FIG. 2(a) (or 2A) shows tire characteristic curves for various road surface μ values, and FIGS. 2(b)(or 2B), 2(c)(or 2C) and 2(d)(or 2D) show the friction circles for the various road surface μ values. The road surface μ is equal to 0.2, 05 or 1.0 in this example. As shown in FIG. 2(a)(2A), the tire characteristic curves for the different road surface friction coefficient μ values have tendencies similar to one another qualitatively. As shown in FIGS. 2(b) (2B)~2(d)(2D), the friction circle becomes smaller as the road surface μ becomes lower. Namely, the lower the road surface friction coefficient μ, the smaller the lateral force that can be allowed by the tire. Thus, the tire characteristic is a characteristic including, as a parameter, the road surface friction coefficient. In dependence on values of the road surface friction coefficient, there are provided a lower friction tire characteristic curve for a lower friction, a medium friction tire characteristic curve for a medium friction and a higher friction tire characteristic for a higher friction, as shown in FIG. 2.

Figure 3:
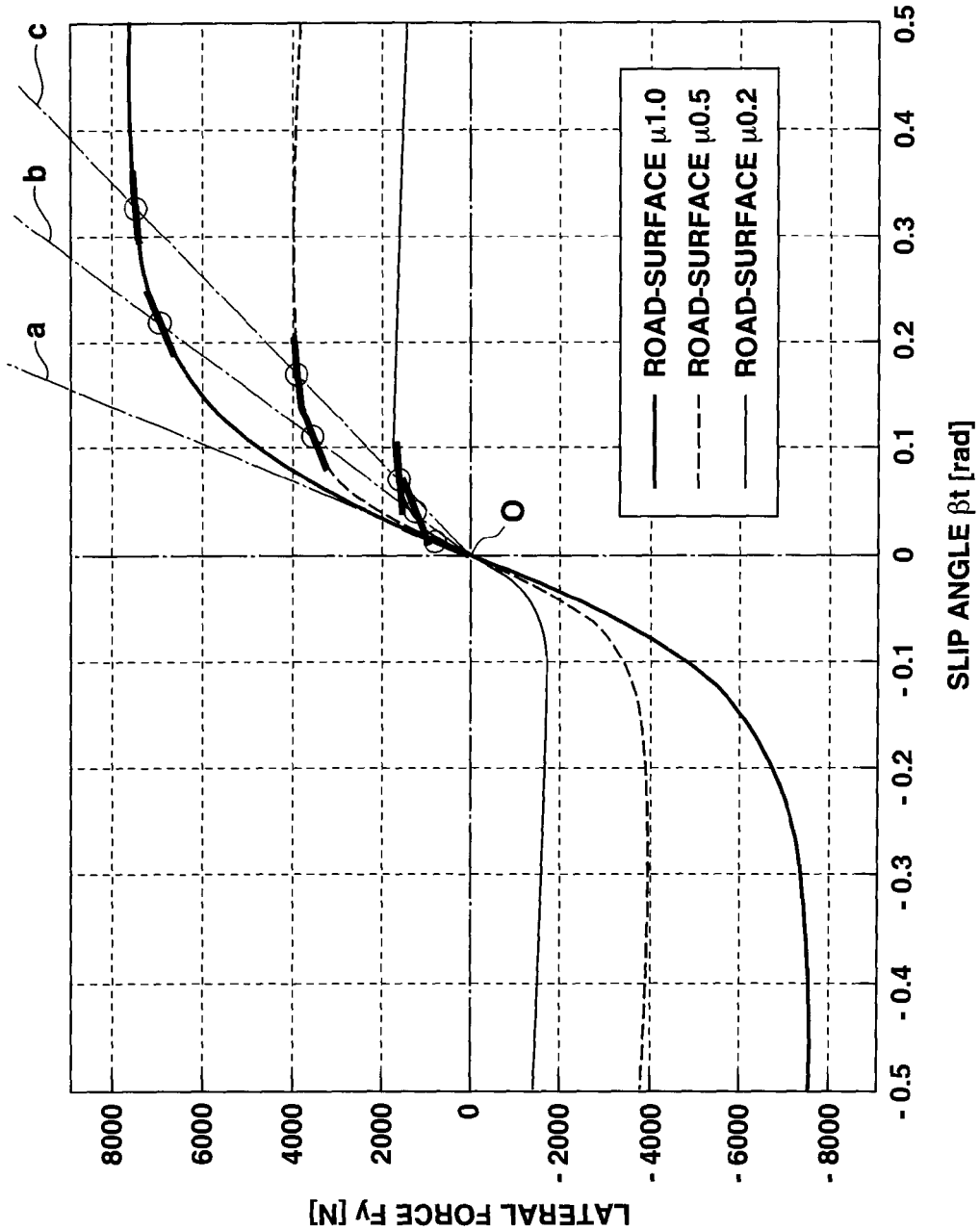
FIG. 3 is a view for illustrating the technology underlying the first embodiment, and more specifically a characteristic view showing tangent slopes of tire characteristic curves at intersection points with a straight line passing through the origin.

FIG. 3 shows relationships between the tire characteristic curves of different road surface μ values and arbitrary straight lines a, b and c passing through the origin. As shown in FIG. 3, in the same manner as in FIG. 1, the slope of tangent to each of the tire characteristic curves of the different road surface μ values is determined at an intersection point of the tire characteristic curve and each straight line a, b or c. In other words, the respective slopes of tangents to the tire characteristic curves of the different road surface μ values are determined at respective intersection points with the straight line a. The respective slopes of tangents to the tire characteristic curves of the different road surface μ values are determined at respective intersection points with the straight line b. The respective slopes of tangents to the tire characteristic curves of the different road surface μ values are determined at respective intersection points with the straight line c. By determining the slopes of tangents to the tire characteristic curves in this way, it is possible to obtain the result that the slopes of tangents to the tire characteristic curves at intersections of the same straight line are equal to one another.

Figure 4:
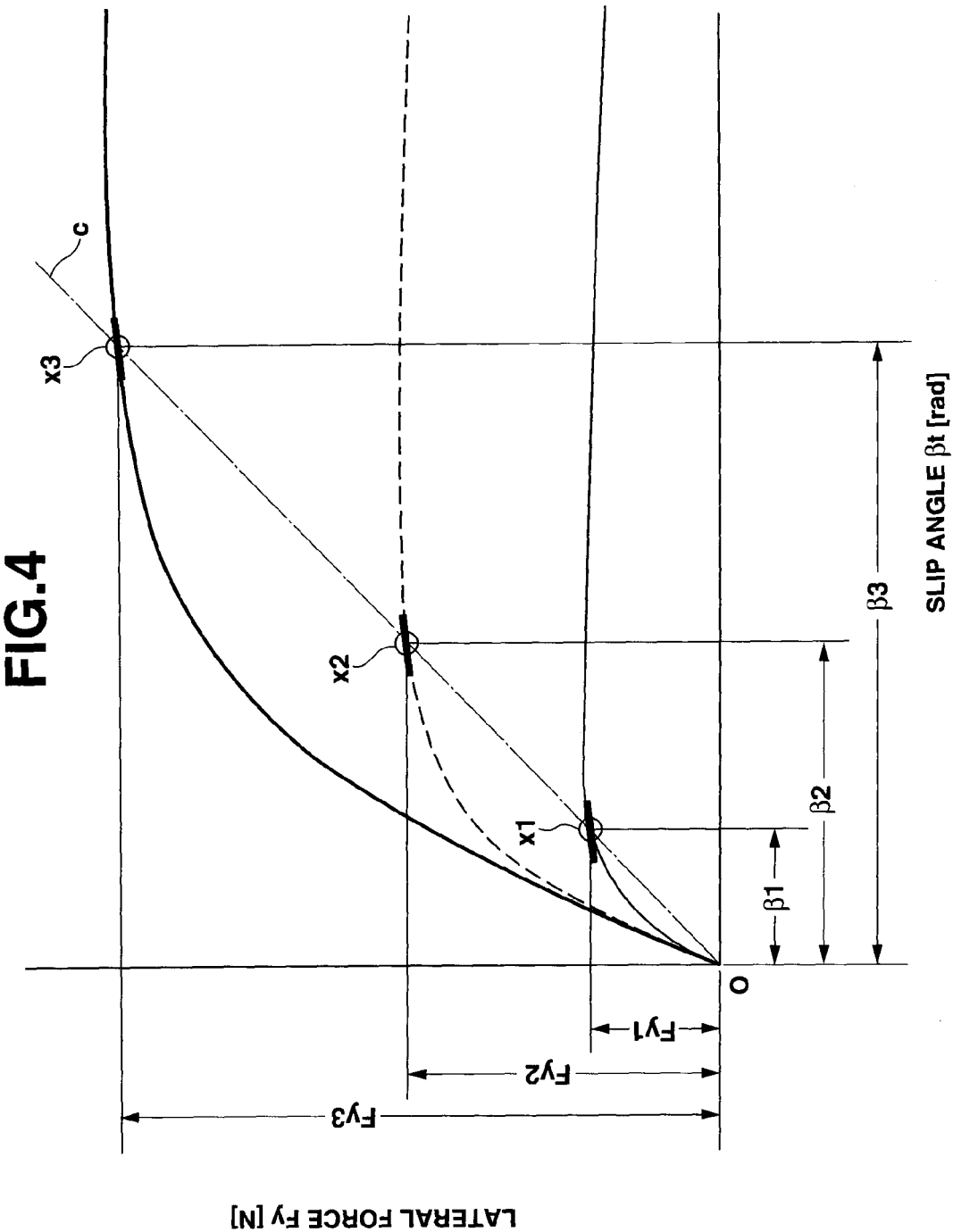
FIG. 4 is a view for illustrating the technology underlying the first embodiment, and more specifically a characteristic view showing the tangent slope of each of tire characteristic curves of different road surface μ values at an intersection point with a straight line passing through the origin of the tire characteristic curve.

In FIG. 4, attention is paid to the straight line c shown in FIG. 3, as an example. As shown in FIG. 4, the slopes of tangents to the tire characteristic curves of the different road surface μ values at intersection points with the straight line c are equal to one another. In other words, the ratio (Fy1/βt1) of the lateral force Fy1 and slip angle βt1 determining the intersection point x1 with the tire characteristic curve of the road surface μ=0.2 (the characteristic curve of the low friction coefficient), the ratio (Fy2/βt2) of the lateral force Fy2 and slip angle βt2 determining the intersection point x2 with the tire characteristic curve of the road surface μ=0.5 (the characteristic curve of the medium friction coefficient) and the ratio (Fy3/βt3) of the lateral force Fy3 and slip angle βt3 determining the intersection point x3 with the tire characteristic curve of the road surface μ=1.0 (the characteristic curve of the high friction coefficient) are all equal to the same value. The tire characteristic curves of the different road surface μ values have the same slope of tangent at these intersection points x1, x2 and x3.

Figure 42:
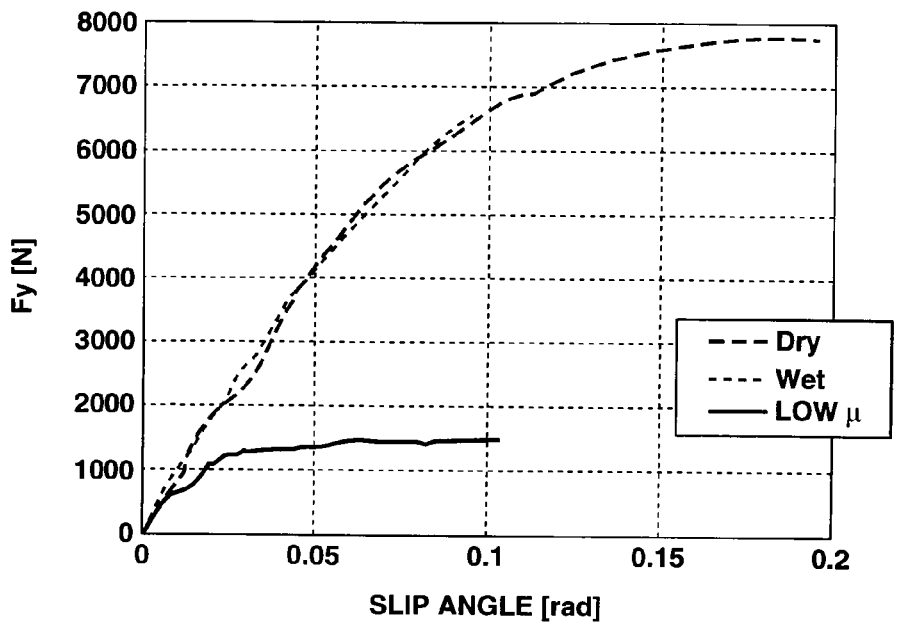
FIG. 42 is a graphic view showing the results of normal tire characteristic test for verifying technology underlying the first embodiment in the lateral direction.
Figure 43:
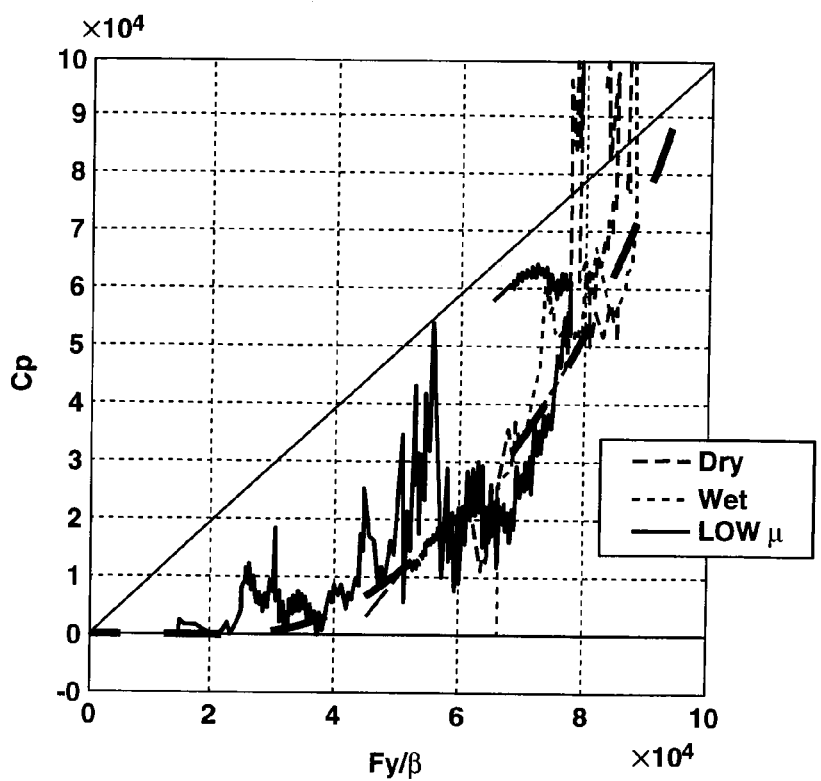
FIG. 43 is a graphic view showing a normal tire Cp map for verifying the underlying technology in the case of the lateral direction.

FIGS. 42 and 43 are views showing the results of experiments for verifying the principle of stability measurement shown in FIGS. 3 and 4. FIG. 42 shows the results of normal tire characteristic test, in the form of the characteristic of a front wheel (for two wheels on the left and right sides) in a circular turning movement with acceleration. FIG. 43 shows a normal tire Cp map obtained by organizing the experimental results according to the principle of the stability measurement, and the experimental results show that a single characteristic can be obtained without regard to the magnitude of the road surface mu. The horizontal axis of FIG. 43 represents the ratio of the lateral force and slip angle, and the vertical axis corresponds to the slope of tangent to the tire characteristic curve.

FIGS. 44, 45 and 46 are views for verifying the principle of the stability measurement (or cornering stiffness estimating technique) with a theoretical model. The verification is performed with the use of a tire brush model for the case involving the lateral force only and the case involving the driving force only. A tire model shown in FIG. 44 is a model composed of a countless number of such elastic members substituting for a tread rubber portion of the tire surface that, when a slip rate or a slip angle is produced in the tire, each elastic member becomes deformed in that direction, and produces a restoring force. The force produced by the tire is the resultant of forces produced, respectively, by the elastic members.

In FIG. 45, a tire is revolving at an angular speed ω, and traveling in a direction forming an angle β with the plane of the revolution, with a velocity component u in the direction of the plane of the revolution. In this example, this tire is acted upon by a force Fx in the longitudinal direction, a force Fy in the lateral direction, and a force Fz in the vertical direction. Under the above-mentioned condition, the validity of the stiffness estimating technique is verified for (1) the first situation in which only the driving force is produced at β=0, and (2) the second situation in which only the lateral force is produced with no longitudinal (brake/drive) force (u=R₀·ω).

<Stiffness Estimation in cornering operation> Lateral force Fy can be expressed by a following mathematical expression (1) when calculated at the time of occurrence of a slip angle (with no longitudinal force, with the brush model.

[Math 1]

$$Fy = -K_\beta \tan\beta \left(1 - \frac{K_\beta}{3\mu F_Z}\tan\beta\right)^2 - \\ 3\mu F_Z\left(\frac{1}{6} - \frac{1}{2}\left(1 - \frac{K_\beta}{3\mu F_Z}\tan\beta\right)^2 + \frac{1}{3}\left(1 - \frac{K_\beta}{3\mu F_Z}\tan\beta\right)^3\right) \quad (1)$$

In this equation, symbols are defined as follows:

μ: Road surface friction coefficient (coefficient determining a greatest frictional force which can be produced between the tire and the road surface)

$K_\beta$: Tire stiffness in the lateral direction

This equation of Fy can be rewritten as a following mathematical expression (2) by rearranging the equation with respect to slip angle β (tire slip angle), and collecting coefficients other than μ as constant.

[Math 2]
$$Fy = A\beta + \frac{B}{\mu}\beta^2 + \frac{C}{\mu^2}\beta^3 \quad (2)$$

In this equation, A, B and C are constants not dependent on the road surface condition, and approximation of tan β=β is used.

In this example, the tire has an Fy-β characteristic as shown in FIG. 46. FIG. 46 is an Fy-β graph during cornering showing characteristic difference due to road surface difference with the same tire. This graph further includes an auxiliary line (straight line) extending from the origin and having a slope K. Points P1 and P2 are intersection points at which this auxiliary line intersects tire characteristic curves of a road surface friction coefficient μ1 and a road surface friction coefficient μ2, respectively. Following mathematical expression (3) for P1 and mathematical expression (4) for P2 are obtained by setting the equations of the characteristic curve and the auxiliary line simultaneously at each of points P1 and P2.

[Math 3]
$$Fy_1 = A\beta_1 - \frac{B}{\mu_1}\beta_1^2 + \frac{C}{\mu_1^2}\beta_1^3 \quad (3)$$
$$Fy_1 = K\beta_1$$

[Math 4]
$$Fy_2 = A\beta_2 - \frac{B}{\mu_2}\beta_2^2 + \frac{C}{\mu_2^2}\beta_2^3 \quad (4)$$
$$Fy_2 = K\beta_2$$

A following mathematical expression (5) is obtained by rearrangement of these four equations for K.

[Math 5]
$$K = A - B\left(\frac{\beta_1}{\mu_1}\right) + C\left(\frac{\beta_1}{\mu_1}\right)^2 \quad (5)$$
$$= A - B\left(\frac{\beta_2}{\mu_2}\right) + C\left(\frac{\beta_2}{\mu_2}\right)^2$$

As shown in FIG. 46, β and μ are always positive, and points P1 and P2 are located on the auxiliary line Fy=Kβ. Therefore, a following equation of ratios is obtained.

[Math 6]
$$\mu_1:\mu_2 = Fy_1:Fy_2 = \beta_1:\beta_2 \quad (6)$$

The slope of tangent to the tire characteristic curve can be defined by a following expression.

[Math 7]
$$\frac{\partial Fy}{\partial \beta} = A - 2B\left(\frac{\beta}{\mu}\right) + 3C\left(\frac{\beta}{\mu}\right)^2 \quad (7)$$

Substitution of values at points P1 and P2 into this partial differential equation yields:

[Math 8]
$$\frac{\partial Fy_1}{\partial \beta_1} = A - 2B\left(\frac{\beta_1}{\mu_1}\right) + 3C\left(\frac{\beta_1}{\mu_1}\right)^2 \quad (8)$$
$$= A - 2B\left(\frac{\beta_2}{\mu_2}\right) + 3C\left(\frac{\beta_2}{\mu_2}\right)^2 = \frac{\partial Fy_2}{\partial \beta_2}$$

Thus, it is proved that the slopes of tangents at points P1 and P2 are equal to each other.

Figure 5:
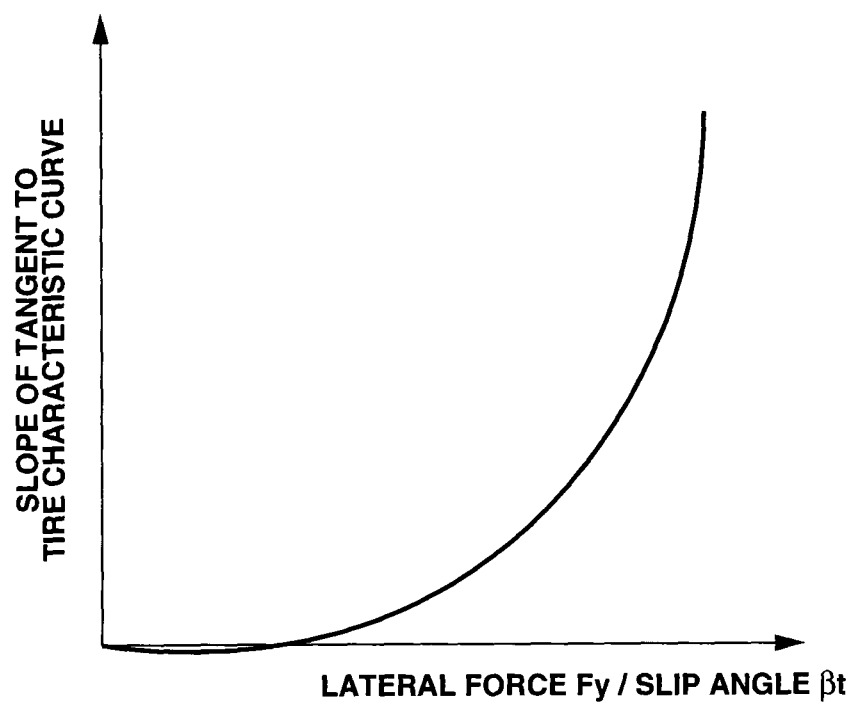
FIG. 5 is a view for illustrating the technology underlying the first embodiment, and more specifically a characteristic view showing a relationship between a ratio (Fy/βt) of a lateral force Fy and a slip angle S representing an intersection point of an arbitrary straight line and a tire characteristic curve, and the tangent slope of the tire characteristic curve at the intersection point.

FIG. 5 shows a relationship of the ratio (Fy/βt) of lateral force Fy to slip angle βt expressing an intersection point between an arbitrary straight line and a tire characteristic curve, and the tangent slope (∂Fy/∂βt)(gradient) of the tire characteristic curve (that is, the slope of a tangent to the tire characteristic curve) at the intersection point. As shown in FIG. 5, without regard to the value of the road surface μ(μ=0.2, 0.5 or 1.0, for example), there is an invariable relationship between the ratio (Fy/βt) of lateral force Fy to slip angle βt, and the tangent slope of the tire characteristic curve. Therefore, the characteristic curve of FIG. 5 is valid and proper even on road surfaces of different friction coefficient μ values such as a dry asphalt road surface and icy road surface. The characteristic curve of FIG. 5 can be referred to as a grip characteristic curve, for example, as distinguished from the tire characteristic curve of FIG. 1.

In the characteristic curve of FIG. 5 (the grip characteristic curve), the tangent slope of the tire characteristic curve (corresponding to the grip characteristic parameter) is negative in the region (smaller ratio region) in which the ratio (Fy/βt) is small. In this region, as the ratio (Fy/βt) becomes greater, the tangent slope of the tire characteristic curve first decreases, and then starts increasing. The negative tangent slope of the tire characteristic curve means that the partial differential coefficient of the lateral force with respect to the slip angle is negative.

In a region (greater ratio region) in which the ratio (Fy/βt) of lateral force Fy and slip angle βt is greater, the tangent slope of the tire characteristic curve becomes positive. In this region, the tangent slope of the tire characteristic curve increases as the ratio (Fy/βt) becomes greater. In the region in which the ratio (Fy/βt) of lateral force Fy and slip angle βt is greater, the characteristic curve of FIG. 5 is in the form of a monotone increasing function. The positive tangent slope of the tire characteristic curve means that the partial differential coefficient of the lateral force with respect to the slip angle is positive. Moreover, the greatest value of the tangent slope of the tire characteristic curve means that the tangent slope is the slope of the linear region of the tire characteristic curve. In the linear region, the tangent slope of the tire characteristic curve is constant without regard to the ratio of lateral force Fy and slip angle βt.

As mentioned above, the inventors of the present invention has found that, as to the tire characteristic curves of various road surface μ values, the slopes of tangents become equal to one another at intersection points between a given straight line passing through the origin and the respective tire characteristic curves. Then, the inventors of the present invention have come to the conclusion that the relationship between the ratio Fy/βt of lateral force Fy to slip angle βt and the tangent slope of the tire characteristic curves can be expressed by a characteristic curve (grip characteristic curve)(FIG. 5) without regard to the road surface mu. With this characteristic curve, it is possible to obtain information on the tire frictional condition from the lateral force Fy and slip angle βt, without the need for the information of the road surface mu. The process of obtaining the information on the tire frictional condition is explained with reference to FIG. 6.

First, lateral force Fy and slip angle βt are sensed. Then, by using a characteristic curve shown in FIG. 6(a)(or 6A)(similar to the characteristic curve of FIG. 5), it is possible to determine the tangent slope of the tire characteristic curve corresponding to the sensed lateral force Fy and slip angle βt (corresponding to Fy/βt). For example, as shown in FIG. 6(a)(6A), tire characteristic curve tangent slopes Id1, Id2, Id3, Id4 and Id5 are obtained. From these tire characteristic curve tangent slopes, it is possible to determine the positions on a tire characteristic curve of a road surface μ, as shown in FIG. 6(b)(or 6B). For example, it is possible to specify positions Xid1, Xid2, Xid3, Xid4 and Xid5 corresponding to the tire characteristic curve tangent slopes Id1, Id2, Id3, Id4 and Id5. The position on the tire characteristic curve represents the frictional state and the ability of a tire at a road surface μ at which the tire characteristic curve is valid. Accordingly, it is possible to know the tire frictional state and the ability (such as the ability of gripping) of the tire by determining a position on the tire characteristic curve as shown in FIG. 6(b)(6B) at the road surface mu of the tire characteristic curve. When, for example, the tangent slope of the tire characteristic curve is negative or close to zero (Id4 or Id5, for example), it is possible to judge, from the position (Xid4 or Xid5) determined from the tangent slope, that the lateral force of the tire is in a limit region (critical region).

By this process, if lateral force Fy and slip angle βt are known, it is possible to determine the frictional state and ability of the tire at the road surface mu at which the lateral force Fy and slip angle βt are obtained, by using the characteristic curve (grip characteristic curve).

FIG. 7 shows a relation with a friction circle. FIG. 7(a)(or 7A) shows a relationship between the ratio (Fy/βt) between lateral force Fy and slip angle βt, and the tire characteristic curve tangent slope (like FIG. 5). FIG. 7(b)(or 7B) shows a tire characteristic curve, and FIG. 7(c)(or 7C) shows a friction circle. In these relationships, first, the tire characteristic curve tangent slope Id corresponding to the lateral force Fy and slip angle βt (corresponding to Fy/βt) is obtained (FIG. 7(a)). Accordingly, the position on the tire characteristic curve can be determined (FIG. 7(b)). Furthermore, a relative value of the lateral force in the friction circle can be determined. That is, it is possible to determine a margin M to the lateral force which can be allowed by the tire. The tangent slope of the tire characteristic curve represents the rate of change of the lateral force Fy with respect to a change in slip angle βt. Therefore, the value, along the vertical axis, of the characteristic curve shown in FIG. 7(a)(the tire characteristic curve tangent slope (grip characteristic parameter) can be regarded as a quantity indicative of a varying speed of a vehicle behavior.

Figure 8:
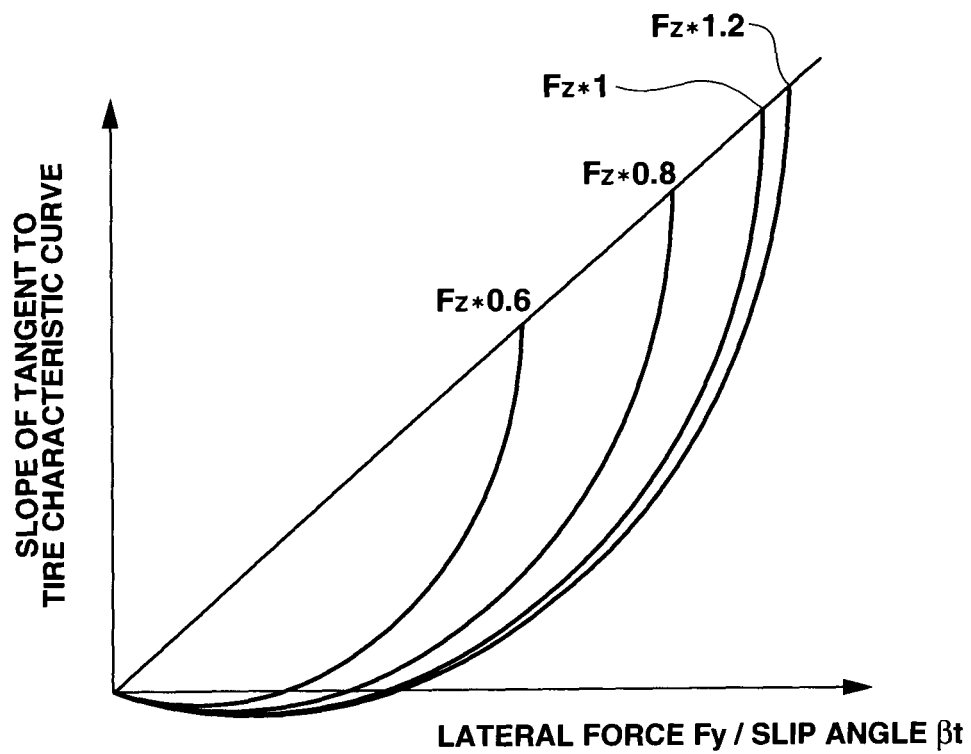
FIG. 8 is a view for illustrating the technology underlying the first embodiment, and more specifically a characteristic view showing a relationship between the ratio (Fy/βt) of lateral force Fy and slip angle βt and the slope of tangent to the tire characteristic curve obtained when a wheel load is varied.

Furthermore, a relation between the ratio (Fy/βt) of lateral force Fy and slip angle βt and the tire characteristic curve tangent slope has been ascertained when a wheel load is varied, by a process similar to the before-mentioned process. FIG. 8 shows this relation. In this example, the wheel load is varied by multiplying an initial value Fz of the wheel load (the value of the wheel load obtained when there is no variation), by 0.6, 0.8 and 1.2. In the case of multiplication by 1.0, the wheel load is equal to the initial value Fz. When the wheel load of the tire becomes smaller, the tire characteristic curve tangent slope obtained by each wheel load value becomes smaller, as shown in FIG. 8. In this case, the greatest value of the tire characteristic curve tangent slope obtained by each wheel load value (the value of the linear region) is moved on a straight line passing through the original of the characteristic view. Moreover, the characteristic curve representing the relationship between the ratio (Fy/βt) of lateral force Fy and slip angle βt and the tire characteristic curve tangent slope (the slope of a tangent to the tire characteristic curve) is varied in the size while the shape is maintained, so that the forms are like similar figures having different sizes. The inventors of the present application have found such relation with the wheel load, too.

The following is explanation on practical examples of the first embodiment achieved by the above-mentioned technology.

(First Practical Example According to First Embodiment)
(Construction)

A first practical example is explained first.

Figure 9:
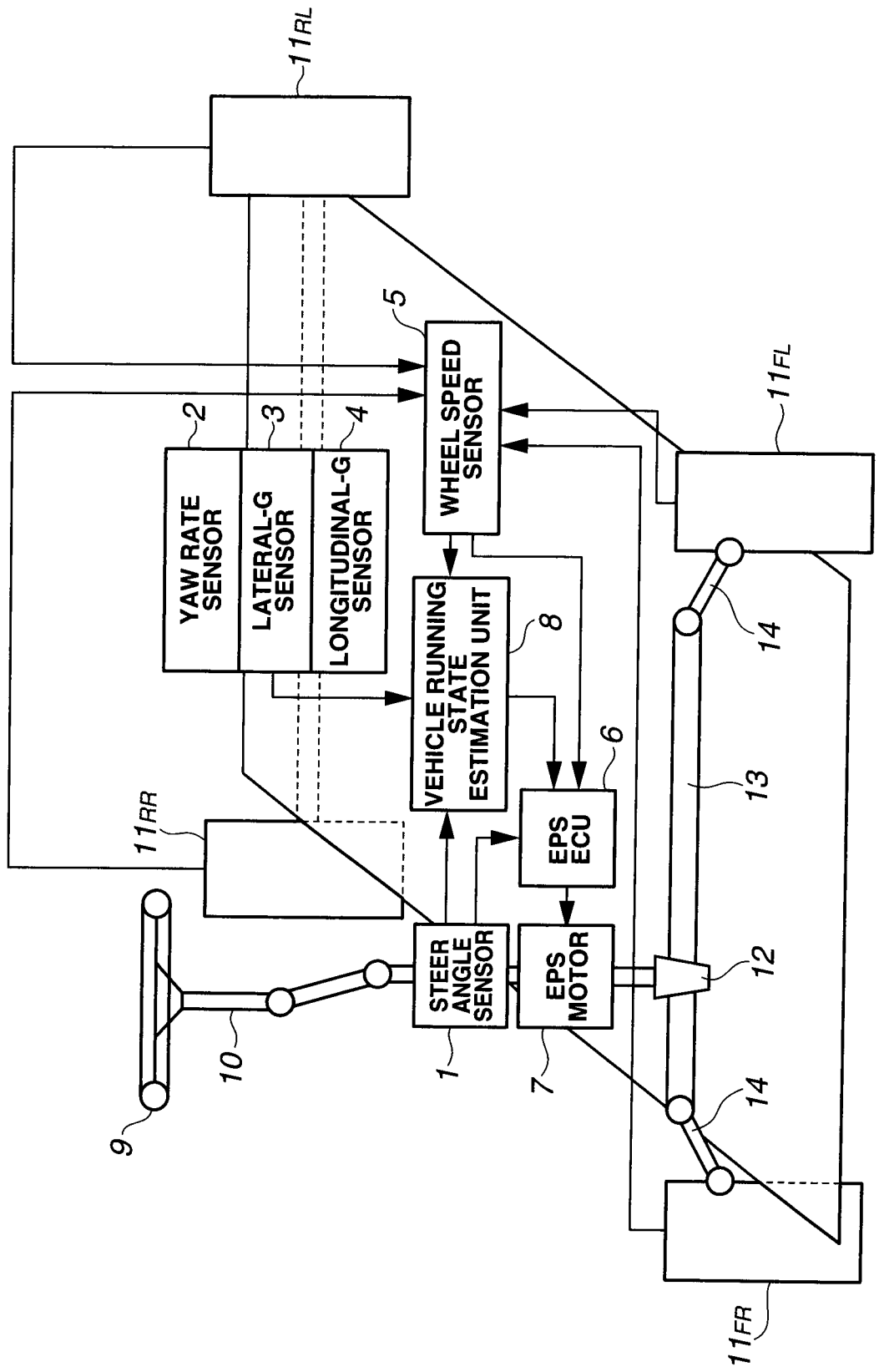
FIG. 9 is a schematic view showing a construction of a vehicle in a first practical example according to the first embodiment.

FIG. 9 schematically shows the construction of a vehicle in the first practical example. As shown in FIG. 9, the vehicle includes a steering angle sensor (or steer angle sensor) 1, a yaw rate sensor 2, a lateral acceleration sensor 3, a longitudinal acceleration sensor 4, a wheel speed sensor 5, EPSECU (Electric Power Steering Electronic Control Unit) 6, an EPS (Electric Power Steering) motor 7, and a vehicle travel (or running) state estimating device or unit 8.

Steering angle sensor 1 senses the rotational angle of a steering shaft 10 rotating as a unit with a steering wheel 9. Steering angle sensor 1 delivers the sensing result (steering angle) to vehicle travel state estimating device 8. Yaw rate sensor 2 senses the yaw rate of the vehicle, and delivers the sensing result to vehicle travel state estimating device 8. Lateral acceleration sensor 3 senses the lateral acceleration of the vehicle, and delivers the sensing result to vehicle travel state estimating device 8. Longitudinal acceleration sensor 4 senses the longitudinal acceleration of the vehicle and delivers the sensing result to vehicle travel state estimating device 8. Wheel speed sensor 5 senses the wheel speeds of wheels 11FL~11RR provided in the vehicle body, and delivers the sensing result to vehicle travel state estimating device 8.

EPSECU 6 outputs a steering assist command to EPS motor 7 in accordance with the steering angle sensed by steering angle sensor 1. This steering assist command is a command signal for performing steering assistance. Furthermore, EPSECU 6 outputs the steering assist command to EPS motor 7 in accordance with an unstable behavior restraining assist command (mentioned later) produced by vehicle travel state estimating device 8. This steering assist command is a command signal for restraining unstable behavior of the vehicle.

EPS motor 7 imparts a rotational torque to steering shaft 10 in accordance with the steering assist command outputted from EPSECU 6. Therefore, EPS motor 7 gives assistance to the steering movement of left and right front wheels 11FL and 11FR through a rack and pinion mechanism (pinion 12 and rack 13) connected with steering shaft 10, tie rods 14 and knuckle arms 15.

Vehicle travel state estimating device 8 estimates the travel (or running) state of the vehicle in accordance with the sensing results of steering angle sensor 1, yaw rate sensor 2, lateral acceleration sensor 3, longitudinal acceleration sensor 4 and wheel speed sensor 5. In accordance with the result of the estimation, the vehicle travel state estimating device 8 outputs the unstable behavior restraining assist command to EPSECU 6. The unstable behavior restraining assist command is a command signal for controlling EPS motor 7 so as to restrain unstable behavior of the vehicle.

Figure 10:
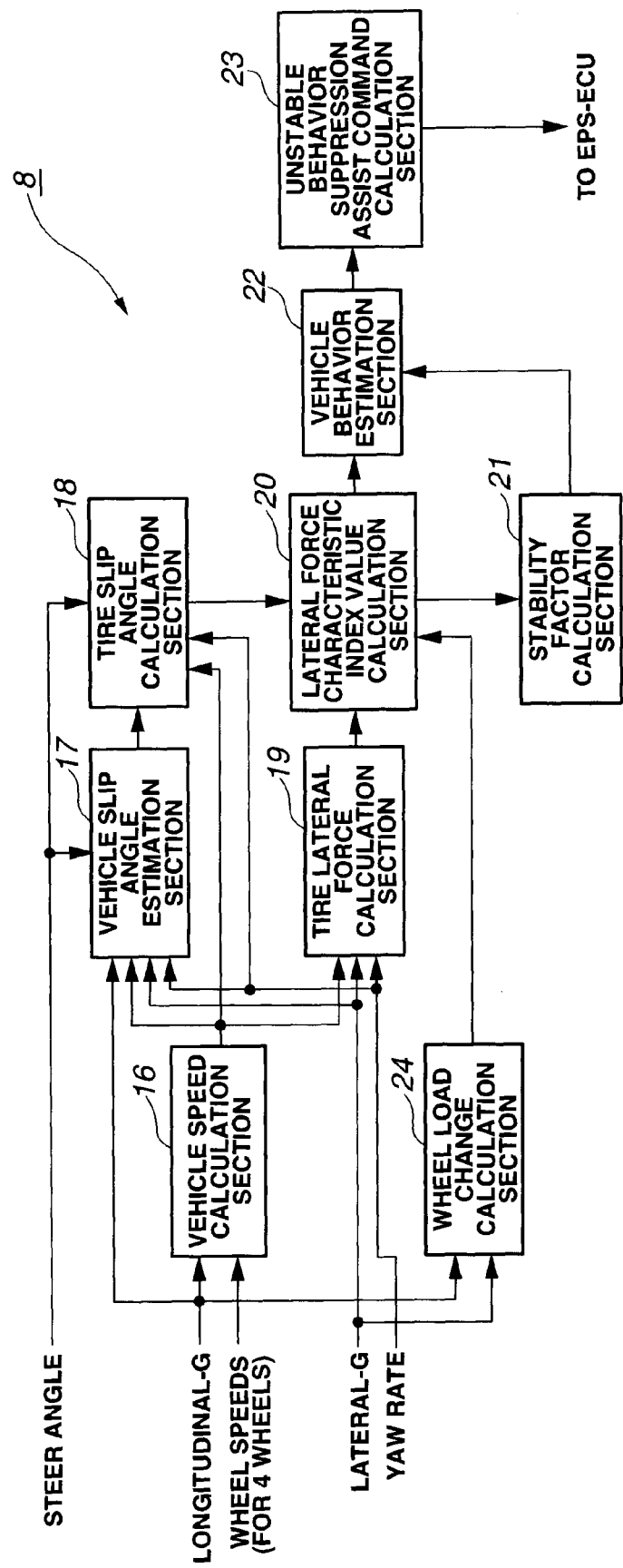
FIG. 10 is a block diagram showing the internal structure of a vehicle travel state (or running state) estimating device.

FIG. 10 shows the internal configuration of vehicle travel state estimating device or unit 8. As shown in FIG. 10, vehicle travel state estimating device 8 includes a section 16 for calculating a vehicle body speed, a section 17 for estimating a vehicle body slip angle, a section 18 for calculating a tire slip angle, a section 19 for calculating a tire lateral force, a section 20 for calculating a lateral force characteristic index (or a cornering stiffness calculating section), a section 21 for calculating a stability factor, a section 22 for estimating a vehicle behavior, a section 23 for calculating an unstable behavior restraining (or suppression) assist command, and a section 24 for calculating a wheel load variation (or change).

Vehicle body speed calculating section 16 estimates the vehicle body speed in accordance with the wheel speeds sensed by wheel speed sensor 5, and the longitudinal speed sensed by longitudinal speed sensor 4, and outputs the calculation result to the vehicle body slip angle estimating section 17 and tire lateral force calculating section 19. In particular, vehicle body speed calculating section 16 calculates a mean value (or average) of the wheel speeds of driven wheels 11RL and 11RR or a mean value (or average) of wheels 11FL~11RR, and sets the calculated value as a base value of the vehicle body speed. Vehicle body speed calculating section 16 modifies this base value with the longitudinal acceleration. Specifically, vehicle body speed calculating section 16 modifies the base value so as to remove influence of errors due to tire spin at the time of rapid acceleration and tire lock at the time of hard braking. Vehicle body speed calculating section 16 sets the thus-modified value as the result of the estimation of the vehicle body speed.

Vehicle body slip angle estimating section 17 estimates a side slip angle (slip angle) of the vehicle in accordance with the steering angle sensed by steering angle sensor 1, the yaw rate sensed by yaw rate sensor 2, the lateral acceleration sensed by lateral acceleration sensor 3, the longitudinal acceleration sensed by longitudinal acceleration sensor 4, and the vehicle body speed calculated by vehicle body speed calculating section 16.

Figure 11:
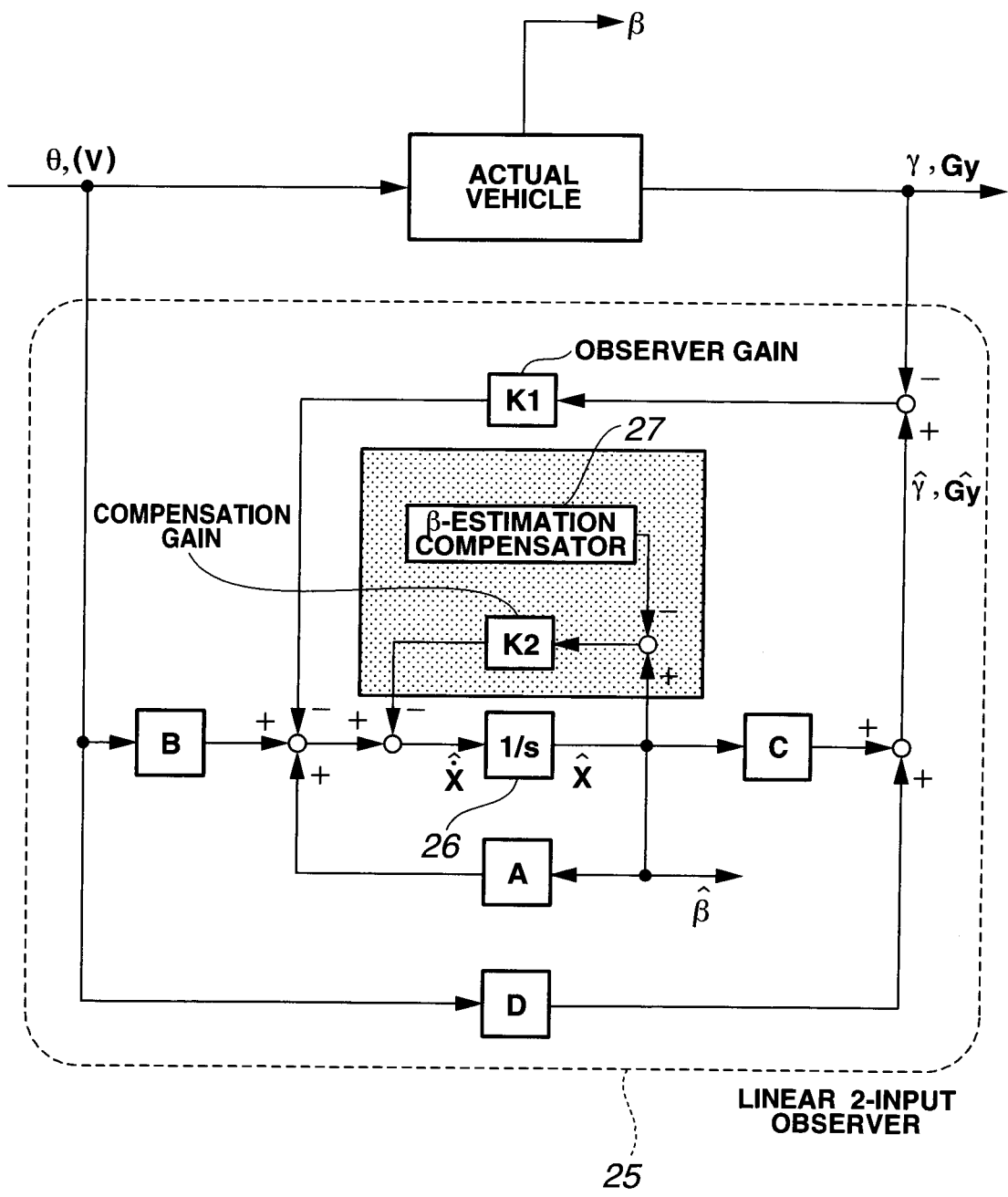
FIG. 11 is a block diagram showing the internal structure of a vehicle body slip angle estimating section.

FIG. 11 shows the configuration of vehicle body slip angle estimating section 17 in this example. As shown in FIG. 11, vehicle body slip angle estimating section 17 includes a linear two-input observer 25 estimating one or more vehicle state variables (vehicle side slip angle β, slip angle β). With this construction, the vehicle body slip angle estimating section 17 estimates the vehicle side slip angle (slip angle) β. Linear two-input observer 25 is based on a two-wheel vehicle model, which can be expressed by a following mathematical expression (9), by using balance of forces in the lateral direction and moment of the vehicle.

[Math 9]

$$mV(\dot{\beta}+\gamma)=-Cp_f(\beta+l_f\gamma/V-\delta)-Cp_r(\beta-l_r\gamma/V)$$

$$I\dot{\gamma}=-Cp_f(\beta+l_f\gamma/V-\delta)l_f+Cp_r(\beta-l_r\gamma/V)l_r \quad (9)$$

In these equations, A, B, C and D are matrices determined the linear two-wheel vehicle model. By setting the tire steer angle as an input u, and the yaw rate and lateral acceleration as an output y, it is possible to obtain a state equation (output equation) of the mathematical expression (9), expressed by a following mathematical expression (10).

[Math 10]

$$\dot{x} = Ax + Bu, \ x = \begin{pmatrix} \beta \\ \gamma \end{pmatrix}, u = \delta \quad (10)$$

$$y = Cx + Du, \ y = \begin{pmatrix} \gamma \\ Gy \end{pmatrix}$$

$$A = \begin{pmatrix} -\dfrac{Cp_f + Cp_r}{mV} & -\dfrac{Cp_f l_f - Cp_r l_r}{mV^2} - 1 \\ -\dfrac{Cp_f l_f - Cp_r l_r}{I} & -\dfrac{Cp_f l_f^2 + Cp_r l_r^2}{IV} \end{pmatrix}$$

$$B = \begin{pmatrix} \dfrac{Cp_f}{mV} \\ \dfrac{Cp_f l_f}{I} \end{pmatrix}, C = \begin{pmatrix} 0 & 1 \\ Va_{11} & V(a_{12}+1) \end{pmatrix}, D = \begin{pmatrix} 0 \\ Vb_1 \end{pmatrix}$$

In these equations, m is the vehicle mass, I is a yawing moment of inertia, If is a distance between the center of gravity of the vehicle and the front axle, Ir is a distance between the center of gravity of the vehicle and the rear axle, Cpf is a front wheel cornering power (a total for the left and right wheels), Cpr is a rear wheel cornering power (a total for the left and right wheels), V is the vehicle body speed, β is the vehicle side slip angle, γ (gamma) is the yaw rate, Gy is the lateral acceleration, and a11, a12 and b1 are elements of the matrices A and B.

On the basis of this state equation, the linear two-input observer 25 is formed by setting the yaw rate and lateral acceleration as input, and using an observer gain K1. Observer gain K1 is a value so set as to restrain influence from modeling error and to enable stable estimation.

Linear two-input observer 25 includes a compensator 27 for β estimation, used to modify an input of an integrator 26. With this β estimation compensator 27, the linear two-input observer 25 can ensure sufficient estimation accuracy even in the limit or critical region. By the use of β estimation compensator 27, it is possible to estimate sideslip angle β accurately even in the case of change of the road surface mu condition, and the case of a critical vehicle running state, as well as in a road-surface μ state presupposed at the time of designing the linear two-wheel vehicle model and in the linear region in which the characteristic of the tire sideslip angle does not become nonlinear.

Figure 12:
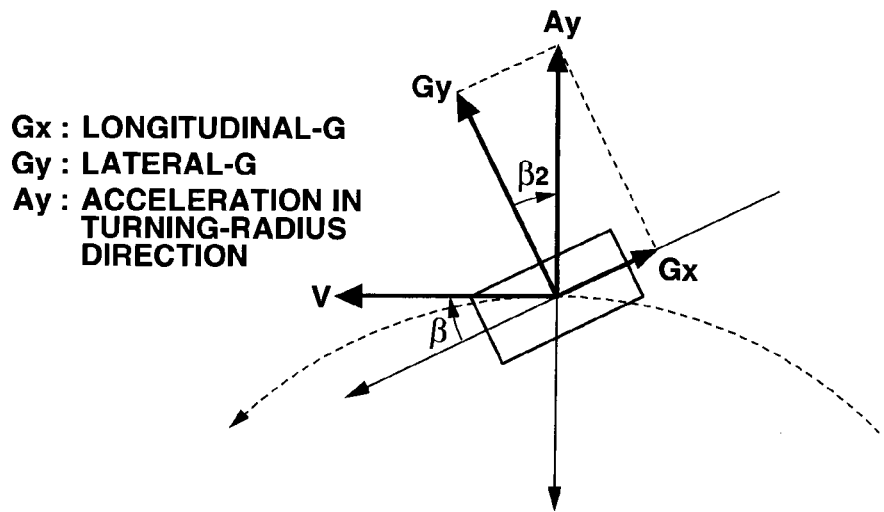
FIG. 12 is a view for explaining forces acting on the body of a vehicle in a turning motion.

FIG. 12 shows the vehicle in a turning motion with vehicle body sideslip angle β. As shown in FIG. 12, the field force acting on the vehicle body, that is, the centrifugal force acting outwards from the turning center of the vehicle, is also generated in the direction deviated from the vehicle widthwise direction by the amount corresponding to sideslip angle β. Therefore, β estimation compensator 27 calculates a deviation β₂ of the field force according to a following mathematical expression (11). This deviation β₂ serves as a reference value (target value) G used to modify the vehicle sideslip angle β estimated by linear two-input observer 25.

[Math 11]

$$\beta_2 = \frac{1}{2}\pi - \mathrm{Atan}\left(\frac{Gy}{Gx}\right) \quad (11)$$

Figure 13:
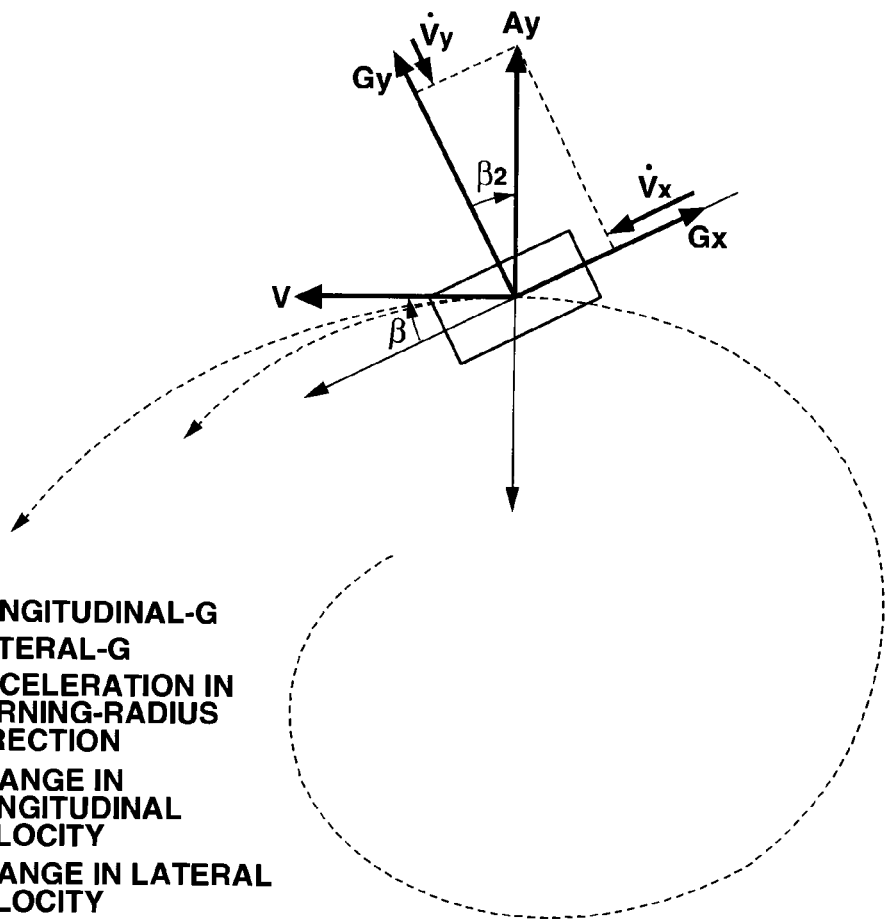
FIG. 13 is a view for explaining field forces acting on the body of the vehicle in a turning motion.

In this equation, Gx is the longitudinal acceleration. Moreover, as shown in FIG. 13, a balance of forces due to speed changes is taken into account. Accordingly, by extracting only components due to the turning motion, the expression (11) can be rewritten as a following mathematical expression (12).

[Math 12]

$$\beta_2 = \frac{1}{2}\pi - A\tan\left(\frac{Gy - \dot{V}y}{Gx - \dot{V}x}\right) \quad (12)$$

The β estimation compensator 27 subtracts the thus-determined target value $\beta_2$ from the sideslip angle β estimated by linear two-input observer 25. Moreover, β estimation compensator 27 multiplies the result of the subtraction by a compensation gain K2 set according to a control map of FIG. 14. Then, β estimation compensator 27 uses the result of the multiplication as an input to integrator 26.

Figure 14:
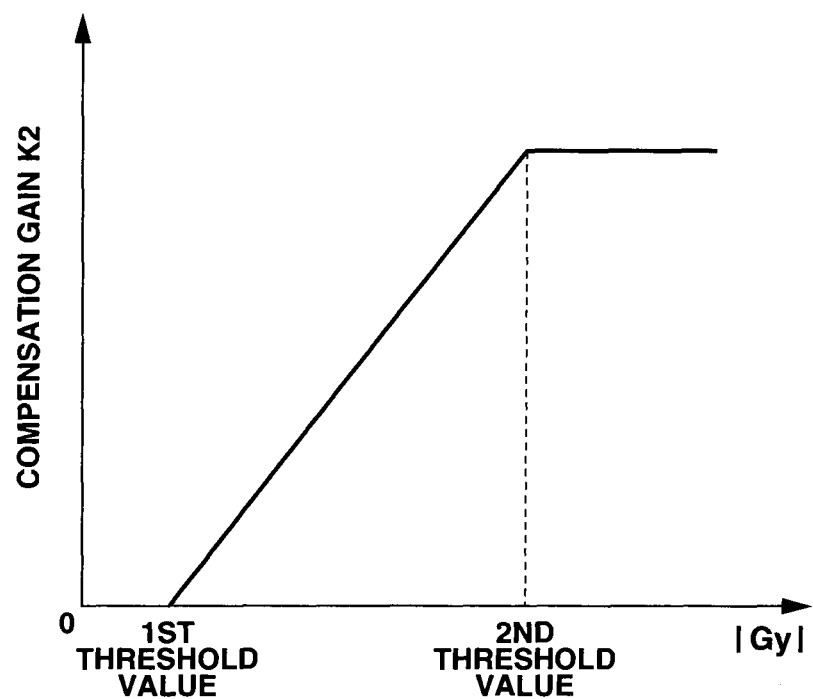
FIG. 14 is a characteristic view for explaining a control map for setting a compensation gain.

In the control map shown in FIG. 14, compensation gain K2 is set equal to zero when the absolute value |Gy| of lateral acceleration Gy of the vehicle is less than or equal to a first threshold value, and held at a relatively large constant value when the absolute value of lateral acceleration Gy of the vehicle is greater than or equal to a second threshold value, which is greater than the first threshold value. When the absolute value of the vehicle lateral acceleration Gy is intermediate between the first and second threshold values, the compensation gain K2 is increased as the absolute value of lateral acceleration Gy increases.

With the control map of FIG. 14 in which compensation gain K2 is set equal to zero when the absolute value of lateral acceleration Gy is smaller than or equal to the first threshold value and close to zero, the system does not perform erroneous modification since there is no need of modification in a situation, such as a straight ahead driving situation, in which no turning G is produced. Moreover, in the control map of FIG. 14, the feedback gain (compensation gain) K2 is increased in proportion to the absolute value of lateral acceleration Gy when the absolute value of lateral acceleration Gy becomes greater than the first threshold value (0.1 G, for example), and the compensation gain K2 is held invariably at the constant value to stabilize the control when the absolute value of lateral acceleration becomes greater than or equal to the second threshold value (0.5G, for example). By adjusting the compensation gain K2 in this way, the system improves the estimation accuracy of sideslip angle β. In FIGS. 12 and 13, Ay is an acceleration in the turning direction.

Tire slip angle calculation section 18 calculates front and rear wheel slip angles βf and βr, in accordance with the steering angle (tire steer angle δ) sensed by steering angle sensor 1, yaw rate y sensed by yaw rate sensor 2, vehicle body speed V calculated by vehicle body speed calculation section 16, and vehicle sideslip angle (vehicle slip angle) β calculated by vehicle body slip angle estimating section 17, by using following expression (13).

[Math 13]

$\beta_f = \beta + l_f \gamma/V - \delta$ $\beta_r = \beta + l_r \gamma/V \quad (13)$ Tire slip angle calculating section 18 outputs the calculated front and rear wheel slip angles βf and βr to lateral force characteristic index calculating section 20.

Tire lateral force calculating section 19 calculates front and rear wheel lateral forces Fyf and Fyr, in accordance with yaw rate y sensed by yaw rate sensor 2 and lateral acceleration Gy sensed by lateral acceleration sensor 3 by using a following expression (14).

[Math 14]

Figure 15:
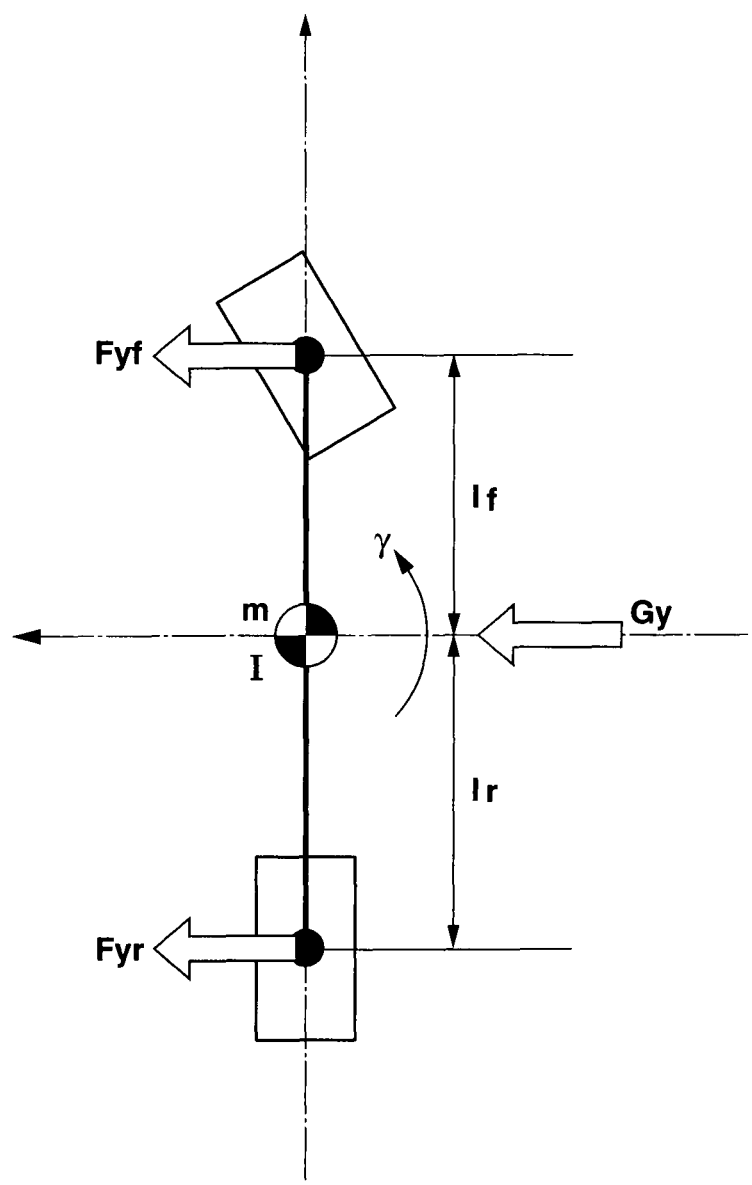
FIG. 15 is a view for explaining a linear two-wheel model of a vehicle.

$mGy = Fy_f + Fy_r$ $\dot{I}\gamma = Fy_f \cdot l_f - Fy_r \cdot l_r \quad (14)$ Yaw rate γ and lateral acceleration Gy are quantities as shown in FIG. 15. Tire lateral force calculating section 19 outputs the calculated lateral forces Fyf and Fyr to lateral force characteristic index calculating section 20.

Wheel load change calculating section 24 calculates a wheel load change (or variation) in accordance with lateral G sensed by lateral acceleration sensor 3 and longitudinal G sensed by longitudinal acceleration sensor 4. Specifically, wheel load change calculating section 24 calculates the wheel load change corresponding to the lateral G and longitudinal G. Wheel load change calculation section 24 outputs the result of the calculation to lateral force characteristic index calculating section 20.

Figure 16:
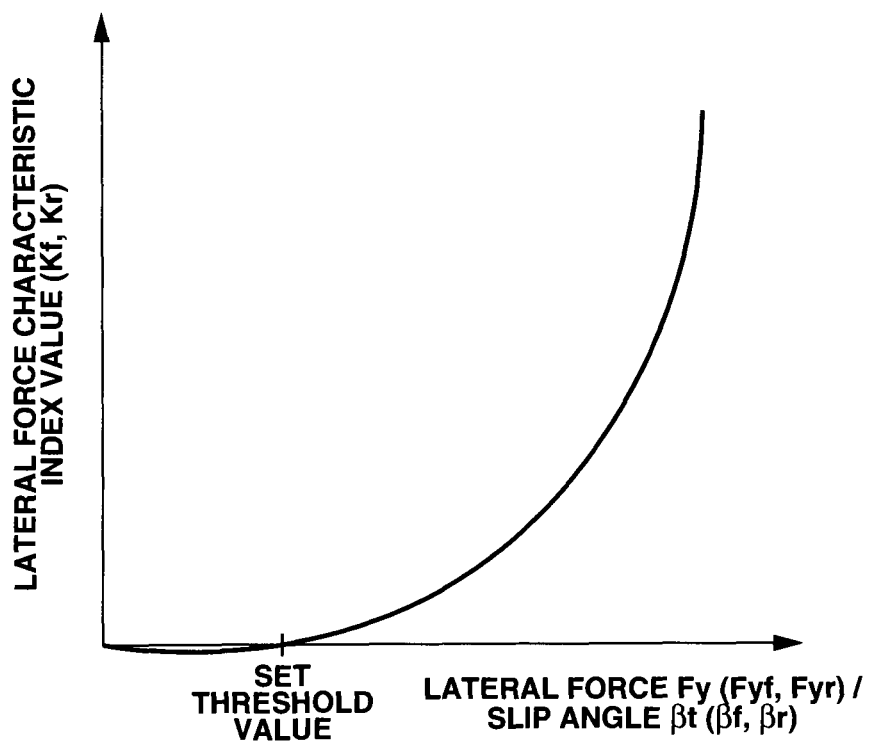
FIG. 16 is a characteristic view for explaining a lateral force index map.

Lateral force characteristic index calculating section (or cornering stiffness calculating section) 20 estimates a trend or tendency of the ratio of a change in tire lateral force Fyf, Fyr to a change in slip angle βf, βr, in accordance with front and rear wheel slip angles βf and βr calculated by tire slip angle calculating section 18 and front and rear wheel tire lateral forces Fyf and Fyr calculated by tire lateral force calculating section 19. This trend serves to indicate the slope or gradient of a tangent to a tire characteristic curve. In the following explanation, this trend is also referred to as a lateral force characteristic index. In this practical example, lateral force characteristic index calculating section 20 has the characteristic curve shown in FIG. 5 in the form of a map. FIG. 16 shows an example of the lateral force characteristic index map (or equivalent cornering stiffness characteristic map). Lateral force characteristic index calculating section 20 has such a lateral force characteristic index map for each of the front and rear wheels. In other words, lateral force characteristic index calculating section 20 has a front wheel lateral force characteristic index map (or equivalent lateral force characteristic index map or equivalent cornering stiffness characteristic map) for a total of the two front wheels and a rear wheel lateral force characteristic index map (equivalent lateral force characteristic index map or equivalent cornering stiffness characteristic map) for a total of the two rear wheels. For example, the lateral force characteristic index maps are stored and retained in a storage medium, such as a memory. Lateral force characteristic index calculating section 20 estimates the lateral force characteristic indexes Kf and Kr, as the before-mentioned trend, by using the lateral force characteristic index maps (the front wheel total lateral force characteristic index map and the rear wheel total lateral force characteristic index map). Thereafter, lateral force characteristic index calculating section 20 outputs the result of the estimation (lateral force characteristic indexes Kf and Kr) to stability factor calculating section 21 and vehicle behavior estimating section 22. The lateral force characteristic index can be referred to as a (tire) grip characteristic parameter.

Lateral force characteristic index calculating section 20 modifies or adjust the lateral force characteristic index maps in accordance with the wheel load change calculated by wheel load change calculating section 24. As explained with reference to FIG. 8, the characteristic curve (grip characteristic curve) representing the relationship between the ratio (Fy/βt) of lateral force Fy to slip angle βt and the tire characteristic curve tangent slope (lateral force characteristic index or grip characteristic parameter) varies in dependence on the wheel load. Specifically, the characteristic curve takes one of similar forms of different sizes in dependence on the wheel load. Accordingly, lateral force characteristic index calculating section 20 modifies the lateral force characteristic index map (map shown in FIG. 16) or maps while holding the ratio between the horizontal axis (Fyβt) and the vertical axis (the lateral force characteristic index). When, for example, a wheel load change calculated by wheel load change calculating section 24 is a decrease quantity to decrease the wheel load below the wheel load initial value, the lateral force characteristic index calculating section 20 performs a modification to reduce the characteristic curve to a smaller form among the similar forms, in accordance with the wheel load.

Lateral force characteristic index calculating section 20 may be configured to calculate a scale ratio of the lateral force characteristic index map according to a wheel load change modifying function, and to modify the lateral force characteristic index map with the scale ratio. The wheel load change modifying function is a function for determining a sum by adding the wheel load initial value of the no-variation state, to the wheel load change (or variation) calculated by wheel load change calculating section 24, and then calculating the scale ratio of the lateral force characteristic index map from a quotient obtained by dividing the sum by the initial value. Thus, lateral force characteristic index calculating section 20 modifies the lateral force characteristic index map by multiplication of the scale ratio, while holding the ratio between the horizontal axis (Fy/βt) and the vertical axis (the lateral force characteristic index.

Stability factor calculating section 21 calculates a static margin SM in accordance with the front and rear wheel lateral force characteristic indexes Kf and Kr calculated by lateral force characteristic index calculating section 20, by using a following expression (15).

[Math 15]

$$SM = -\frac{l_f K_f - l_r K_r}{(l_f + l_r)(K_f + K_r)} \quad (15)$$

Static margin SM is a quantity indicative of the ease of occurrence of drift-out. That is, stability factor calculating section 21 detects a saturated state of the lateral force in accordance with the front and rear wheel lateral force characteristic index Kf and Kr. When the grip condition of front wheels 11FL and/or 11FR reaches a limit (the tire lateral force becomes saturated), and the lateral force characteristic index Kf becomes zero or negative, the static margin calculated by stability factor calculating section 21 becomes smaller. That is, stability factor calculating section 21 decreases the static margin SM when the possibility of drift-out increases in the state (saturated state of the lateral force) in which the lateral force is not increased irrespective of an increase of the slip angle. Stability factor calculating section 21 outputs the result of the calculation (static margin SM) to vehicle behavior estimating section 22.

Vehicle behavior estimating section 22 determines whether the tendency of the turning characteristic is understeer, oversteer or neutral-steer, in accordance with the static margin SM calculated by stability factor calculating section 21. Concretely, vehicle behavior estimating section 22 judges that the turning characteristic is understeer when static margin SM is positive (SM>0). When static margin SM is negative (SM<0), vehicle behavior estimating section 22 judges that the turning characteristic is oversteer. When static margin SM is null (SM=0), vehicle behavior estimating section 22 judges that the turning characteristic has the tendency of neutral steer.

Vehicle behavior estimating section 22 outputs the result of the judgment, to the unstable behavior restraining (or suppression) assist command calculation section 23, together with the front and rear wheel lateral force characteristic indexes Kf and Kr calculated by lateral force characteristic index calculating section 20.

Unstable behavior restraining assist command calculating section 23 outputs the unstable behavior restraining assist command to EPSECU 6, in accordance with the result of the judgment and front and rear wheel lateral force characteristic indexes Kf, Kr supplied from vehicle behavior estimation section 22.

Specifically, unstable behavior restraining assist command calculating section 23 outputs the unstable behavior restraining assist command to EPSECU 6 when the judgment of vehicle behavior estimating section 22 is understeer (SM>0) and the lateral force characteristic index Kf of front wheels 11FL and 11FR calculated by lateral force characteristic index calculating section 20 tends to decrease. This unstable behavior restraining assist command is a command signal to decrease the output of EPS motor 7 depending on the degree of decrease of lateral force characteristic index Kf of front wheels 11FL and 11FR. With this command signal, the control system decreases the steering force assist torque of EPS motor 7 when the lateral force characteristic index Kf of front wheels 11FL and 11FR becomes smaller, the understeer tendency is increased, and the possibility of drift-out increases. In this case, the control system decreases the steering force assist torque so as to increase the steering reaction force as lateral force characteristic index Kf of front wheels 11FL and 11FR becomes smaller. By so doing, the control system prevents steering wheel 9 from being turned excessively by the driver. Moreover, the control system informs the driver of a decrease of the grip force of front wheel or front wheels 11FL, 11FR due to a change in the steering reaction force.

Moreover, the control system restrains a decrease of the steering force assist torque when the lateral force characteristic index Kf of front wheels 11FL and 11FR decreases, and the lateral force characteristic index Kr of rear wheels 11RL and 11RR decreases, too. By so doing, this control system can allow a rapid counter-steer and stabilize the vehicle behavior when the tendency is oversteer and the possibility of spin is higher.

Thus, from at least one lateral force characteristic index (grip characteristic parameter), the vehicle travel state estimating device 8 can estimate the dynamic turning characteristic of the vehicle, and the tendency to drift-out or tendency to vehicle spin. Moreover, vehicle travel state estimating device 8 can estimate the vehicle stability (directional stability in this practical example) from at least one lateral force characteristic index (grip characteristic parameter), and enables control to prevent decrease of the stability or to regain the stability in accordance with the estimated vehicle stability.

Figure 17:
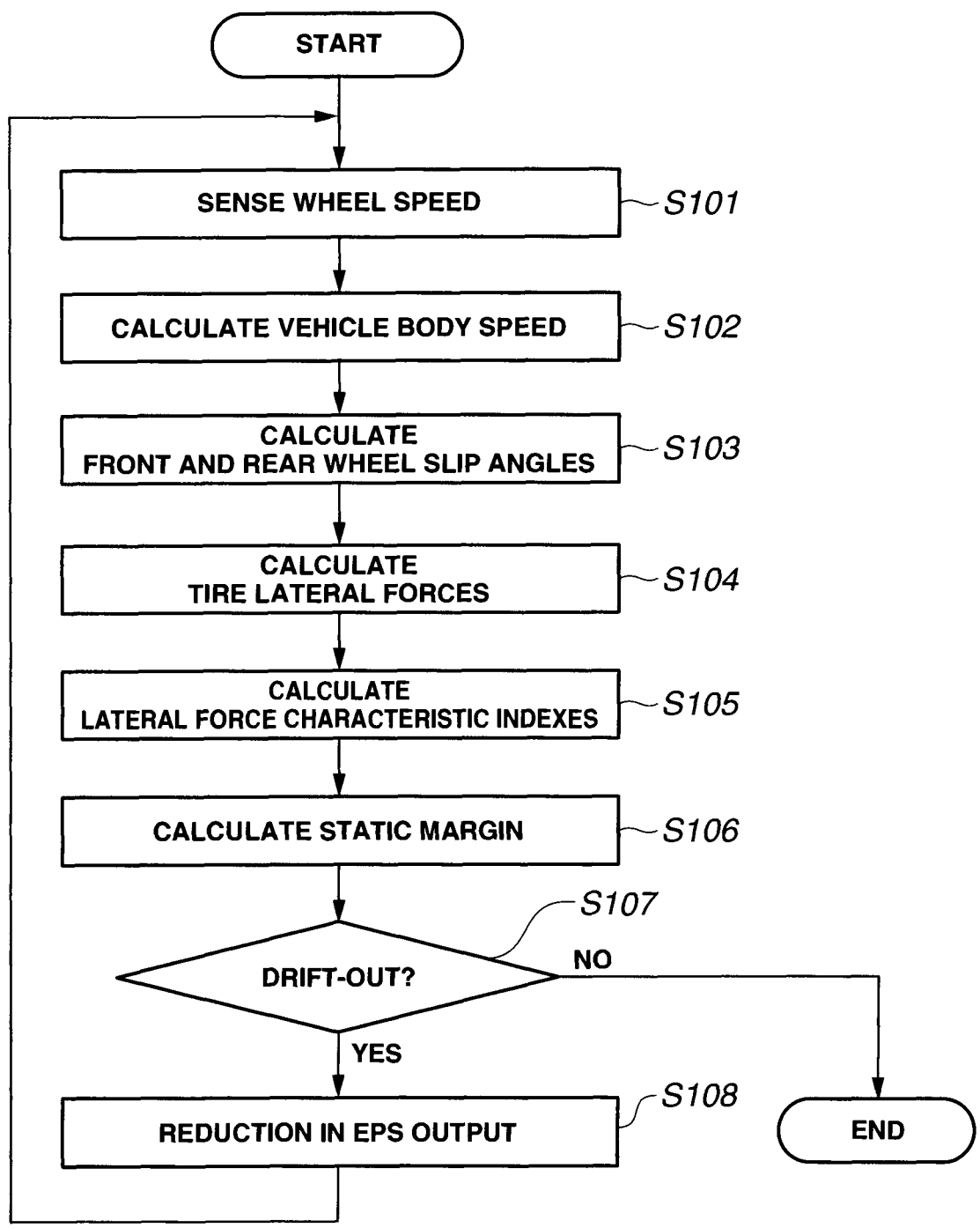
FIG. 17 is a flowchart showing a calculation process of the vehicle body travel state estimating device.

FIG. 17 shows one example of a calculation process performed in vehicle travel state estimating device 8. Estimating device 8 performs this process while the vehicle is running.

As shown in FIG. 17, after a start of the process, the vehicle travel state estimating device 8 first senses the wheel speeds of wheels 11FL~11RR with wheel speed sensor 5 at a step S101. Then, by using the wheel speeds obtained at S101, the vehicle travel state estimating device 8 calculates the vehicle body speed at a step S102 (corresponding to the operation of vehicle body speed calculating section 16).

At a step S103 (corresponding to the operation of tire slip angle calculating section 18), vehicle travel state estimation device 8 calculates the front and rear wheel slip angles βf and βr in accordance with the steering angle sensed by steering angle sensor 1, the yaw rate sensed by yaw rate sensor 2, the lateral acceleration sensed by lateral acceleration sensor 3, the longitudinal acceleration sensed by longitudinal acceleration sensor 4, and the vehicle body speed calculated at S102. At a step S104 (corresponding to the operation of tire lateral force calculating section 19), vehicle travel state estimating device 8 calculates the front and rear wheel tire lateral forces Fyf and Fyr in accordance with the yaw rate sensed by yaw rate sensor 2, the lateral acceleration sensed by lateral acceleration sensor 3, and the vehicle body speed calculated at S102.

At a step S105 (corresponding to the operation of lateral force characteristic index calculating section 20), the vehicle travel state estimating device 8 calculates the front and rear wheel lateral force characteristic indexes Kf and Kr, from the front and rear wheel slip angles βf and βr calculated at S103, and the front and rear wheel tire lateral forces Fyf, and Fyr calculated at S104, by using the front wheel total lateral force characteristic index map for the two front wheels and the rear wheel total lateral force characteristic index map for the two rear wheels. Step S105 may be composed of a substep of determining the ratio of the tire lateral force and the slip angle, and a substep of determining the lateral force characteristic index (or grip characteristic parameter) from the ratio according to a predetermined relationship (by table lookup, calculation of mathematical formulae or some other method).

At a step S106, vehicle travel state estimation device 8 calculates static margin SM in accordance with the front and rear wheel lateral force characteristic indexes Kf and Kr calculated at S105 (corresponding to the operation of stability factor calculating section 21 and vehicle behavior estimating section 22).

At a step S107, vehicle travel state estimating device 8 judges whether the vehicle is in a state having a higher possibility of drift-out (understeer tendency), in accordance with static margin SM calculated at S106. In the case of the state having a higher possibility of drift-out (e.g., SM>0), the vehicle travel state estimating device 8 proceeds to a step S108. When the vehicle is not in the state having a higher possibility of drift-out (e.g., SM≦0), the vehicle travel state estimating device 8 terminates this process (corresponding to the operations of the vehicle behavior estimating section 22 and the unstable behavior restraining assist command calculating section 23). At step S108, vehicle travel state estimating device 8 outputs the unstable behavior restraining assist command to reduce the output of EPS motor 7, to EPSECU 6 (corresponding to the operation of the unstable behavior repressing assist command calculation section 23). Thereafter, vehicle travel state estimating device 8 returns to S101.

In the first embodiment, the ratio (Fy/βt) of lateral force Fy and slip angle βt corresponds to the input which is the ratio of the wheel force and the wheel slipping degree, the slope of tangent to the tire characteristic curve corresponds to the output which is the grip characteristic parameter representing the wheel grip characteristic, the relationship of FIG. 5 corresponds to the relationship between the input and output, and the curve of FIG. 5 corresponds to the grip characteristic curve. In FIG. 5, the point at which the grip characteristic curve intersects the horizontal axis can be called a crossover point. At this crossover point, the grip characteristic parameter (the tire characteristic curve tangent slope) is equal to a critical parameter value, and the ratio of lateral force Fy and slip angle βt is equal to a critical ratio value. In this example, the critical parameter value is equal to zero. When the ratio of lateral force Fy and slip angle βt increases from the critical ratio value, the grip characteristic curve extends from the crossover point to an end point. At the end point, the grip characteristic parameter is equal to a greatest parameter value. As shown in FIG. 8, the grip characteristic curve is modified in accordance with variation of the wheel load so that the end point is shifted on and along an oblique straight line passing through the origin. In this modification, the grip characteristic curve is modified in dependence on the wheel load so as to form a family of curves extending curvilinearly along one another without intersecting with one another in the region greater than the critical ratio value. When the wheel load becomes greater, the relationship between the input and output is modified so that the end point is shifted along the straight line passing through the origin in a direction away from the origin, and the crossover point is shifted on and along the horizontal axis of FIG. 8 in a direction away from the origin.

This embodiment can be achieved in the following construction. In the illustrated example of this embodiment, the assist torque of EPS motor 7 is reduced in the case of the state having a higher possibility of drift-out. By contrast, in the case of a front wheel drive vehicle, the control system can recover the lateral force by decreasing the absolute value of the lateral force at front wheels 11FL and 11FR at the timing when the steering reaction force is made heavy, by utilizing a similar drift-out detecting logic.

In the first practical example, the vehicle behavior is controlled by EPS motor 7, that is, by adjustment of steering assist torque. In lieu thereof, the vehicle behavior may be controlled by braking/driving force control. In this case, there may be provided a braking/driving force control device (for example, electric actuator or actuators employed in a later-mentioned second embodiment). When the result of estimation of the turning characteristic, based on the difference of moments acting on the vehicle body, indicates oversteer, the driving force applied to the turning outside wheel on the outside of the turn is reduced in comparison with that of the turning inside wheel on the inside of the turn, or the braking force applied to the turning outside wheel is increased in comparison with that of the turning inside wheel. Conversely when the result of estimation of the turning characteristic, based on the difference of moments acting on the vehicle, indicates understeer, the driving force applied to the turning inside wheel is reduced in comparison with that of the turning outside wheel, or the braking force applied to the turning inside wheel is increased in comparison with that of the turning outside wheel. From the viewpoint of suppression of unstable vehicle behavior, the control method based on braking force application is higher in the safety than the control method based on driving force application. Therefore, it is preferable to employ the method of decreasing the driving torque and/or the method of increasing the braking torque.

In this practical example, tire lateral force calculating section 19 realizes or serves as a lateral force sensing means for sensing the lateral force of a wheel. Tire slip angle calculating section 18 realizes or serves as a slip angle sensing means for sensing the slip angle of the wheel. Lateral force characteristic index calculating section 20 realizes or serves as an acquiring or obtaining means for obtaining the ratio of a lateral force change to a slip angle change, corresponding to the ratio of the lateral force sensed by the lateral force sensing means, to the slip angle sensed by the slip angle sensing means, on the basis of tire friction state estimation information representing the relationship between the ratio of the wheel lateral force to the slip angle and the ratio of the lateral force change to the slip angle change. The tire friction state estimation information is such information that the ratio of the lateral force change to the slip angle change obtained for respective road surface μ values are identical to each other when the ratio of the lateral force to the slip angle obtained for respective road surface μ values are identical to each other. The tire friction state estimation information is realized in the form of the lateral force characteristic index map. Stability factor calculating section 21 realizes or serves as a tire friction state estimating means for estimating a tire friction state in accordance with the ratio of the lateral force change to the slip angle change, obtained by the obtaining means. The unstable behavior restraining assist command calculating section 23 realizes or serves as a vehicle behavior controlling means for controlling the vehicle behavior in accordance with the ratio of the lateral-force change to the slip-angle change, obtained by the obtaining means.

Furthermore, in this practical example, the information represents the relationship between the ratio of the wheel lateral force to the slip angle of the wheel and the ratio of the lateral force change to the slip angle change. By using the tire friction state estimation information that values of the ratio of the lateral force change to the slip angle change obtained for respective road surface μ values are identical to each other when values of the ratio of the lateral force to the slip angle obtained for respective road surface μ values are identical to each other, the vehicle state estimating process of estimating the tire friction state is realized by obtaining the ratio of the lateral force change to the slip angle change corresponding to the ratio of the sensed lateral force and the sensed wheel slip angle, and by estimating the tire frictional state in accordance with the obtained ratio of the lateral force change to the slip angle change.

In this practical example, in this practical example, the information represents the relationship between the ratio of the wheel lateral force to the slip angle of the wheel and the ratio of the lateral force change to the slip angle change. By using the tire friction state estimation information that values of the ratio of the lateral force change to the slip angle change obtained for respective road surface μ values are identical to each other when values of the ratio of the lateral force to the slip angle obtained for respective road surface μ values are identical to each other, the vehicle behavior controlling process of controlling the vehicle behavior is realized by obtaining the ratio of the lateral force change to the slip angle change corresponding to the ratio of the sensed lateral force and the sensed wheel slip angle, and by controlling the vehicle behavior in accordance with the obtained ratio of the lateral force change to the slip angle change.

Additionally, in this practical example, a storage medium, such as a memory, for storing the lateral force characteristic index map serves as a storage medium for storing information for vehicle state estimation. This storage medium serves as a storage medium storing information representing the relationship between the ration of the lateral force to the slip angle and the ratio of the lateral force change to the slip angle change and storing the tire friction state estimation information that values of the ratio of the lateral force change to the slip angle change obtained for various road surface mu values are equal to one another if values of the ratio of the lateral force to the slip angle obtained for various road surface mu values are equal to one another.

This practical example realizes a vehicle state estimation system comprising: means for sensing the lateral force of a wheel; means for sensing the slip angle of the wheel; and means for estimating the lateral force characteristic index in accordance with the lateral force sensed by the lateral force sensing means and the slip angle sensed by the slip angle sensing means. Moreover, this practical example realizes a vehicle behavior control system comprising: means for sensing the lateral force of a wheel; means for sensing the slip angle of the wheel; means for estimating a trend of the ratio of the lateral force change and the slip angle change in accordance with the lateral force sensed by the lateral force sensing means and the slip angle sensed by the slip angle sensing means; and means for controlling the vehicle behavior in accordance with the trend of the ratio estimated by the trend estimating means.

That is, tire lateral force calculating section 19 can serve as the lateral force sensing means. Lateral force characteristic index calculating section 20 can serve as the lateral force characteristic index estimating means or the trend estimating means. Vehicle behavior estimating section 22 can serve as the vehicle behavior controlling means. Wheel load change calculating section 24 can serve as a wheel load sensing means.

This practical example realizes a vehicle state estimating process of estimating the lateral force characteristic index in accordance with the lateral force of a wheel and the slip angle of the wheel. Moreover, this practical example realizes a vehicle control process of estimating the trend of the ratio of the lateral force change and the slip angle change in accordance with the lateral force of a wheel and the slip angle of the wheel, and of controlling vehicle behavior in accordance with the result of the estimation.

(Operations and Effects)

The system (apparatus/method) of this practical example provides the following operations and effects.

(1) The system is arranged to estimate the ratio of the lateral force change and the slip angle change as the lateral force characteristic index (the trend of the ratio) in accordance with the ratio of the wheel lateral force and wheel slip angle, and to judge the tire frictional condition of the wheel in accordance with the result of the estimation. Thus, if it is possible to sense the wheel lateral force and the wheel slip angle, the system can determine the ratio of the lateral force change and the slip angle change to estimate the tire frictional condition from the ratio of the lateral force and the slip angle. The system can estimate the tire frictional condition adequately even in the case of rapid change of vehicle behavior.

Moreover, the relationship between the ratio of the wheel lateral force and wheel slip angle and the ratio of the lateral force change the slip angle change is invariable irrespective of the road surface mu. Therefore, the system can estimate the tire frictional condition adequately without regard to the road surface mu.

Accordingly, unlike the method of estimating the tire frictional condition from the actual lateral acceleration and yaw rate (of earlier technology), the system of this practical example can estimate the tire frictional condition more adequately even at the time of rapid change of the vehicle behavior. In the case of slow spin in which the speed of change of the vehicle behavior is slow as on an icy road surface, and a four wheel drift state, the method of the earlier technology receives undesired influence of noises since the magnitudes of the lateral acceleration and yaw rate are small, so that the accuracy of sensing the lateral acceleration and the yaw rate is low and the estimation accuracy of the tire frictional condition is low. By contrast, the system of this practical example can perform the estimation by using the slip angle which is greater as compared to the lateral force and yaw rate even in the case of the speed of the vehicle behavior change being slow, so that the estimation of the tire frictional condition is accurate.

(2) The lateral force characteristic index map includes information that the ratio of the lateral force change to the slip angle change (the partial differential coefficient of the lateral force with respect to slip angle) increases as the ratio of the lateral force to slip angle increases. That is, the lateral force characteristic index map includes information that the tire friction state or the vehicle state is in a stable region or in a region near the stable region. By the use of the lateral force characteristic index map including such information, the system can determine the ratio of the lateral force change to the slip angle change easily from the ratio of the lateral force to the slip angle. As a result, the system can estimate the tire frictional condition accurately, and hence control the vehicle behavior properly. Moreover, by estimating the tire frictional state or vehicle state in the stable region or in the region near the stable region, the system can control the vehicle behavior stably.

(3) For estimation of the tire friction state, the system uses the lateral force characteristic index map composed of a characteristic curve using the ratio of the lateral force and slip angle and the ratio of the lateral force change and slip angle change as axes of the coordinate system. Alternatively, for the tire friction state estimation, the system uses a functional expression including the ratio of the lateral force and slip angle and the ratio of the lateral force change and slip angle change as variables. Therefore, the system can determine the ratio of the lateral force change and slip angle change relatively easily from the ratio of the lateral force and slip angle. Consequently, the system can estimate the tire friction state accurately and control the vehicle behavior properly.

(4) The system is arranged to modify the lateral force characteristic index map in accordance with the wheel load. The system can improve the accuracy of the estimation of the lateral force characteristic index (the ratio of the lateral force change to the slip angle change).

(5) In accordance with the wheel load, the system is arranged to modify the size of the characteristic curve represented by the lateral force characteristic index map, while holding the similar shape. That is, the system modifies the lateral force characteristic index map by utilizing the change of the lateral force characteristic index map in the manner holding the he similar shape. Therefore, the system can improve the accuracy of estimation of the lateral force characteristic index (the ratio of the lateral force change and slip angle change.

(6) The system is arranged to modify the characteristic curve of the lateral force characteristic index map in accordance with the wheel load by varying the size of the characteristic curve, retaining the similar shape of the characteristic curve so as to shift the greatest value of the characteristic curve on and along a straight line passing through the origin in the lateral force characteristic index map. That is, the greatest value of the characteristic curve of the lateral force characteristic index value map is a value indicating the ratio of the lateral force change to the slip angle change in the linear region in which the lateral force linearly varies with respect to a variation in slip angle, and the greatest value moves on the same straight line passing through the origin of the lateral force characteristic index map, depending on the wheel load. By utilizing this for the modification, the system can enhance the accuracy of estimation for the lateral force characteristic index (the ratio of the lateral force change to the slip angle change), and facilitate the modification.

(7) The system is arranged to estimate the lateral force characteristic index (the trend) which is the ratio of the lateral force change and slip angle change in accordance with the ratio of the lateral force and slip angle, and control the vehicle behavior in accordance with the result of the estimation. Therefore, when it is possible to determine the lateral force and slip angle, the system can determine the ratio of the lateral force change and slip angle change for the vehicle control, from the ratio of the lateral force and slip angle. Therefore, the system can control the vehicle behavior adequately even in the case of a rapid vehicle behavior change. Moreover, since the relationship between the ratio of the wheel lateral force and wheel slip angle and the ratio of the lateral force change and the slip angle change is invariable irrespective of the road surface mu. Therefore, the system can control the vehicle behavior adequately without regard to the road surface mu.

(8) The system is arranged to estimate the lateral force saturation condition of the front and rear wheels in accordance with the front and rear wheel lateral force characteristic indexes Kf, Kr, and to control the vehicle behavior in accordance with the estimated saturation condition. Therefore, the system can detect the tire grip condition in the lateral direction dynamically by estimating the dynamic lateral force characteristic index during vehicle motion, and thereby restrain the vehicle unstable behavior adequately.

(9) The system is arranged to estimate the dynamic turning characteristic (oversteer tendency, understeer tendency, neutral steer tendency) in accordance with the lateral force saturation conditions of the front and rear wheels, and to control the vehicle behavior in accordance with the estimated turning characteristic. Therefore, the system can grasp the turning characteristic dynamically by estimating the dynamic lateral force characteristic index during motion.

(10) The vehicle cornering state is controlled based on the estimated turning characteristic. Therefore, the system can control the vehicle behavior at an optimal timing, by using the result of accurate estimation of the tire characteristic.

(11) When the turning characteristic is estimated to be oversteer, the system controls the braking/driving force control device in a manner to decrease the driving force for the outside wheel on the outside of the turn in comparison with the inside wheel or to increase the braking force for the outside wheel in comparison with the inside wheel. By so doing, the system can more appropriately suppress an unstable vehicle behavior.

(12) When the turning characteristic is estimated to be understeer, the system controls the braking/driving force control device for braking/driving force application to the front and rear road wheels, in a manner to decrease the driving force for the inside wheel in comparison with the outside wheel or to increase the braking force for the inside wheel in comparison with the outside wheel. Therefore, the system can more appropriately suppress an unstable vehicle behavior.

(Second Practical Example According to First Embodiment)

Construction

A second practical example is explained next. The second practical example is different from the first practical example in that the vehicle behavior is controlled by producing a lateral force difference between left and right wheel, instead of the steering force.

Figure 18:
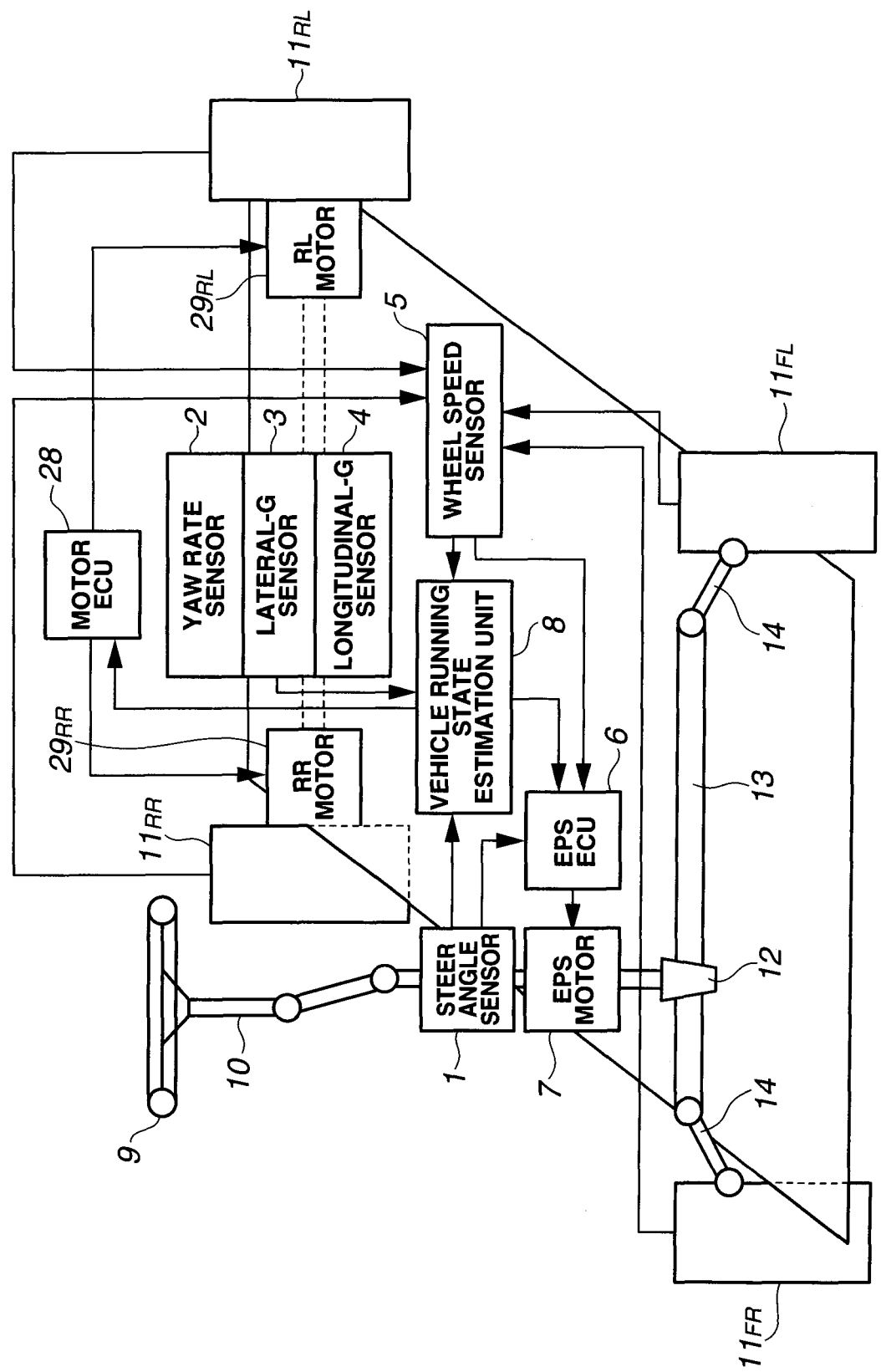
FIG. 18 is a schematic view showing the construction of a vehicle in a second practical example according to the first embodiment.

FIG. 18 is a schematic view showing the construction of a vehicle in the second practical example. As shown in FIG. 18, the vehicle of the second practical example includes a motor ECU (Electronic Control Unit) 28 for providing braking/driving torque to rear wheels 11RL and 11RR, and electric actuators 29RL and 29RR serving as the braking/driving force control device. In the second practical example, the vehicle travel (or running) state estimating device 8 estimates a travel or running state of the vehicle in accordance with the results of the sensing operations of the steering angle sensor 1, yaw rate sensor 2, lateral acceleration sensor 3, longitudinal acceleration sensor 4, and wheel speed sensor 5. Vehicle travel state estimating device 8 outputs a braking/driving command based on the result of the estimation to motor ECU 28 and electric actuators 29RL and 29RR. The braking/driving command is a command signal to control the lateral force so as to restrain unstable vehicle behavior.

Figure 19:
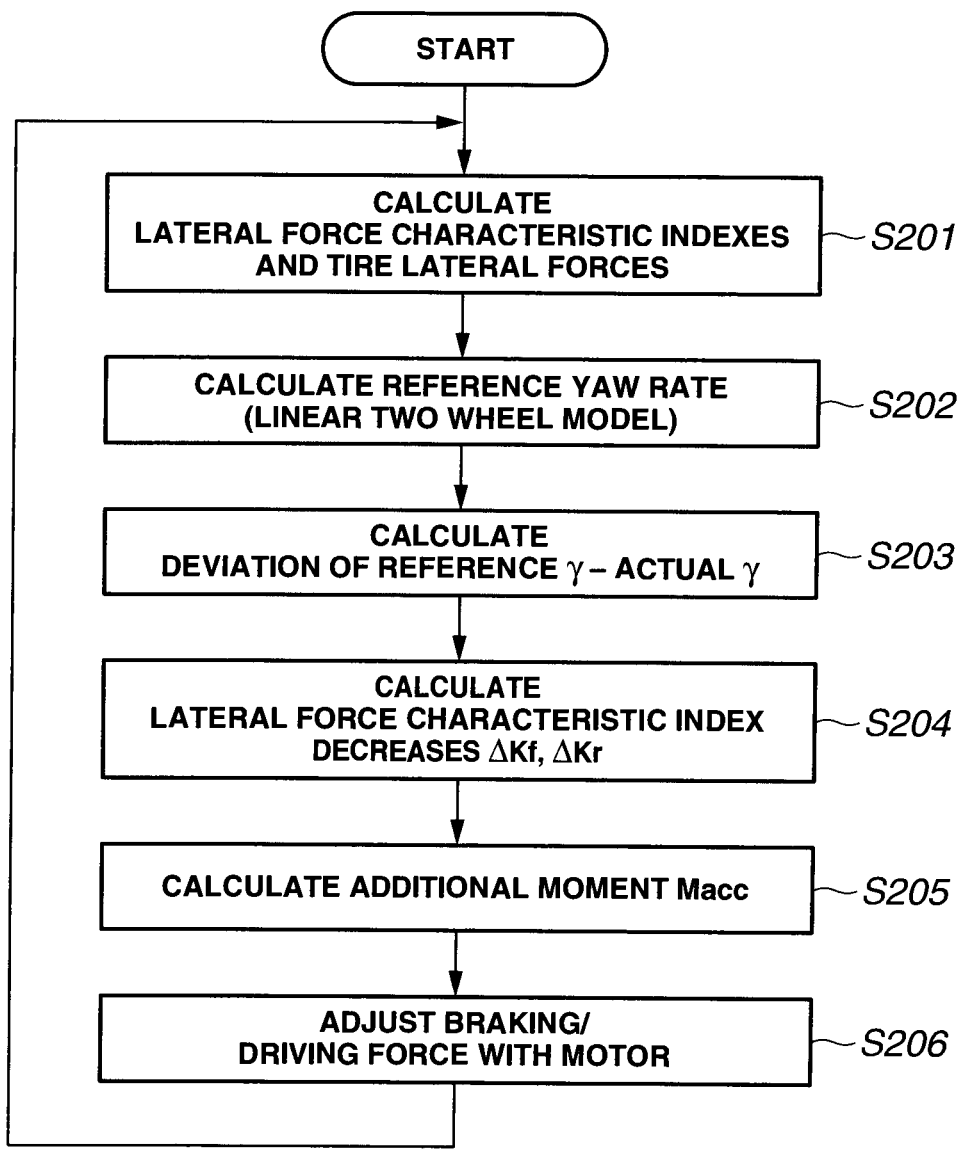
FIG. 19 is a flowchart showing a calculation process of the vehicle body traveling state estimating device.

FIG. 19 shows a calculation process in vehicle travel state estimating device 8 in the second practical example. This process is performed during motion of the vehicle.

As shown in FIG. 19, after a start of the process, the vehicle travel state estimating device 8 first calculates the lateral force characteristic index (grip characteristic parameter) and tire lateral forces at a step S201.

Figure 20:
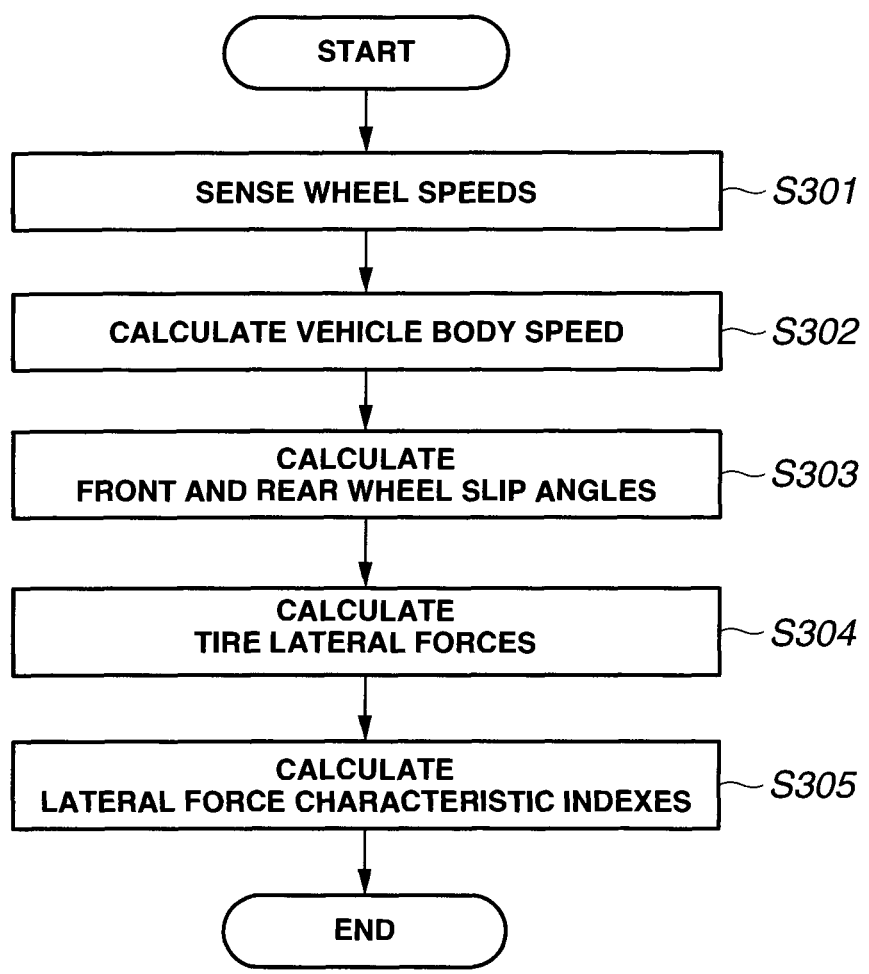
FIG. 20 is a flowchart showing a calculation process of calculating a lateral force characteristic index and a tire lateral force.

FIG. 20 shows the calculation process. As shown in FIG. 20, first, at a step S301, the estimating device 8 senses the wheel speeds of wheels 11FL~11RR with wheel speed sensor 5. Then, at a step S302 (corresponding to the operation of vehicle body speed calculating section 16), estimating device 8 calculates the vehicle body speed V in accordance with the wheel speeds obtained at S301. Subsequently, at a step S303 (corresponding to the operation of tire slip angle calculating section 18), the estimating device 8 calculates the front and rear wheel slip angles βf and βr in accordance with the steering angle sensed by steering angle sensor 1, yaw rate sensed by yaw rate sensor 2, lateral acceleration sensed by lateral acceleration sensor 3, longitudinal acceleration sensed by longitudinal acceleration sensor 4, and vehicle body speed V calculated at S302. Subsequently, at a step S304 (corresponding to the operation of tire lateral force calculating section 19), the estimating device 8 calculates the front and rear tire lateral forces Fyf and Fyr, in accordance with the yaw rate sensed by yaw rate sensor 2, the lateral acceleration sensed by lateral acceleration sensor 3, and the vehicle body speed calculated at S302. Then, at a step S305 (corresponding to the operation of the lateral force characteristic index calculating section 20), the estimating device 8 calculates the front and rear wheel lateral force characteristic indexes (grip characteristic parameters) in accordance with the front and rear wheel slip angles βf and βr calculated at S303, and the front and rear wheel tire lateral forces Fyf and Fyr calculated at S304, by using the equivalent lateral force characteristic index map (the map of the grip characteristic parameter) for the two front wheels, and the equivalent lateral force characteristic index map (the map of the grip characteristic parameter) for the two rear wheels, as shown in FIG. 16. Like step S105 of FIG. 17, the step S305 may be composed of a substep of determining the ratio of the tire lateral force and the slip angle, and a substep of determining the lateral force characteristic index (or grip characteristic parameter) from the ratio according to a predetermined relationship (as shown in FIG. 16) (by table lookup, calculation of mathematical formulae or some other method).

Subsequently, at a step S202, vehicle travel state estimating device 8 calculates a yaw rate (reference yaw rate γL-Mod) in accordance with the steering angle sensed by steering angle sensor 1 and the wheel speeds sensed by wheel speed sensor 5 (vehicle body speed) by using the linear two-wheel vehicle model. The calculated reference yaw rate (reference yaw rate γL-Mod) is a yaw rate in an ideal environment where the front and rear wheel lateral force characteristic indexes are unchanged, and the lateral force is produced in proportion to the slip angle. This reference yaw rate can be called a desired or target yaw rate.

Subsequently at a step S203, estimating device 8 calculates a difference (deviation Δγ) by subtraction of the yaw rate (actual γ) sensed by yaw rate sensor 2, from the calculated reference yaw rate γL-Mod calculated at S202.

Subsequently, at a step S204, estimating device 8 calculates front and rear wheel lateral force characteristic index decreases ΔKf and ΔKr (or grip characteristic parameter decreases or decrease quantities), in accordance with the lateral force characteristic indexes Kf and Kr calculated at S201, by using a following expression (16).

[Math 16]

$$\Delta K_f = K_f 0 - K_f$$

$$\Delta K_r = K_r 0 - K_r \qquad (16)$$

In these equations, Kf0 and Kr0 are initial values of the front and rear wheel lateral force characteristic indexed (grip characteristic parameters).

Subsequently, at a step S205, estimating device 8 calculates a deficiency in turning moment ΔM in accordance with the front and rear wheel slip angles βf and βr calculated at S201 and the front and rear wheel lateral force characteristic index decreases ΔKf and ΔKr calculated at S204, by using a following expression (17).

[Math 17]

$$\Delta M = \Delta K_f \cdot \beta f \cdot l_f - \Delta K_r \cdot \beta r \cdot l_r \qquad (17)$$

Then, estimating device 8 calculates an additional moment Macc in accordance with the turning moment deficiency ΔM calculated according to mathematical expression (17) and the deviation Δγ calculated at S203, by using a following expression (18).

[Math 18]

$$M\mathrm{acc} = K_1 \Delta M + K_2 \Delta \gamma \qquad (18)$$

In this equation, K1 and K2 are proportional constants. Additional moment Macc calculated by expression (10) is equivalent to moments calculated, respectively, according to the linear two-wheel vehicle model and the modified linear two-wheel vehicle model based on the lateral force characteristic indexes. The additional moment Macc serves as a moment to counteract the difference of moments acting on the vehicle body.

Subsequently, at a step S206, estimating device 8 outputs the braking/driving command to motor ECU 28, in such a manner as to generate the additional moment Macc calculated at S205. The braking/driving command is a command signal to control electric actuators 29RL and 29RR and to produce a longitudinal force difference between the left and right wheels. Then, vehicle travel state estimating device 8 returns to step S201.

As a way to generate a lateral force difference between left and right wheels so as to generate additional moment Macc, there are a method for applying a driving force to the outside wheel in the direction of additional moment Macc, and a method for applying a braking force to the inside wheel in the direction of additional moment Macc. From the viewpoint of suppressing unstable vehicle behavior, the method based on braking force application is higher in the safety than the method based on driving force application. Therefore, the method for decreasing the driving torque and the method for increasing the braking torque are preferable.

In the second practical example, attention is given to the difference in moments acting on the vehicle body, and the moment Macc is calculated so as to cancel the moment difference. Instead of the difference of moments, it is possible to calculate the moment in consideration of another quantity. For example, the moment is calculated in consideration of yaw angular acceleration acting on the vehicle. In this case, the linear two wheel vehicle model is modified by using the linear two wheel vehicle model and the lateral force characteristic index or indexes, and the system calculates a difference of yaw angular accelerations acting on the vehicle body by using the modified linear two wheel model and the sensed vehicle body speed and steering angle. Then, the system produces a lateral force difference between left and right wheels so as to produce a moment to cancel the calculated yaw angular acceleration difference.

(Operations and Effects)

The second practical example can provide following operations and effects.

(1) The counteracting moment (additional moment Macc) is calculated for counteracting a difference of moments acting on the vehicle body, calculated, respectively, by the linear two wheel vehicle model, and a modified linear two wheel model modified by the lateral force characteristic index. Then, the system produces a left and right wheel lateral force difference to produce the moment (additional moment Macc). In some cases, the lateral force characteristic index becomes lower during vehicle motion, and hence the actual lateral force decreases below the tire lateral force calculated based on the linear two wheel model based on the assumption that the lateral force characteristic index is invariable. In this case, the system can control the vehicle behavior at an adequate timing even if a deviation is generated between the lateral force of the linear two wheel model and the actual lateral force.

In the method (of earlier technology) for preventing spin and drift out merely by comparing the reference yaw rate γL-Mod and the actual yaw rate γ, and controlling the left and right wheel lateral forces so as to reduce the deviation Δγ of these yaw rates to zero, the system is unable to start the control until an unstable behavior is generated and influence of the unstable behavior becomes detectable in the actual yaw rate. Accordingly, the response of the lateral force control is delayed.

(2) The linear two wheel vehicle model is modified by using the linear two wheel model and the lateral force characteristic index. Then, in accordance with the sensed vehicle body speed and steering angle, the system calculates the counteracting moment for counteracting or eliminating the difference of yaw angular accelerations calculated by the respective linear two wheel vehicle models. In this way, the system can control the vehicle behavior timely.

(Third Practical Example According to First Embodiment)
(Construction)

A third practical example according to the first embodiment is explained next. The third practical example is different from the first practical example in that the steering assist torque is reduced on a low μ road.

Figure 21:
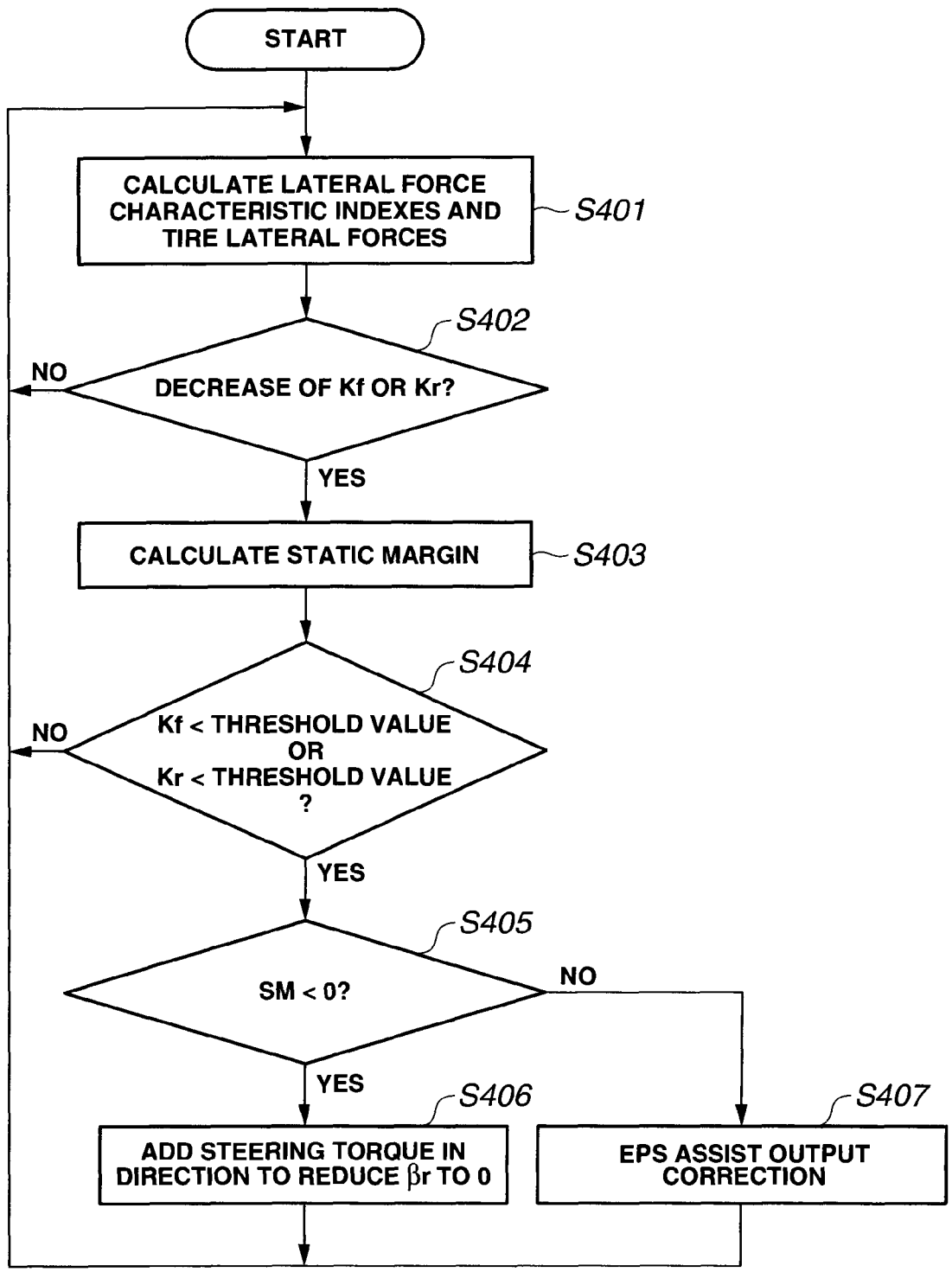
FIG. 21 is a flowchart showing a calculation process of the vehicle body travel state estimating device in a third practical example according to the first embodiment.

FIG. 21 shows the calculation process in the vehicle body travel (or running) state estimating device 8 according to the third practical example. The process is executed during vehicle motion.

As shown in FIG. 21, first at a step S401 after a start of the process, the vehicle travel state estimating device 8 calculates the front and rear lateral force characteristic indexes Kf and Kr and the front and rear wheel tire lateral forces Fy (Fyf, Fyr). Specifically, like FIG. 20, the estimating device 8 calculates the front and rear wheel lateral force characteristic indexes Kf and Kr and the front and rear wheel tire lateral forces Fy in accordance with the steering angle sensed by steering angle sensor 1, the yaw rate sensed by yaw rate sensor 2, the wheel speeds of wheels 11FL~11RR sensed by wheel speed sensor 5, the lateral acceleration sensed by lateral acceleration sensor 3, and the longitudinal acceleration sensed by longitudinal acceleration sensor 4.

Then, at a step S402, estimating device 8 checks whether at least one of the front and rear wheel lateral force characteristic indexes Kf and Kr calculated at S401 becomes smaller. The estimating device 8 proceeds to a step S403 when either of Kf and Kr decreases, and returns to step S401 when neither of Kf and Kr decreases.

At step S403, estimating device 8 calculates the static margin SM from front and rear wheel lateral force characteristic indexes Kf and Kr calculated at S401.

Then, at a step S404, estimating device 8 checks whether either of the front and rear wheel lateral force characteristic indexes Kf and Kr is smaller than a predetermined threshold value. For example, the predetermined threshold value is set equal to a half of the initial value of the lateral force characteristic index in the linear region. When either or both of the front and rear lateral force characteristic indexes Kf and Kr is smaller than the threshold value, the estimating device 8 proceeds to a step S405. When both the front and rear wheel lateral force characteristic indexes Kf and Kr are greater than or equal to the threshold value, the estimating device 8 returns to S401.

At step S405, estimating device 8 checks whether the static margin SM calculating at S403 is smaller than zero or not, that is, whether the turning characteristic is oversteer or not. Vehicle travel state estimating device 8 proceeds to a step S406 when static margin SM is smaller than zero (SM<0), and proceeds to a step S407 when static margin SM is greater than or equal to zero (SM≧0).

At step S406, vehicle running state estimating device 8 outputs an unstable behavior restraining assist command to EPS motor 7. This unstable behavior restraining assist command is a command signal to control the output of EPS motor 7 so as to control the slip angler βr of rear wheels 11RL and 11RR to zero. Then, the estimating device 8 returns to S401.

At step S406, the vehicle travel state estimating device 8 may control the braking/driving force control device (such as electric actuator or actuators) for imparting the braking/driving force to the front and rear wheels, so as to decrease the absolute value of the braking/driving force of rear wheels 11RL and 11RR. As a way for decreasing the absolute value of the braking/driving force, there is a method of decreasing the absolute value of the braking/driving force of each wheel. In this case, it is possible to recover the lateral force characteristic index from a decreased level.

At step S407, vehicle travel state estimating device 8 outputs an unstable behavior restraining assist command based on the sensed road surface mu, to EPSECU 6. This unstable behavior restraining assist command is a command signal to decrease the output of EPS motor 7 with a decrease in the road surface mu. For example, the unstable behavior restraining assist command is determined by using an EPS output adjustment map. After the output operation of the unstable behavior restraining command, the estimating device 8 returns to S401.

Figure 22:
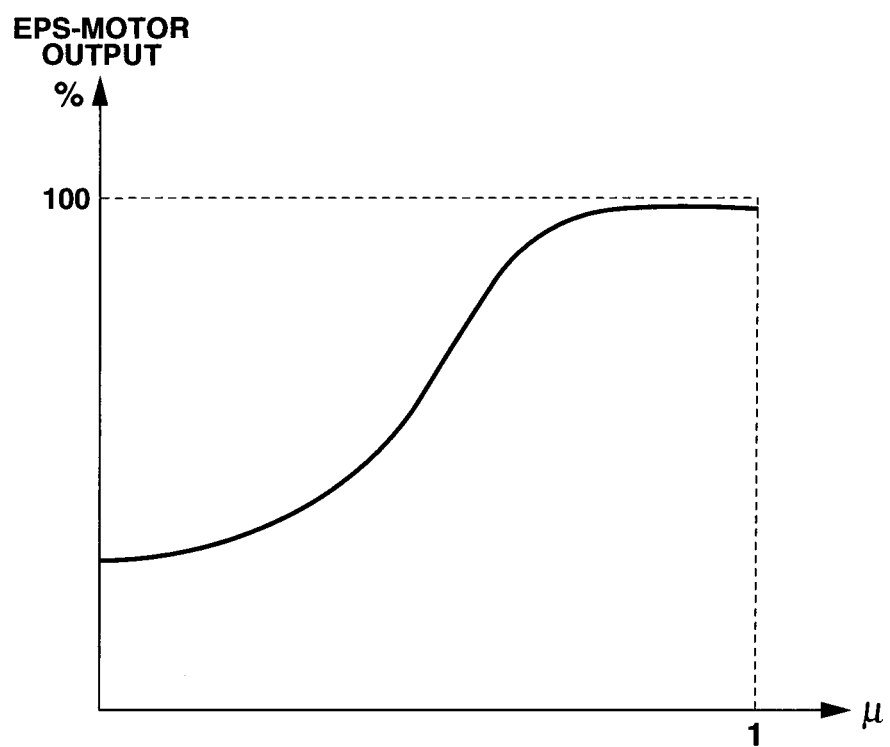
FIG. 22 is a characteristic view illustrating an EPS output adjustment map.

FIG. 22 shows an example of the EPS output adjustment map. As shown in FIG. 22, the EPS output adjustment map is a map for decreasing the output of EPS motor 7 as the road surface μ decreases.

In this practical example, EPSECU 6 serves as steering force assist means for assisting the steering force of the driver.

(Operations and Effects)

The third practical example can provide the following operations and effects.

(1) When the front wheel lateral force characteristic index decreases, and static margin SM becomes negative, the turning characteristic is oversteer. Namely, the system estimates that the front wheel lateral force approaches the saturation, and hence controls the steering assist torque with EPS motor 7 so as to decrease slip angle βr of rear wheels 11RL and 11RR (step S406). Therefore, the system can initiate the steering assistance before the vehicle behavior falls into an unstable state, and thereby improve the effect of prevention of, and recovery from, an unstable vehicle behavior.

(2) When the front wheel lateral force characteristic index decreases and static margin SM becomes negative, the turning characteristic is oversteering. Namely, the system estimates that the front wheel lateral force approaches the saturation, and controls the braking/driving force control device for braking/driving force application, so as to decrease the absolute value of the braking/driving force of rear wheels 11RL and 11RR, so that the tire frictional force can be used in the lateral direction. Therefore, the system can initiate the steering assistance before the vehicle behavior falls into an unstable state, and thereby improve the effect of prevention of, and recovery from, an unstable vehicle behavior.

(3) When static margin SM is negative and hence the vehicle has oversteer tendency, the system controls the steering assist torque of EPS motor 7 so as to decrease the slip angle βr of rear wheels 11RL and 11RR. By so doing, the system can achieve a function corresponding to counter-steer for suppressing undesirable spin.

(4) When static margin SM is greater than or equal to zero, and hence the vehicle has understeer tendency or neutral steer tendency, the steering assist torque is decreased as the road surface mu decreases. Thus, the system can suppress undesirable quick steering action.

In order to prevent drift-out g due to quick steering action during vehicle running operation on a low μ road such as icy or snow road, one method is arranged to make heavier the steering reaction force by merely reducing the steering assist torque. However, such as method might disturb counter-steer in case of spin behavior.

(Second Embodiment)
(Technology Underlying Second Embodiment)

First, the explanation is directed to technology on which the second embodiment is based.

Figure 23:
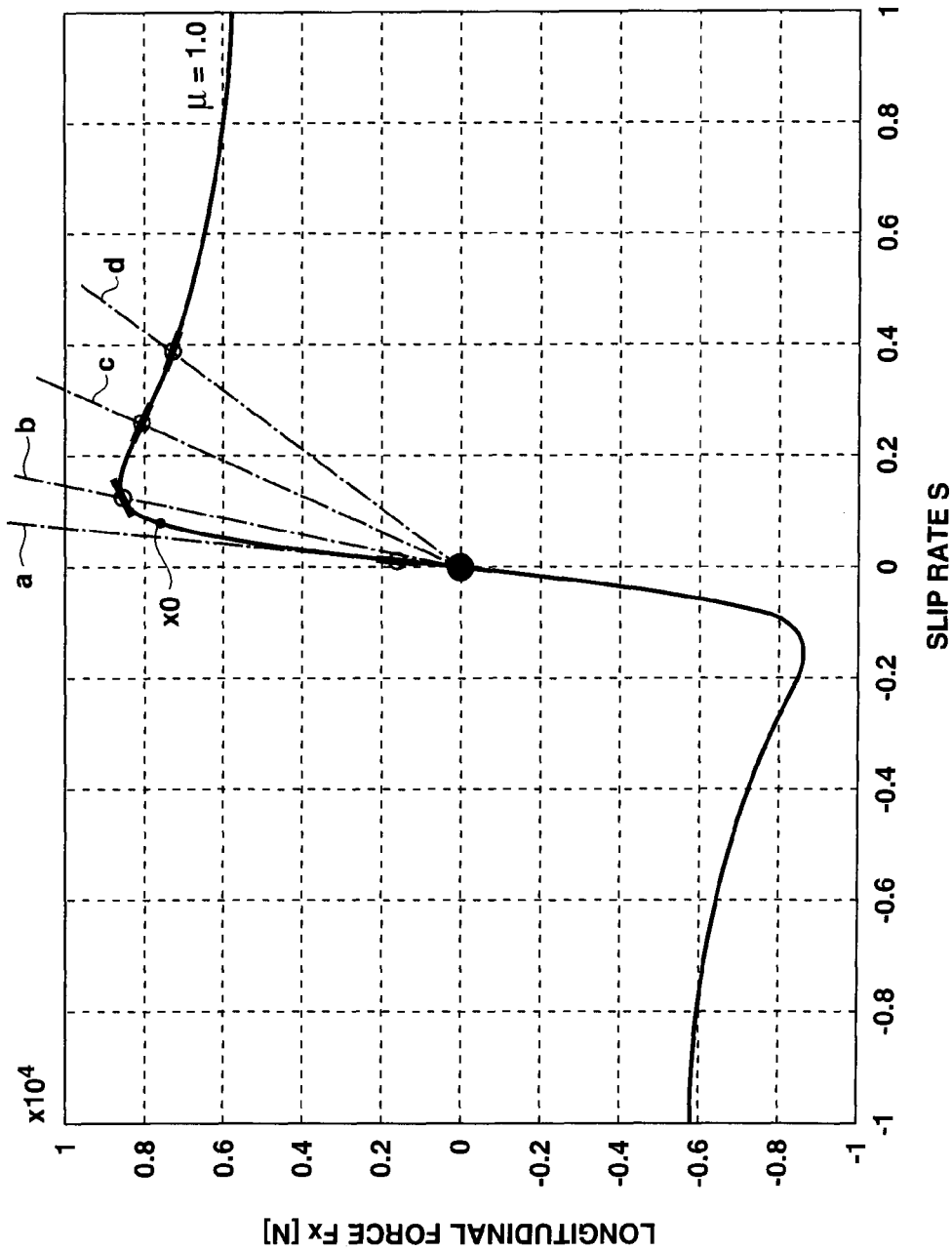
FIG. 23 is a view for illustrating technology underlying a second embodiment of the present invention, and more specifically a characteristic view showing a tire characteristic curve.

FIG. 23 shows a tire characteristic curve, which represents a general relationship between a drive wheel slip rate or ratio S (λ) and a drive wheel longitudinal force Fx. In the second embodiment, the slip rate S(λ) corresponds to the wheel slip or slipping degree, and the longitudinal force or braking/driving force corresponds to the wheel force.

As shown in FIG. 23, in the tire characteristic curve, the relationship between slip rate S and longitudinal force Fx changes from linear to nonlinear as the absolute value of slip rate S βt increases. That is, the relationship between slip rate S and longitudinal force Fx is linear when slip rate S is in a predetermined range from zero. The relationship between slip rate S and longitudinal force Fx becomes nonlinear when slip rate S (absolute value) increases. Thus, the tire characteristic curve includes a linear segment and a nonlinear segment.

In the nonlinear region in the example of FIG. 23, an increase rate of the longitudinal force Fx with respect to slip ratio S becomes smaller in the vicinity of the position where slip rate S is equal to 0.1. In the vicinity of slip ratio S being 0.15, the longitudinal force Fx reaches a greatest value. Thereafter, longitudinal force Fx decreases as slip ratio S increases. Such relation is clear when attention is directed to the slope (or gradient) of a tangent line to the tire characteristic curve.

The slope of the tangent line to the tire characteristic curve can be expressed by a ratio of a change in slip rate S and a change in longitudinal force Fx, that is a partial differential coefficient of longitudinal force Fx with respect to slip rate S. The slope of tangent to the tire characteristic curve (corresponding to a grip characteristic parameter) can be seen as the slope of a tangent line to the tire characteristic at an intersection point (marked by ○ in FIG. 23) between the tire characteristic curve and an arbitrary straight line a, b, c . . . intersecting the tire characteristic curve. It is possible to estimate the frictional state of a tire if a position on such a tire characteristic curve can be determined, that is if slip rate S and longitudinal force Fx are known. When, for example, the location is at a point x0 which is in the nonlinear region on the tire characteristic curve but which is close to the linear region, as shown in FIG. 23, then it is possible to estimate that the tire friction state is stable. From the judgment that the tire friction state is stable, it is possible to estimate that the tire is still at a level capable of achieving its performance properly, or the vehicle is in a stable state.

Figure 24:
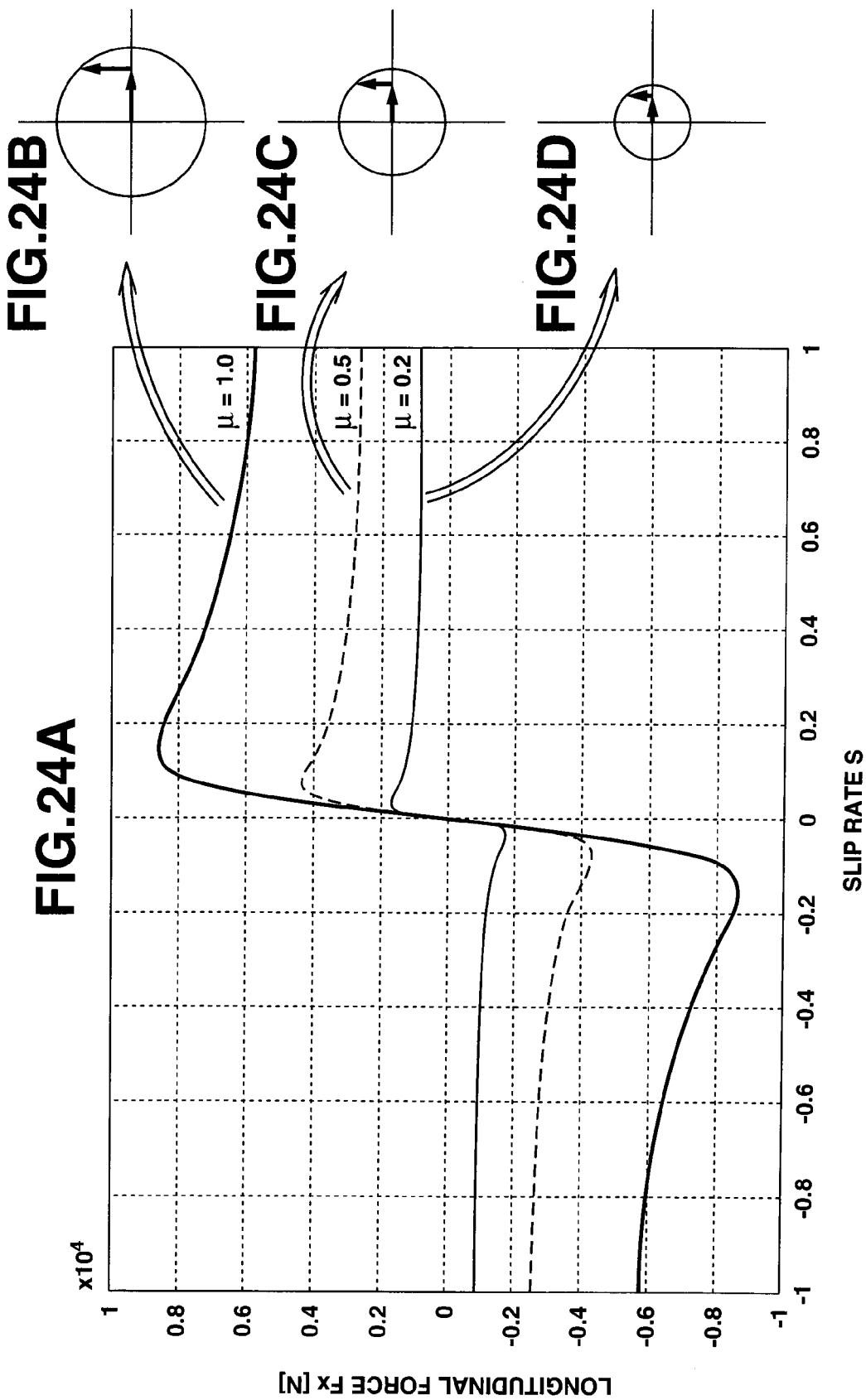
FIG. 24 is a view for illustrating the technology underlying the second embodiment, and more specifically a characteristic view tire characteristic curves and friction circles for various value of the road surface μ.

FIG. 24 shows tire characteristic curves and friction circles for various road surface μ values. FIG. 24(a) (or 24A) shows tire characteristic curves for various road surface μ values, and FIGS. 24(b)(24B), 24(c)(24C) and 24(d)(24D) show the friction circles for the various road surface μ values. The road surface μ is equal to 0.2, 05 or 1.0 in this example. As shown in FIG. 24(a)(24A), the tire characteristic curves for the different road surface friction coefficient μ values have tendencies similar to one another qualitatively. As shown in FIGS. 24(b)(24B)~24(d)(24D), the friction circle becomes smaller as the road surface μ becomes lower. Namely, the lower the road surface friction coefficient μ, the smaller the longitudinal force that can be allowed by the tire.

Figure 25:
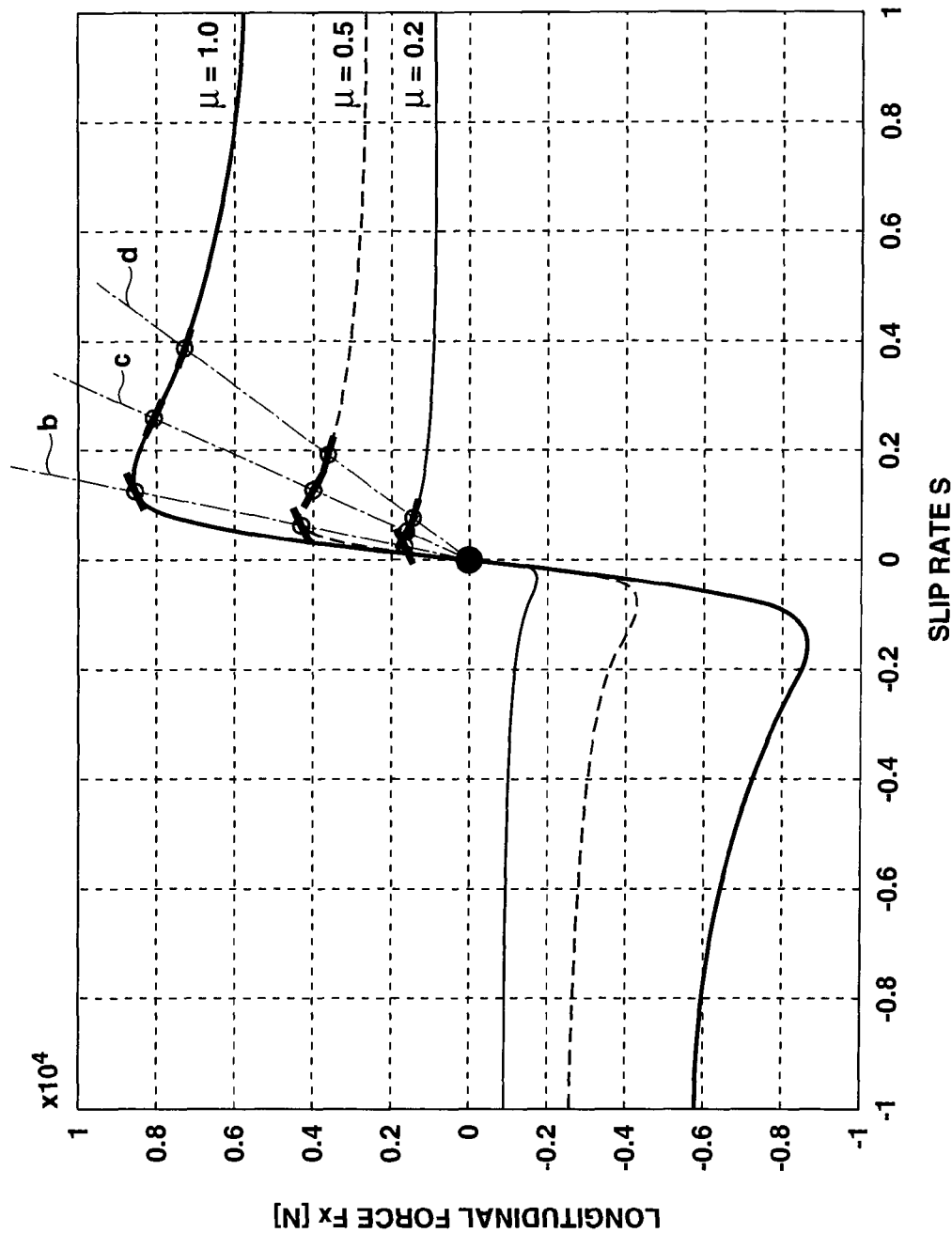
FIG. 25 is a view for illustrating the technology underlying the second embodiment, and more specifically a characteristic view showing the tangent slope of each of the tire characteristic curves of different road surface μ values at an intersection point with a straight line passing through the original of the tire characteristic curve.

FIG. 25 shows relationships between the tire characteristic curves of different road surface μ values and predetermined straight lines b, c and d passing through the origin. As shown in FIG. 25, in the same manner as in FIG. 23, the slope of tangent to each of the tire characteristic curves of the different road surface μ values is determined at an intersection point of the tire characteristic curve and each straight line b, c or d. In other words, the respective slopes of tangents to the tire characteristic curves of the different road surface μ values are determined at respective intersection points with the straight line b. The respective slopes of tangents to the tire characteristic curves of the different road surface μ values are determined at respective intersection points with the straight line c. The respective slopes of tangents to the tire characteristic curves of the different road surface μ values are determined at respective intersection points with the straight line d. By determining the slopes of tangents to the tire characteristic curves in this way, it is possible to obtain the result that the slopes of tangents to the tire characteristic curves at intersections of the same straight line are equal to one another.

Figure 26:
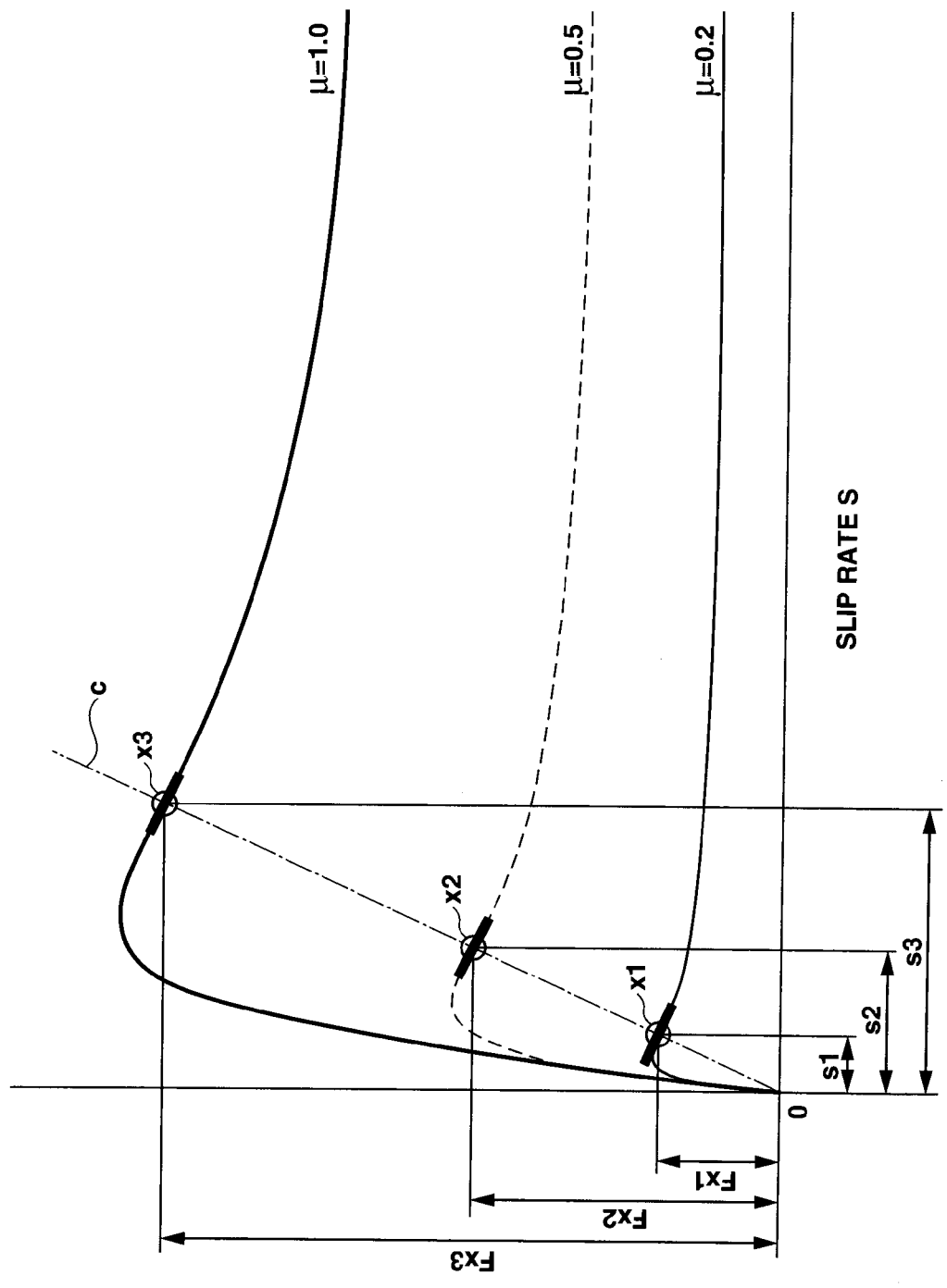
FIG. 26 is a view for illustrating the technology underlying the second embodiment, and more specifically another characteristic view showing the tangent slope of each of the tire characteristic curves of different road surface μ values at an intersection point with a straight line passing through the original of the tire characteristic curve.

In FIG. 26, attention is paid to the straight line c shown in FIG. 25, as an example. As shown in FIG. 26, the slopes of tangents to the tire characteristic curves of the different road surface μ values at intersection points with the straight line c are equal to one another. In other words, the ratio (Fx1/S1) of the longitudinal force Fx1 and slip rate S determining the intersection point x1 with the tire characteristic curve of the road surface μ=0.2, the ratio (Fx2/S2) of the longitudinal force Fx2 and slip ratio S2 determining the intersection point x2 with the tire characteristic curve of the road surface μ=0.5 and the ratio (Fx3/S3) of the longitudinal force Fx3 and slip rate S3 determining the intersection point x3 with the tire characteristic curve of the road surface μ=1.0 are all equal to the same value. The slopes of the tire characteristic curves of the different road surface μ values are equal to one another at these intersection points x1, x2 and x3.

Figure 47:
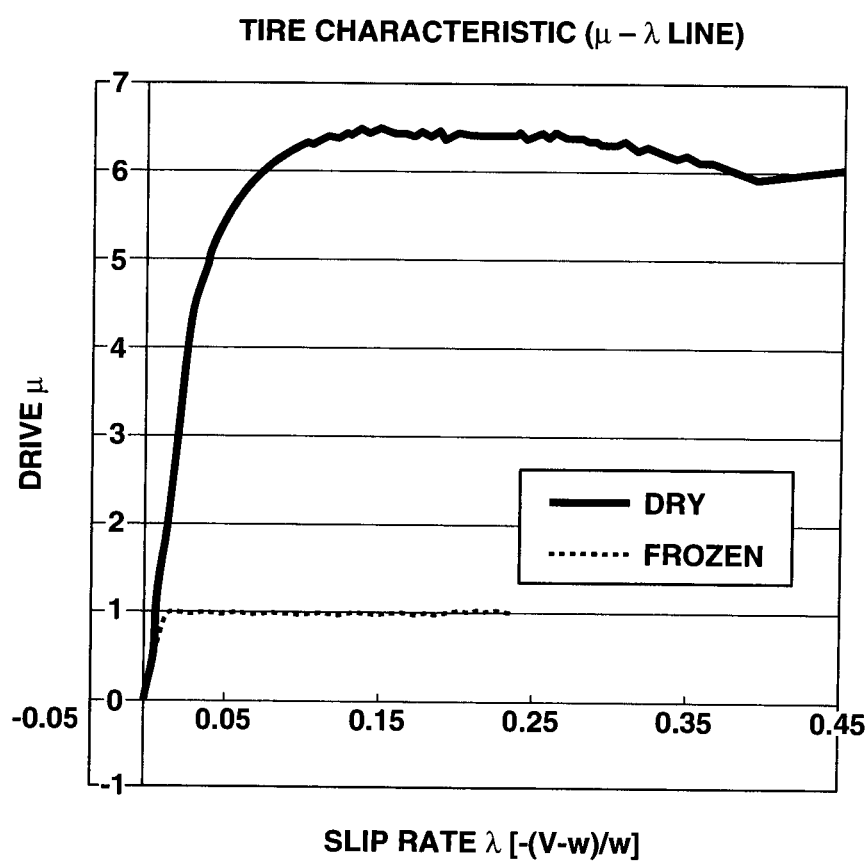
FIG. 47 is a graphic view showing the results of normal tire characteristic test for verifying the technology underlying the second embodiment in the longitudinal direction.
Figure 48:
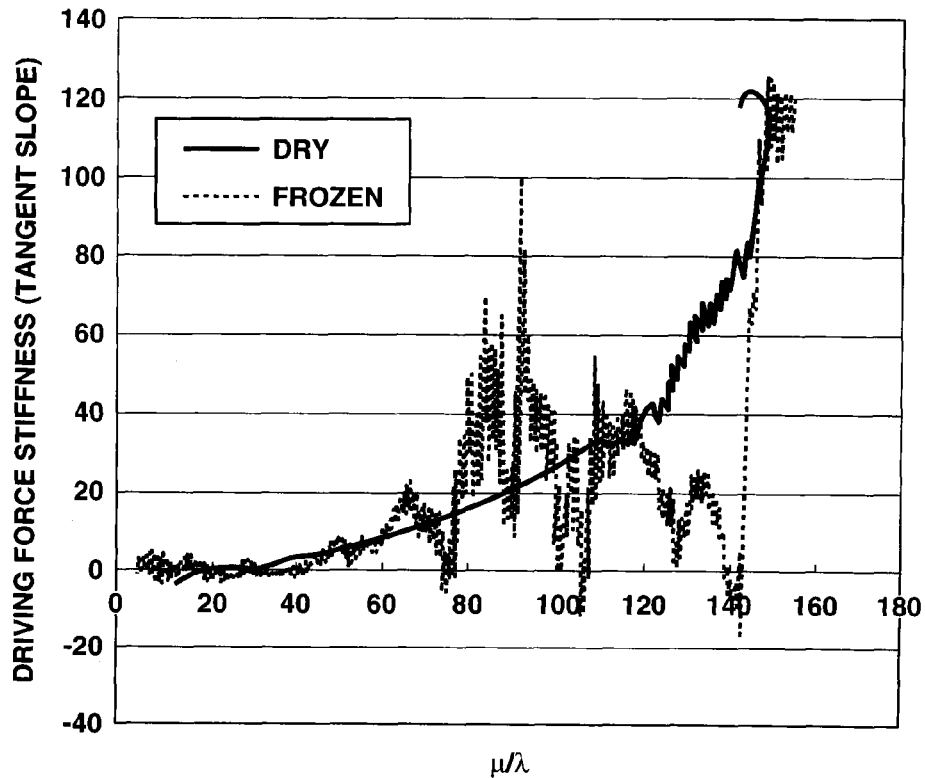
FIG. 48 is a graphic view showing a normal tire Cp map for verifying the underlying technology in the case of the longitudinal direction.

FIGS. 47 and 48 are views showing the results of experiments for verifying the principle of stability measurement shown in FIGS. 25 and 26. FIG. 47 shows the results of normal tire characteristic test, in the form of a μ-λ diagram representing a tire characteristic between drive μ and the slip rate $\lambda[-(V-w)/w]$. FIG. 48 shows a normal tire Cp map obtained by organizing the experimental results according to the principle of the stability measurement, and the experimental results show that a single characteristic can be obtained collectively without regard to the magnitude of the road surface mu. The vertical axis of FIG. 48 represents a driving force stiffness (tangent slope), and the horizontal axis represents the ratio of the drive μ and λ.

FIGS. 44, 45 and 46 can be used also for verifying the principle of driving time stability measurement (or stiffness estimating technique at the time of driving operation) with the theoretical model.

<Stiffness estimation in driving operation> Driving force Fx can be expressed by a following mathematical expression (19) when calculated at the time of application of a driving torque in the brush model (from a full grip state to a full slip state).

[Math 19]

$$Fx = -K_s \lambda \left(1 - \frac{K_s}{3\mu F_z}\lambda\right)^2 - 3\mu F_z \left(\frac{1}{6} - \frac{1}{2}\left(1 - \frac{K_s}{3\mu F_z}\lambda\right)^2 + \frac{1}{3}\left(1 - \frac{K_s}{3\mu F_z}\lambda\right)^3\right)$$

In this equation, symbols are defined as follows:

μ: Road surface friction coefficient (coefficient determining a greatest frictional force which can be produced between the tire and the road surface)

$K_s$: Tire stiffness in the longitudinal direction

λ: Slip rate (or ratio) at the time of driving (the formula is different at the time of braking)

[Math 20]

$$\lambda = \frac{u - R_0 \varpi}{R_0 \varpi}$$

This equation of Fx can be rewritten as a following mathematical expression by rearranging the equation with respect to the slip rate λ (s), and collecting coefficients other than μ as constant.

[Math 21]

$$Fx = A\lambda + \frac{B}{\mu}\lambda^2 + \frac{C}{\mu^2}\lambda^3$$

In this equation, A, B and C are constants not dependent on the road surface condition.

Figure 49:
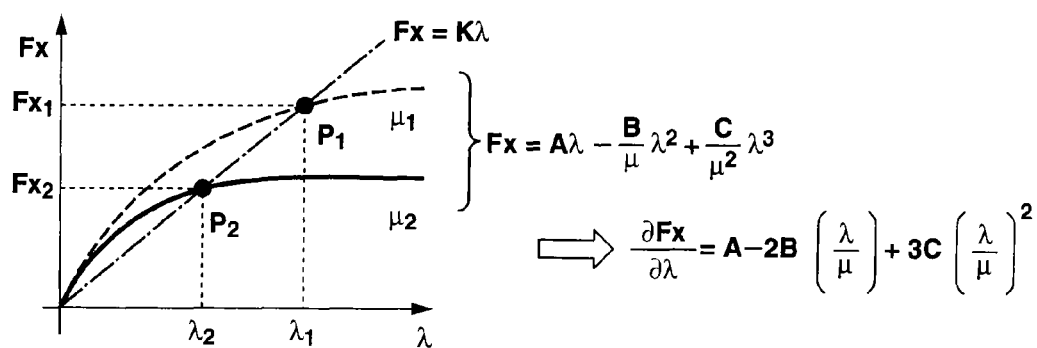
FIG. 49 is an Fx-λ diagram at the time of driving operation for explaining the underlying technology in the case of the longitudinal direction theoretically.

In this example, the tire has an Fx-λ characteristic as shown in FIG. 49. FIG. 49 is a graph showing characteristic difference due to road surface difference with the same tire. This graph further includes an auxiliary line extending from the origin and having a slope K. Points P1 and P2 are intersection points at which this auxiliary line intersects tire characteristic curves of road surface friction coefficients μ1 and μ2, respectively. Following mathematical expressions for P1 and P2 are obtained by setting the equations of the characteristic curve and the auxiliary line simultaneously at each of points P1 and P2 (expression 22 for P1, and expression 23 for P2).

[Math 22]

$$Fx_1 = A\lambda_1 - \frac{B}{\mu_1}\lambda_1^2 + \frac{C}{\mu_1^2}\lambda_1^3 \quad (22)$$

$$Fx_1 = K\lambda_1$$

[Math 23]

$$Fx_2 = A\lambda_2 - \frac{B}{\mu_2}\lambda_2^2 + \frac{C}{\mu_2^2}\lambda_2^3 \quad (23)$$

$$Fx_2 = K\lambda_2$$

A following mathematical expression (24) is obtained by rearrangement of these four equations for K.

[Math 24]

$$K = A - B\left(\frac{\lambda_1}{\mu_1}\right) + C\left(\frac{\lambda_1}{\mu_1}\right)^2 \quad (24)$$

$$= A - B\left(\frac{\lambda_2}{\mu_2}\right) + C\left(\frac{\lambda_2}{\mu_2}\right)^2$$

As shown in FIG. 49, λ and μ are always positive, and points P1 and P2 are located on the auxiliary line Fx=Kλ. Therefore, a following equation of ratios is obtained.

[Math 25]

$$\mu_1:\mu_2 = Fx_1:Fx_2 = \lambda_1:\lambda_2 \quad (25)$$

The slope of tangent to the tire characteristic curve can be defined by a following expression.

[Math 26]

$$\frac{\partial Fx}{\partial \lambda} = A - 2B\left(\frac{\lambda}{\mu}\right) + 3C\left(\frac{\lambda}{\mu}\right)^2 \quad (26)$$

Substitution of values at points P1 and P2 into this partial differential equation yields:

[Math 27]

$$\frac{\partial Fx_1}{\partial \lambda_1} = A - 2B\left(\frac{\lambda_1}{\mu_1}\right) + 3C\left(\frac{\lambda_1}{\mu_1}\right)^2 \quad (27)$$

$$= A - 2B\left(\frac{\lambda_2}{\mu_2}\right) + 3C\left(\frac{\lambda_2}{\mu_2}\right)^2 = \frac{\partial Fx_2}{\partial \lambda_2}$$

Thus, it is proved that the slopes of tangents at points P1 and P2 are equal to each other.

Figure 27:
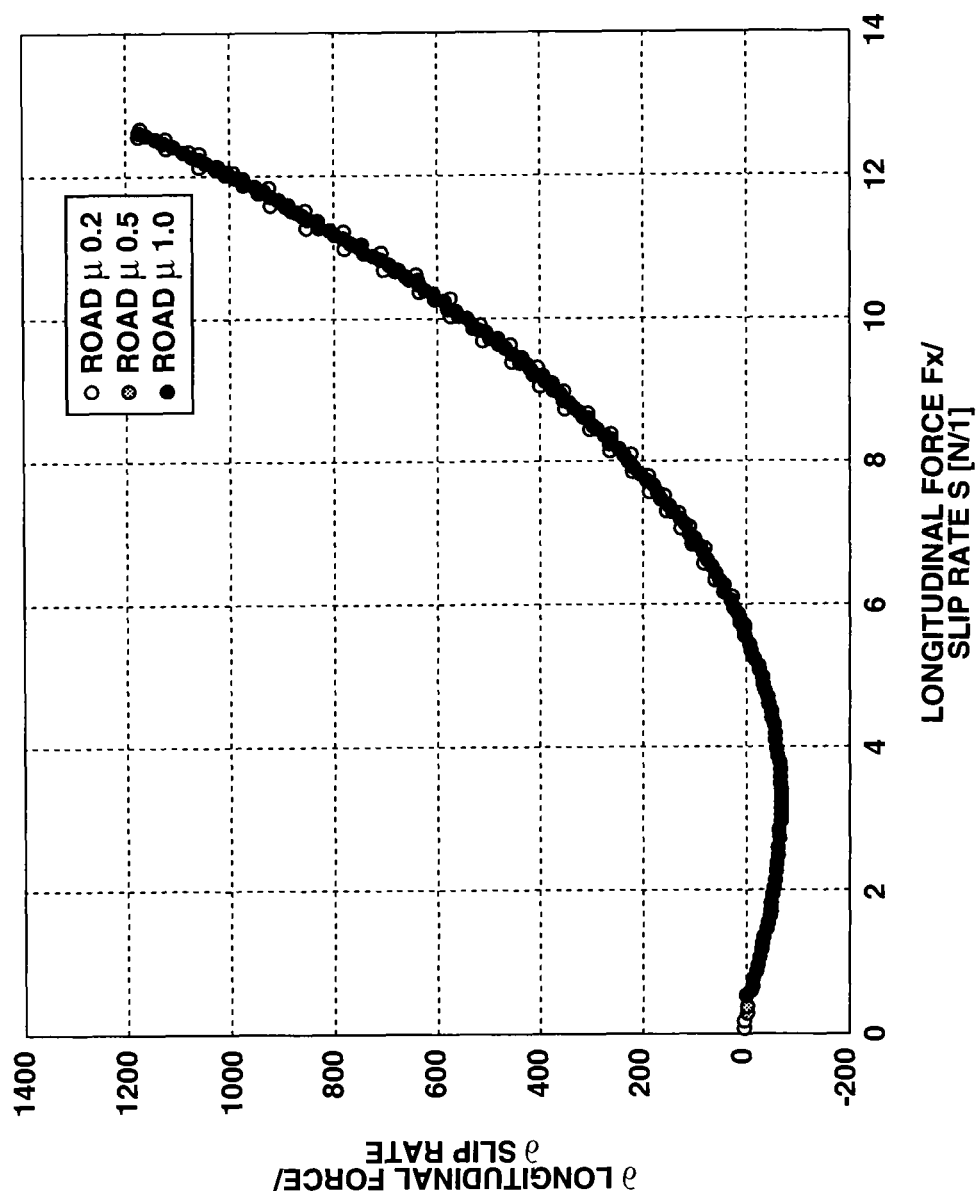
FIG. 27 is a view for illustrating the technology underlying the second embodiment, and more specifically a view showing characteristic composed of a set of plot points between a ratio (Fx/S) of a longitudinal force Fx and a slip rate S representing an intersection point of an arbitrary straight line and a tire characteristic curve, and the tangent slope of the tire characteristic curve at the intersection point.

FIG. 27 shows a relationship of the ratio (Fx/S) of longitudinal force Fx to slip rate S (λ) expressing an intersection point between an arbitrary straight line and a tire characteristic curve, and the tangent slope (∂Fx/∂S)(gradient) of the tire characteristic curve (that is, the slope of a tangent to the tire characteristic curve) at the intersection point. In FIG. 27, values obtained with various road surface mu values (μ=0.2, 0.5, and 1.0, in this example) are plotted. As shown in FIG. 27 without regard to the road surface μ, there is an invariable relationship between the ratio (Fx/S) of longitudinal force Fx to slip rate S, and the tangent slope of the tire characteristic curve.

Figure 28:
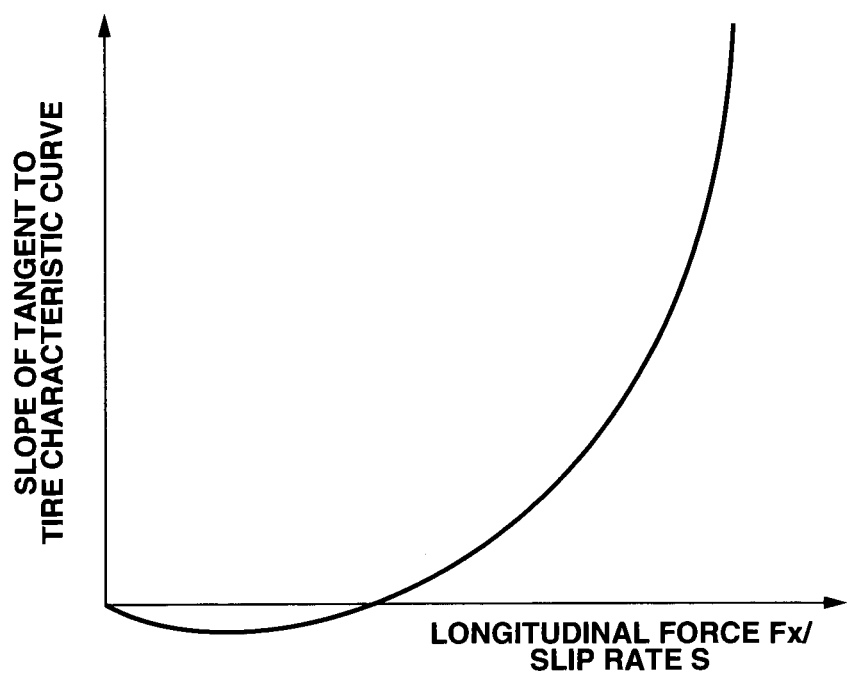
FIG. 28 is a view for illustrating the technology underlying the second embodiment, and more specifically a characteristic view showing a characteristic curve (grip characteristic curve)(longitudinal force characteristic index map) obtained from the plot points of FIG. 27.

FIG. 28 shows a characteristic curve (grip characteristic curve) obtained from plot points of FIG. 27. As shown in FIG.

28, this characteristic curve shows that the ratio (Fx/S) of longitudinal force Fx to slip rate S, and the tangent slope of the tire characteristic curve (corresponding to the grip characteristic parameter) are related by a constant relation without regard to the road surface μ. Therefore, the characteristic curve of FIG. 28 is valid and proper even on road surfaces of different friction coefficient μ values such as a dry asphalt road surface and icy road surface.

In the characteristic curve, the tangent slope of the tire characteristic curve is negative in the region (smaller ratio region) in which the ratio (Fx/S) is small of longitudinal force Fx and slip rate S. In this region, as the ratio (Fx/S) becomes greater, the tangent slope of the tire characteristic curve first decreases, and then starts increasing. The negative tangent slope of the tire characteristic curve means that the partial differential coefficient of the longitudinal force with respect to the slip rate is negative.

In a region (greater ratio region) in which the ratio (Fx/S) of longitudinal force Fx and slip rate S is greater, the tangent slope of the tire characteristic curve becomes positive. In this region, the tangent slope of the tire characteristic curve increases as the ratio (Fx/S) becomes greater. In the region, the characteristic curve is in the form of a monotone increasing function. The positive tangent slope of the tire characteristic curve means that the partial differential coefficient of the longitudinal force with respect to the slip rate is positive. Moreover, the greatest value of the tangent slope of the tire characteristic curve means that the tangent slope is the slope of the linear region of the tire characteristic curve. In the linear region, the tangent slope of the tire characteristic curve is constant without regard to the ratio of longitudinal force Fx and slip rate S.

As mentioned above, the inventors of the present invention has found that, as to the tire characteristic curves of various road surface μ values, the slopes of tangents become equal to one another at intersection points between a given straight line passing through the origin and the respective tire characteristic curves. Then, the inventors of the present invention have come to the conclusion that the relationship between the ratio Fx/S of longitudinal force Fx to slip rate S and the tangent slope of the tire characteristic curves can be expressed by a characteristic curve (grip characteristic curve)(FIG. 28) without regard to the road surface μ. With this characteristic curve, it is possible to obtain information on the tire frictional condition, if the longitudinal force Fx and slip rate S are known, without the need for the information of the road surface mu. The process of obtaining the information on the tire frictional condition is explained with reference to FIG. 29.

Figure 29A:
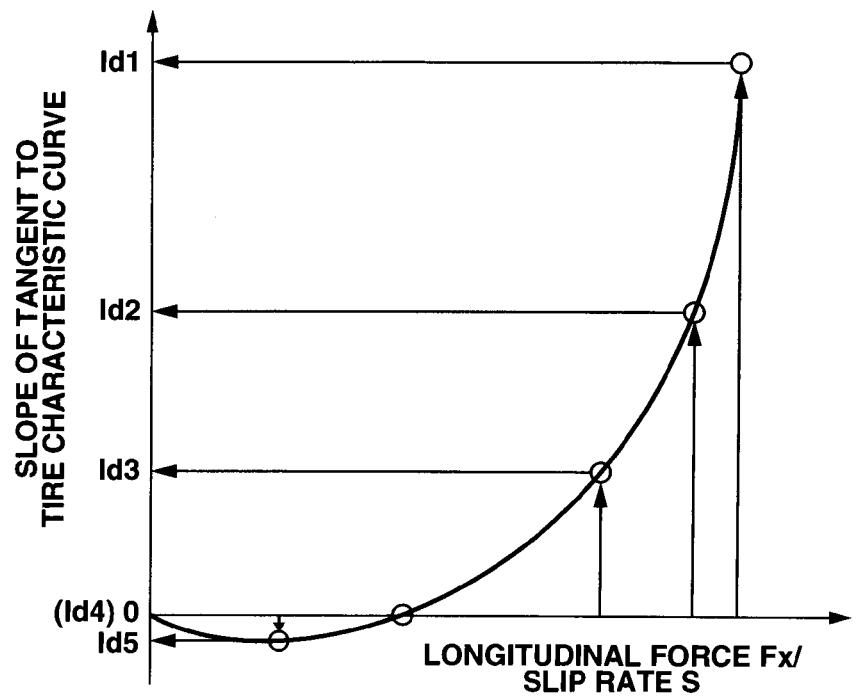
FIG. 29 is a view for illustrating the technology underlying the second embodiment, and more specifically a view used for explaining a process of determining the tangent slope of the tire characteristic curve from longitudinal force Fx and slip rate S.
Figure 29B:
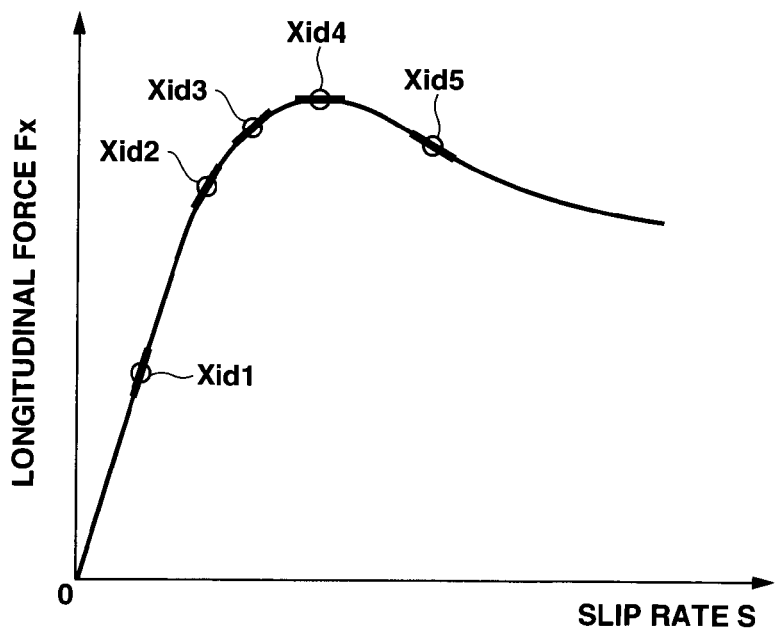

First, longitudinal force Fx and slip rate S are sensed. Then, by using a characteristic curve shown in FIG. 29(a)(or 29A) (similar to the characteristic curve of FIG. 28), it is possible to determine the tangent slope of the tire characteristic curve corresponding to the sensed longitudinal force Fx and slip rate S (corresponding to Fx/S). For example, as shown in FIG. 29(a)(or 29A), tire characteristic curve tangent slopes Id2, Id3, Id4 and Id5 are obtained. From these tire characteristic curve tangent slopes, it is possible to determine the positions on a tire characteristic curve of a road surface μ, as shown in FIG. 29(b)(or 29B). For example, it is possible to specify positions Xid1, Xid2, Xid3, Xid4 and Xid5 corresponding to the tire characteristic curve tangent slopes Id1, Id2, Id3, Id4 and Id5. The position on the tire characteristic curve represents the frictional state and the ability of a tire at a road surface μ at which the tire characteristic curve is valid. Accordingly, it is possible to know the tire frictional state and the ability of the tire by determining a position on the tire characteristic curve as shown in FIG. 29(b)(29B) at the road surface mu of the tire characteristic curve. When, for example, the tangent slope of the tire characteristic curve is negative or close to zero (Id4 or Id5, for example), it is possible to judge, from the position (Xid4 or Xid5) determined from the tangent slope, that the grip force of the tire is in a limit region.

By this process, if longitudinal force Fx and slip rate S are known, it is possible to determine the frictional state and ability of the tire at the road surface mu at which the longitudinal force Fx and slip rate S are obtained, by using the characteristic curve.

Figure 30C:
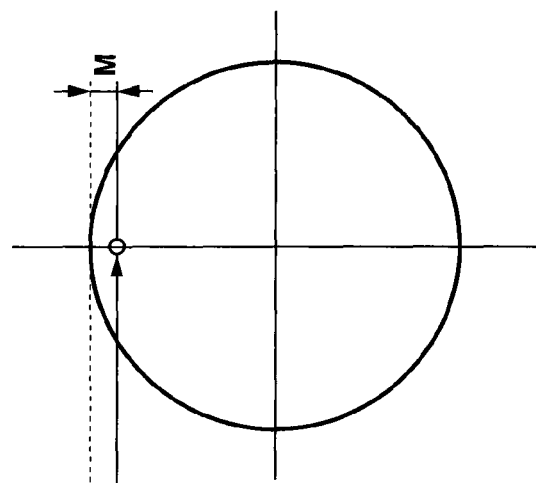
FIG. 30 is a view for illustrating the technology underlying the second embodiment, and more specifically a view for showing relation among the characteristic curve (longitudinal force characteristic index map), a tire characteristic curve and friction circle.
Figure 30B:
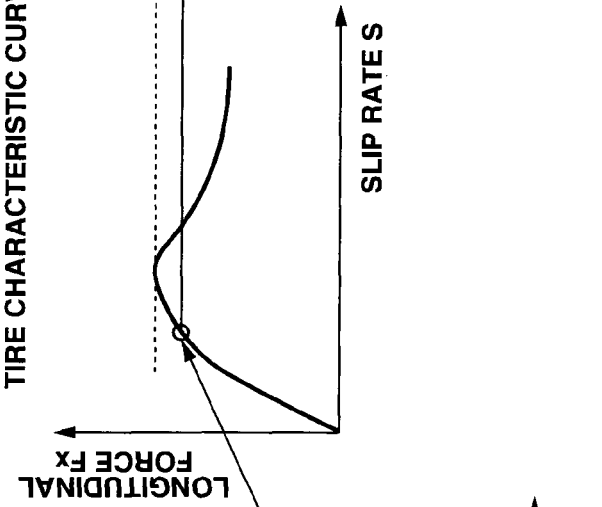
Figure 30A:
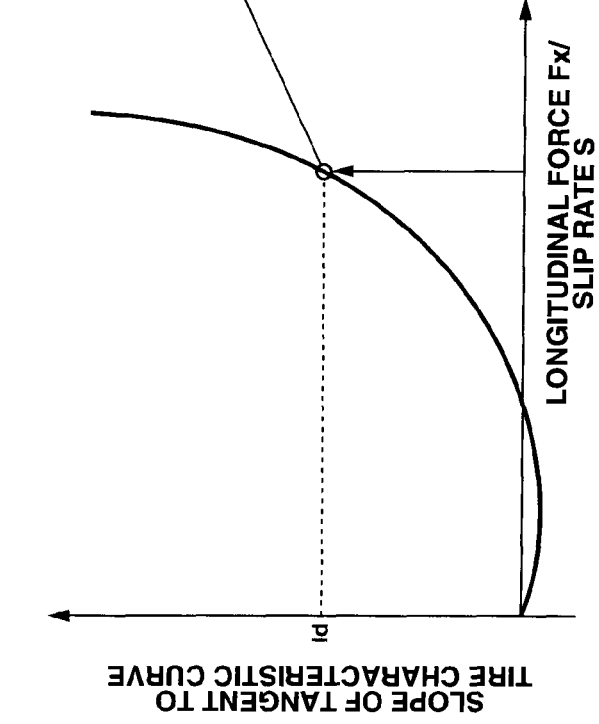

FIG. 30 shows a relation with a friction circle. FIG. 30(a) (or 30A) shows a relationship between the ratio (Fx/S) between longitudinal force Fx and slip rate St, and the tire characteristic curve tangent slope (like FIG. 28). FIG. 30(b) (or 30B) shows a tire characteristic curve, and FIG. 30(c)(or 30C) shows a friction circle. In these relationships, first, the tire characteristic curve tangent slope Id corresponding to the longitudinal force Fx and slip rate S (corresponding to Fx/S) is obtained (FIG. 30(a)). Accordingly, the position on the tire characteristic curve can be determined (FIG. 30(b)). Furthermore, a relative value of the longitudinal force in the friction circle can be determined. That is, it is possible to determine a margin M to the longitudinal force which can be allowed by the tire. The tangent slope of the tire characteristic curve represents the rate of change of the longitudinal force Fx with respect to a change in slip rate S. Therefore, the value, along the vertical axis, of the characteristic curve shown in FIG. 30(a)(the tire characteristic curve tangent slope) can be regarded as a quantity indicative of a variation speed of a vehicle behavior.

Figure 31:
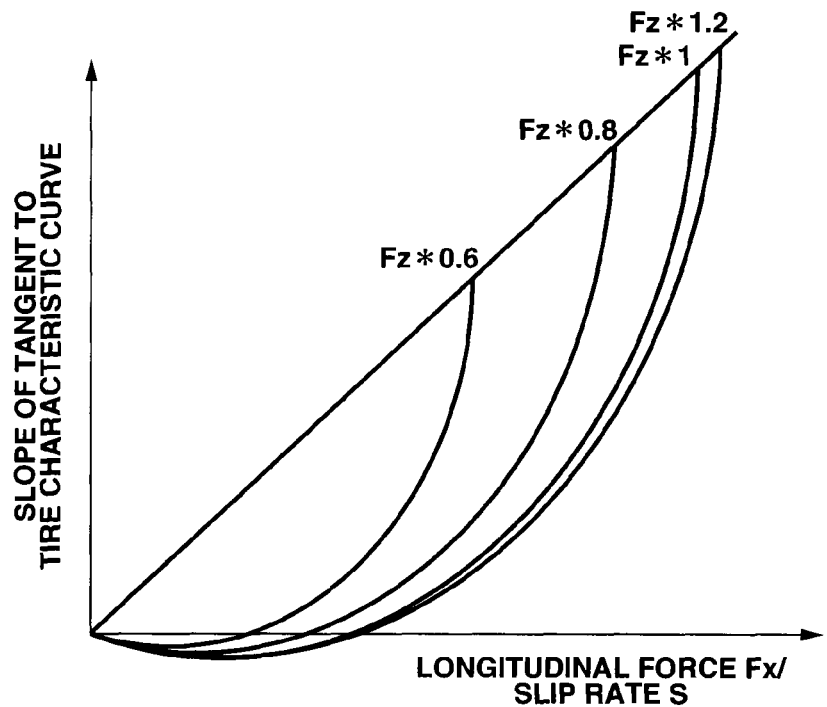
FIG. 31 is a view for illustrating the technology underlying the second embodiment, and more specifically a characteristic view showing a relationship between the ratio (Fx/S) of longitudinal force Fx and slip rate S and the slope of tangent to the tire characteristic curve obtained when a wheel load is varied.

Furthermore, a relation between the ratio (Fx/S) of longitudinal force Fx and slip rate S and the tire characteristic curve tangent slope has been ascertained when a wheel load is varied, by a process similar to the before-mentioned process. FIG. 31 shows this relation. In this example, the wheel load is varied by multiplying an initial value Fz of the wheel load (the value of the wheel load obtained when there is no variation), by 0.6, 0.8 and 1.2. In the case of multiplication by 1.0, the wheel load is equal to the initial value Fz. When the wheel load of the tire becomes smaller, the tire characteristic curve tangent slope obtained by each wheel load value becomes smaller, as shown in FIG. 31. In this case, the greatest value of the tire characteristic curve tangent slope obtained by each wheel load value (the value of the linear region) is moved on a straight line passing through the original of the characteristic view. Moreover, the characteristic curve representing the relationship between the ratio (Fx/S) of longitudinal force Fx and slip rate S and the tire characteristic curve tangent slope (the slope of a tangent to the tire characteristic curve) is varied in the size while the shape is maintained, so that the forms are like similar figures having different sizes. The inventors of the present application have found such relation with the wheel load, too.

The following is explanation on a practical example according to the second embodiment achieved by the above-mentioned technology.

Figure 32:
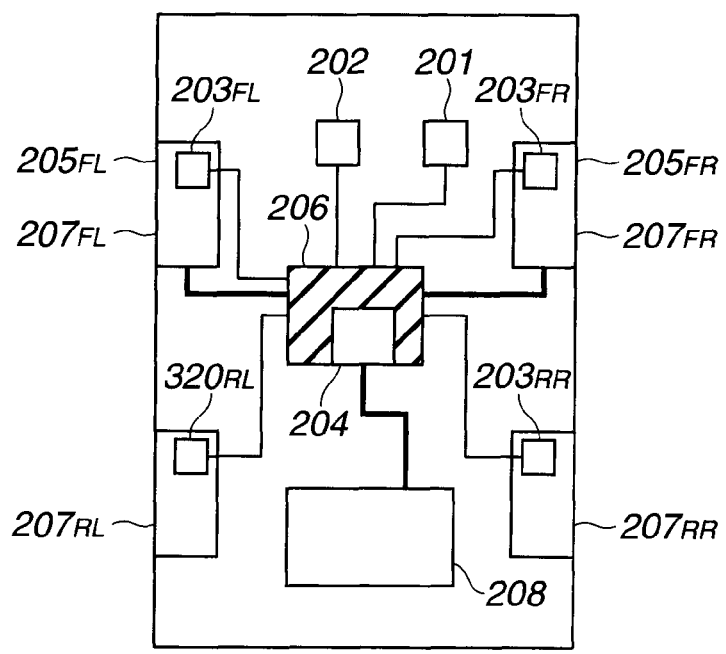
FIG. 32 is a schematic view showing a construction of an electric vehicle in a practical example according to the second embodiment.

In this practical example, the vehicle is an electric vehicle or electric drive vehicle. FIG. 32 schematically shows the construction of the electric vehicle in this practical example. As shown in FIG. 32, the electric vehicle includes an accelerator pedal operating quantity sensing section 201, a brake pedal operating quantity sensing section 202, wheel speed sensing sections 203$_{FL}$~203$_{RR}$, an acceleration sensor 204, driving motors 205$_{FL}$ and 205$_{FR}$, and a system control section 206.

The accelerator pedal operating quantity sensing section 201 senses the quantity of operation of an accelerator pedal by the driver, and outputs the sensed result (an accelerator opening) to system control section 206. The brake pedal operating quantity sensing section 202 senses the quantity of operation of a brake pedal by the driver, and outputs the sensed result to system control section 206. The wheel speed sensing sections 203FL~203RR senses wheel speeds $V_{FL}$~$V_{RR}$ of respective wheels 207FL~207RR provided in the vehicle body, and output the sensed results to system control section 206. The acceleration sensor 204 senses the acceleration in the longitudinal (front and rear) direction and the acceleration in the lateral direction of the vehicle, and outputs the sensed results (longitudinal G, lateral G) to system control section 206. The driving motors 205$_{FL}$ and 205FR generate a driving torque corresponding to a driving torque command Tout produced by system control section 206, and drive the drive wheels 7FL and 7FR. The driving torque command Tout is in the form of a current that is supplied from a battery 208 to control the driving motors 205FL and 205FR.

Figure 33:
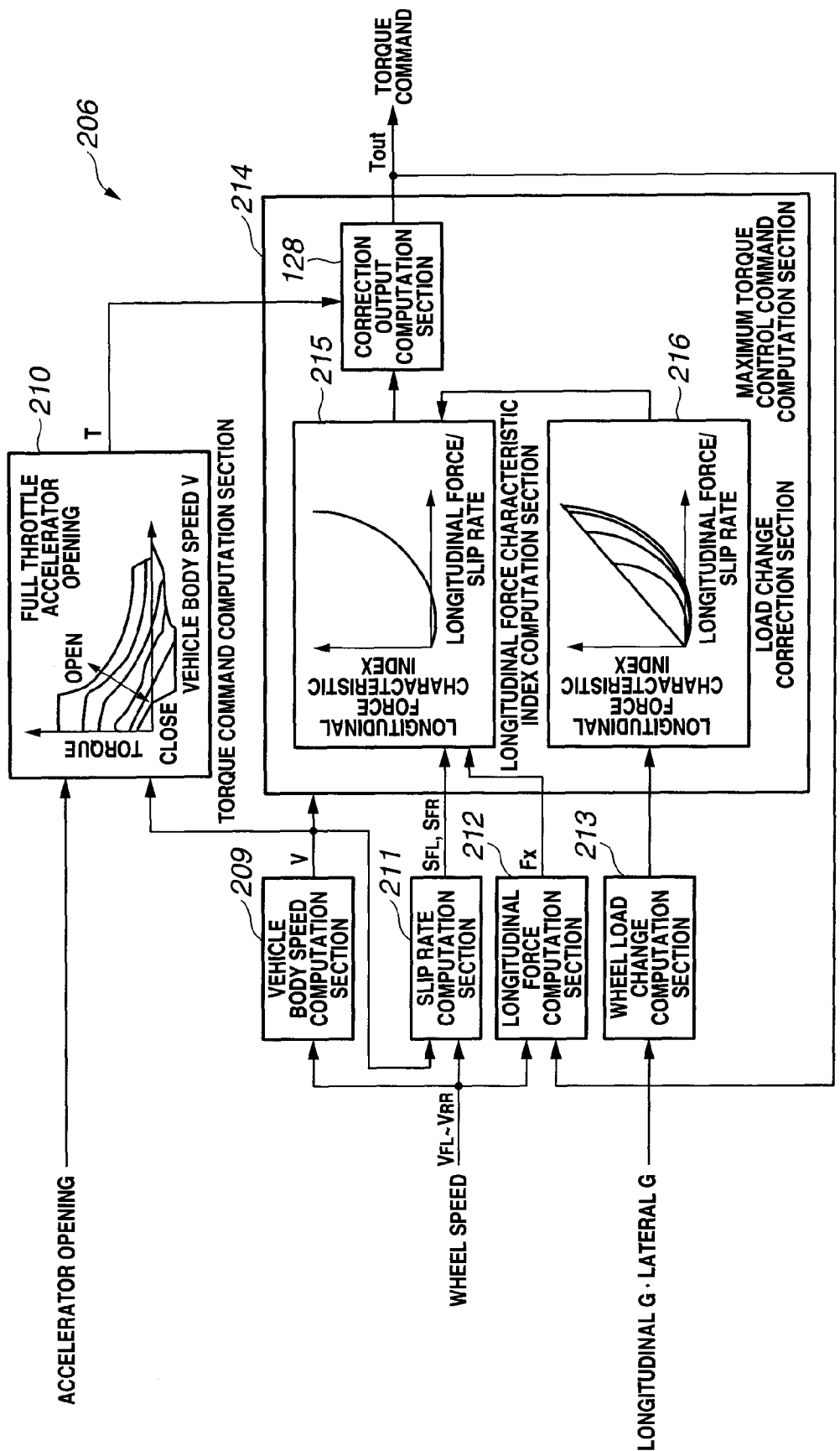
FIG. 33 is a block diagram showing the internal structure of a system control section.

FIG. 33 shows the configuration of system control section 206. As shown in FIG. 33, system control section 206 includes a vehicle body speed calculating (or computation) section 209, a torque command calculating (or computation) section 210, a slip rate (or ratio) calculating (or computation) section 211, a longitudinal (braking/driving) force calculating (or computation) section 212, a wheel load change calculating (or computation) section 213, and a maximum torque adjustment command calculating (or computation) section 214.

The vehicle body speed calculating section 209 calculates a vehicle body velocity V based on the wheel speeds $V_{FL}$~$V_{RR}$ sensed by wheel speed sensing sections 203FL~203RR, and outputs the calculation result to torque command calculating section 10. The torque command calculating section 210 obtains a base driving torque command T in accordance with the accelerator opening sensed by accelerator pedal operating quantity sensing section 201 and the vehicle body speed V calculated by vehicle body speed calculating section 209. The base driving torque command T is a command corresponding to the accelerator operation of the driver, in the form of a current value for controlling the driving motors 205FL and 205FR. The torque command calculating section 210 outputs the determined base driving torque command T to a correction or compensation output calculating (or computation) section 218.

Figure 34:
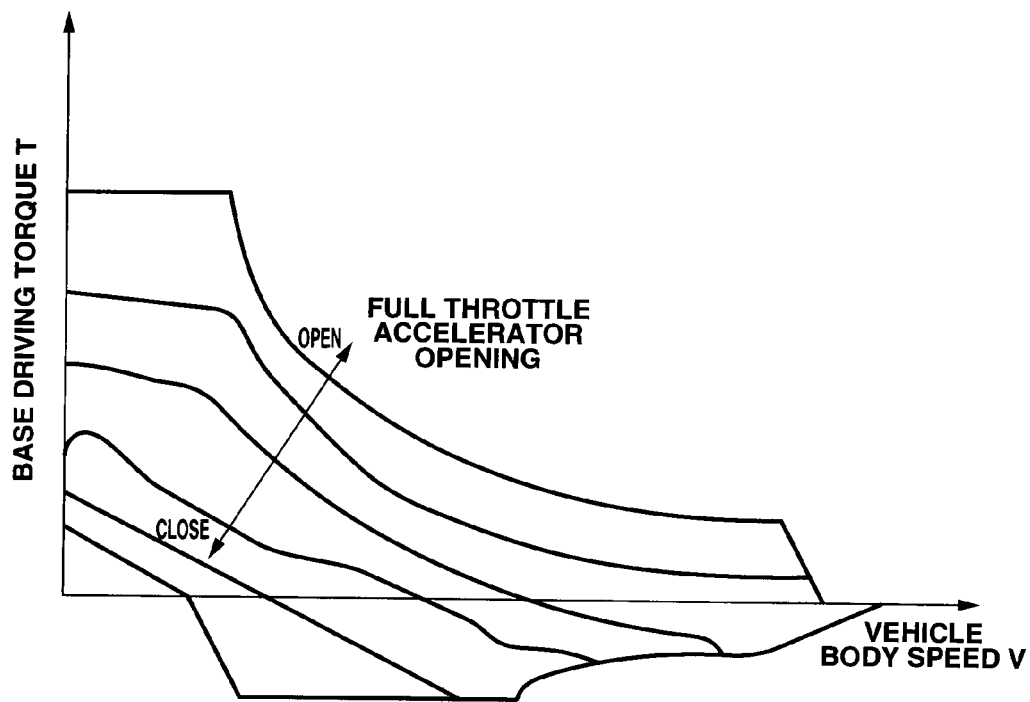
FIG. 34 is a characteristic view for illustrating a torque command map.

FIG. 34 shows an example of a torque command map for obtaining the base driving torque command T. As shown in FIG. 34, as the vehicle body speed V becomes higher, the base driving torque command T becomes smaller. Furthermore, as the accelerator opening becomes larger (as the accelerator opens widely), the base driving torque command T becomes larger.

Slip rate (or ratio) calculating (or computation) section 211 calculates slip rates $S_{FL}$ and $S_{FR}$ of drive wheels 207FL and 207FR in accordance with wheel speeds $V_{FL}$~$V_{RR}$ sensed by wheel speed sensing sections 203FL~203RR and vehicle body speed V calculated by vehicle body speed calculating section 209. Then, slip rate calculating section 211 outputs the calculation result to the maximum torque control command calculating section 214.

The longitudinal force calculating section 212 estimates the longitudinal (driving/braking) forces of drive wheels 207FL and 207FR in accordance with wheel speeds $V_{FL}$~$V_{RR}$ sensed by wheel speed sensing sections 203FL~203RR and the driving torque command Tout calculated by the correction output calculating section 218 (as described later) of maximum torque control command calculating section 214. Then the longitudinal force calculating section 212 outputs the result of the estimation (longitudinal forces $F_{XFL}$ and $F_{XFR}$) to the maximum torque control command calculating section 214.

Wheel load change calculating section 213 calculates wheel load changes of drive wheels 207FL and 207FR in accordance with the longitudinal G and lateral G sensed by acceleration sensor 204. More specifically, wheel load changes of he drive wheels 207$_{FL}$ and 207$_{FR}$ are calculated from longitudinal G and lateral G. Then, wheel load change calculating section 213 outputs the result of the calculation to maximum torque control command calculating section 214.

Maximum torque control command calculating section 214 includes a longitudinal force characteristic index calculating section 215, a (load change) correcting section 216, and the correction output calculating section 218.

Figure 35:
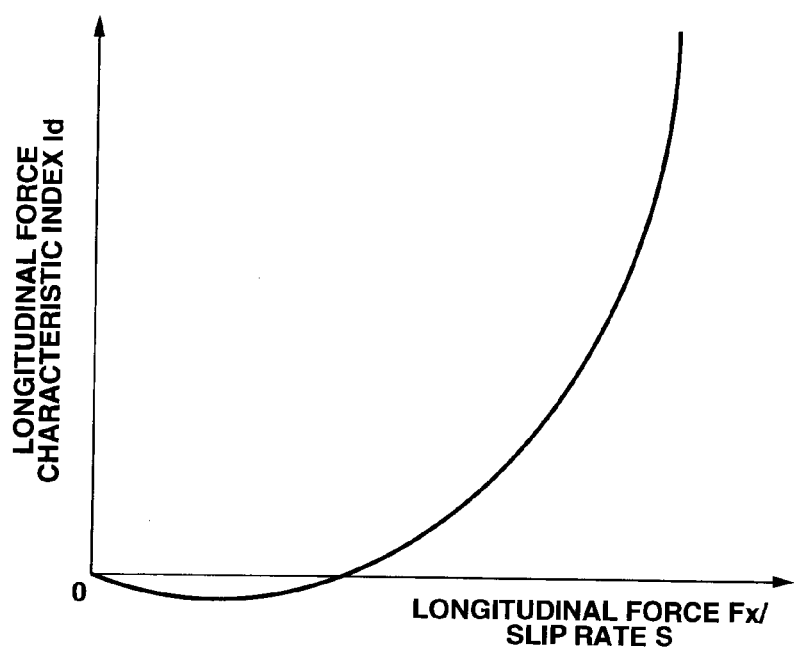
FIG. 35 is a characteristic view showing a longitudinal force characteristic index map.

Longitudinal force characteristic index calculating section (or longitudinal force stiffness calculating section) 215 estimates a trend or tendency of a ratio between a change (quantity) of the longitudinal force $F_{XFL}$, $F_{XFR}$ and a change (quantity) of the slip rate $S_{FL}$, $S_{FR}$ in accordance with the slip rate $S_{FL}$, $S_{FR}$ of drive wheel 207$_{FL}$, 207FR sensed by slip rate calculating section 211 and the longitudinal force $F_{XFL}$, $F_{XFR}$ of driving wheel 207$_{FL}$, 207FR estimated by longitudinal force estimating section 212. This trend is the slope of a tangent line to the tire characteristic curve. Furthermore, in the following explanation, the trend is also called a longitudinal force characteristic index. In this practical example, longitudinal force characteristic index calculating section 215 has the characteristic curve shown in FIG. 28, in the form of a map. FIG. 35 shows an example of the longitudinal force characteristic index map (longitudinal force stiffness map) for estimating the longitudinal force characteristic index Id. For example, the longitudinal force characteristic index map is stored in a storage medium such as a memory. Longitudinal force characteristic index calculating section 215 therefore estimates the longitudinal force characteristic index indicative of the trend, by using the longitudinal force characteristic index map, and outputs the estimation result (the longitudinal force characteristic index value) to the correction output calculating section 218. In the second embodiment, the (tire) grip characteristic parameter corresponds to the longitudinal (braking/driving) force characteristic index.

The (load change) correcting or adjusting section 216 adjusts or corrects the longitudinal force characteristic index map in accordance with the wheel load change or variation quantity calculated by the wheel load change calculating section 213. As explained before with reference to FIG. 31, the characteristic curve representing the relationship between the ratio (Fx/S) of the longitudinal force Fx and slip rate S and the slope (longitudinal force characteristic index) of tangent to the tire characteristic curve varies or charges in dependence on the wheel load. In dependence on the wheel load, the characteristic curve changes from an original form to a form which is different in the size from the original form and similar in the shape to the original form. Therefore, the load change correcting or adjusting section 216 adjusts or corrects the longitudinal force characteristic index map (of FIG. 35) so that the ratio between the horizontal axis (Fx/S) and the vertical axis (longitudinal force characteristic index) is held. For example, if the wheel load change calculated by wheel load change calculating section 213 is a change quantity decreased from the initial value of the wheel load, then the characteristic curve is adjusted to a similar form reduced in size in accordance with the wheel load.

Furthermore, the (load change) correction section 216 may be arranged to calculate a scale ratio of the longitudinal force characteristic index map in accordance with a load change correction function, and to correct the map with the scale ratio. The load change correction function is a function to calculate the scale ratio of the longitudinal force characteristic index value map by adding the wheel load at the time of no-variation (the initial value) to the wheel load change quantity calculated by the wheel load change calculating (computation) section 213, dividing the sum obtained by this addition, by the initial value, and determining the scale ratio of the map from the quotient. With this function, the correction section can correct the longitudinal force characteristic index map by holding the ratio between the horizontal axis (Fx/S) and vertical axis (the longitudinal force characteristic index), and performing multiplication by the calculated scale ratio.

Figure 36:
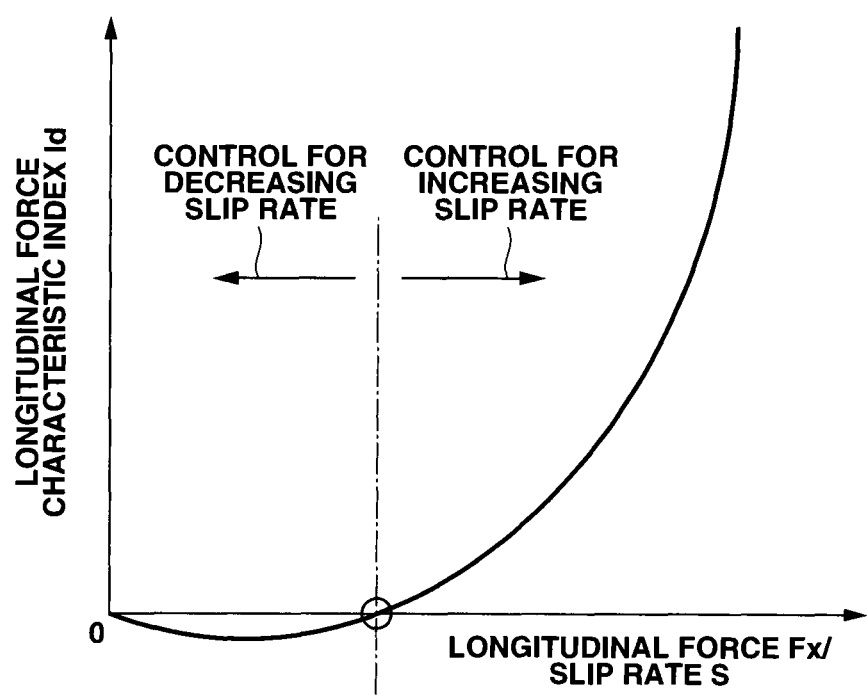
FIG. 36 is a characteristic view for illustrating a method of modifying a drive torque command.

Correction output calculating (or computation) section 218 corrects or modifies the base driving torque command value T calculated by the torque command calculating (computation) section 210 in accordance with the longitudinal force characteristic index calculated by longitudinal force characteristic index calculating (computation) section 215. More specifically, the correction output calculating section 218 corrects the base driving torque command T calculated by torque command calculating section 210 so as to prevent the grip force of the tire from reaching the limit region. That is, as shown in FIG. 36, the correction output calculating section 218 corrects the base driving torque command T so as to prevent the longitudinal force characteristic index from becoming negative (from becoming zero). Correction output calculating section 218 then outputs the correction result (driving torque command Tout) to driving motors 205FL and 205FR and the driving/braking forces calculating section 212. Correction output calculating section 218 may be configured to correct or modify the base driving torque command T to a value having a margin to the limit region of the tire grip force so as to prevent the tire grip force from reaching the limit region. The use of such a margin is effective, for example, when a safety margin is required or desired to the limit region because of control errors or other factors.

In FIG. 36, the vertical axis represents the grip characteristic parameter, and the horizontal axis represents the ratio of the wheel force and the wheel slipping degree. The system can change the control mode by comparing the grip characteristic parameter with a critical parameter value. In the example of FIG. 36, the system distinguishes between the control for increasing the slip rate and the control for decreasing the slip rate, at a crossover point indicated by a circle. In the example of FIG. 36, the critical parameter value is equal to zero, and the system is arranged to perform the control for increasing the slip rate when the grip characteristic parameter is greater than zero, and to perform the control for decreasing the slip rate when the grip characteristic parameter is smaller than or equal to zero. Unlike this example, it is possible to set the critical parameter value equal to a predetermined value greater than zero, for example.

Figure 37:
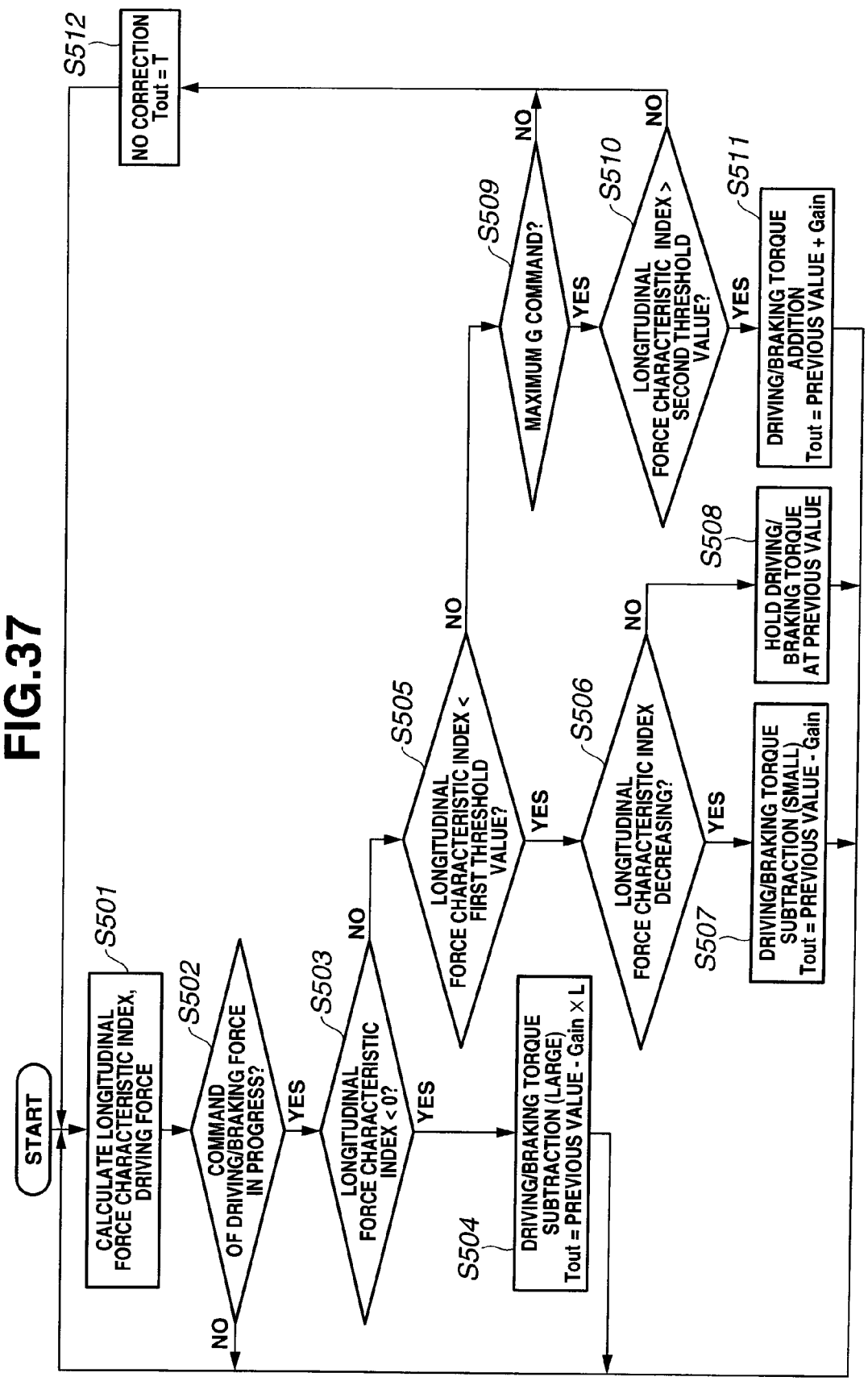
FIG. 37 is a flowchart showing a calculation process of the system control section.

FIG. 37 shows a calculation process executed in system control section 206. System control section 206 executes this calculation process during a traveling motion of the vehicle.

As shown in FIG. 37, after a start of the process, first, at a step S501, the system control section 206 performs an operation of calculating the longitudinal force characteristic index. That is, system control section 206 calculates the vehicle body speed V, slip rates S$_{FL}$ and S$_{FR}$, longitudinal forces Fx$_{FL}$ and Fx$_{FR}$, and wheel load change quantity, in accordance with the wheel speeds of wheels 207FL-207RR sensed by wheel speed sensing section 203FL~203RR and the longitudinal G and lateral G sensed by acceleration sensor 204. System control section 206 estimates, based on these calculation results, the longitudinal force characteristic index by using the longitudinal force characteristic index map (corresponding to operations in the vehicle body speed calculating section 209, slip rate calculating section 211, longitudinal force calculating section 212, wheel load change calculating section 213, longitudinal force characteristic index calculating section 215, and load change correction section 216). The longitudinal force characteristic index map used here is the map that is adjusted or modified in accordance with the wheel load change. The longitudinal force characteristic index calculation process will be described in detail later with reference to FIG. 36.

At a step S502, system control section 206 judges whether there is a driver's accelerator pedal operation or brake pedal operation. That is, system control section 6 judges whether or not the command of the driving/braking force is in progress. If the command of the driving/braking force is in progress, the system control section 206 proceeds to a step S503. If the driving/braking force command is not in progress, the system control section 206 returns to step S501.

At step S503, system control section 206 examines whether or not the longitudinal force characteristic index calculated at S501 is negative or not. That is, system control section 206 judges whether or not the grip force of the tire is in the limit region. System control section 206 proceeds to a step S504 when the index is negative and to a step S505 when the index is not negative. At S503, the grip characteristic parameter is thus compared with the critical parameter value.

At step S504, system control section 206 subtracts a predetermined value from the driving torque command Tout that is calculated at the last execution of the calculation process. The predetermined value is a product obtained by multiplying a longitudinal (or driving/braking) force adjustment (or control) gain Gain by an additional gain L. The longitudinal force adjustment gain Gain is a gain dependent on the road surface $\mu$. The additional gain L is a gain to immediately stop wheel spin (L>0). System control section 206 outputs the result of the subtraction to driving motors 205FL and 205FR as a new driving torque command value Tout. Thereafter, system control section 206 retunes to step S501. The control action of step S504 corresponds to a grip recovery control for increasing the grip characteristic parameter beyond the critical parameter value.

At step S505, system control section 206 examines whether the longitudinal force characteristic index calculated at step S501 is smaller than a first threshold value or not. That is, system control section 206 examines an amount of margin left for the tire grip force, up to the limit region. The first threshold value is, for instance, a one-tenth (1/10) of the longitudinal force characteristic index value in the linear region. In other words, the first threshold value is a one-tenth (1/10) of the longitudinal force characteristic index value when the tire is in a gripping state or when the tire grip force reaches the limit region. System control section 206 proceeds to a step S506 when the longitudinal force characteristic index is smaller than the first threshold value, and proceeds to a step S509 when the longitudinal force characteristic index is greater than or equal to the first threshold value. The region in which the grip characteristic parameter (the longitudinal force characteristic index) is greater than the critical parameter value (zero), but smaller than the first threshold value (parameter threshold) can be called a marginal region.

At step S506, system control section 206 examines whether the longitudinal force characteristic index calculated at S501 is in the process of decreasing, or not. System control section 206 proceeds to a step S507 when the longitudinal force characteristic index is decreasing, and proceeds to a step S508 when the longitudinal force characteristic index is not in the process of decreasing.

At step S507, system control section 206 subtracts the longitudinal force adjustment gain Gain from the driving torque command value Tout calculated at the last execution of this calculation process. System control section 206 outputs the result of the subtraction to driving motors 205FL and 205FR as a new driving torque command value Tout. Thereafter, system control section 206 returns to step S501.

At step S508, system control section 206 holds the driving torque command value Tout calculated at the last execution of this calculation process, as an upper limit. Moreover, system control section 206 calculates the base driving torque command T of drive wheels 207FL and 207FR in accordance with the accelerator opening sensed by accelerator pedal operating quantity sensing section 201 and the vehicle body speed V calculated by vehicle body speed calculating section 209. System control section 206 outputs the result of the calculation to driving motors 205FL and 205FR as a new driving torque command value Tout. Thereafter, system control section 206 retunes to step S501. The control of steps S506, S507 and S508 can be called a grip decrease preventing control, which is a control for preventing the grip characteristic parameter from decreasing toward a critical parameter value when the grip characteristic parameter approaches the critical parameter value.

At step S509, on the other hand, system control section 206 examines whether the accelerator pedal is depressed by the driver for acceleration with a target acceleration. That is, system control section 206 determines whether the acceleration command is equal to the target acceleration or not. In this practical example, the target acceleration is set equal to the maximum acceleration command (maximum G command). However, this embodiment is not limited to this. The target acceleration may be set at a value having a margin to the maximum acceleration of the capability of the vehicle. System control section 206 proceeds to a step S510 when the acceleration command is the maximum acceleration command, and proceeds to a step S512 when the acceleration command is not the maximum acceleration command. Step S509 corresponds to a step of examining whether there is a longitudinal force increase request of the driver of the vehicle.

At step S510, system control section 206 examines whether the longitudinal force characteristic index calculated at S501 is greater than a second threshold value, or not. That is, system control section 206 examines an amount of margin of the tire grip force up to the limit region. The second threshold value is greater than the first threshold value (the second threshold value>the first threshold value). For example, the second threshold value is equal to two-tenth ($2/10$) of the longitudinal force characteristic index in the linear region. In other words, the second threshold value is the two-tenth ($2/10$) value of the longitudinal force characteristic index when the tire is in the gripping condition or when the grip force of the tire reaches the limit region. System control section 206 proceeds to a step S511 when the longitudinal force characteristic index is greater than the second threshold value, and proceeds to the step S512 when the longitudinal force characteristic index is less than or equal to the second threshold value.

In this example, in view of the accuracy in sensing and estimation and the responsibility or response speed of the driving motors 205FL and 205FR and so on, the first and second threshold values are set, respectively, equal to $1/10$ and $2/10$ of the longitudinal force characteristic index value when the grip force of the tire reaches the limit region. However, it is optional to use, as the first and second threshold values, values that are set close to zero, leaving a margin in a positive direction.

At step S511, system control section 206 adds the longitudinal force control gain Gain to the driving torque command value Tout calculated at the last execution of this calculation process. System control section 206 outputs the sum of the addition to driving motors 205FL and 205FR as a new driving torque command value Tout. Thereafter, system control section 206 retunes to step S501.

At step S512, system control section 206 calculates the base driving torque basic command T of drive wheels 207FL and 207FR in accordance with the accelerator opening sensed by accelerator pedal operation quantity sensing section 1 and the vehicle body speed V calculated by vehicle speed calculating section 209. System control section 206 outputs the result of the calculation to driving motors 205FL and 205FR as a new driving torque command value Tout. Thereafter, system control section 206 retunes to step S101.

Figure 38:
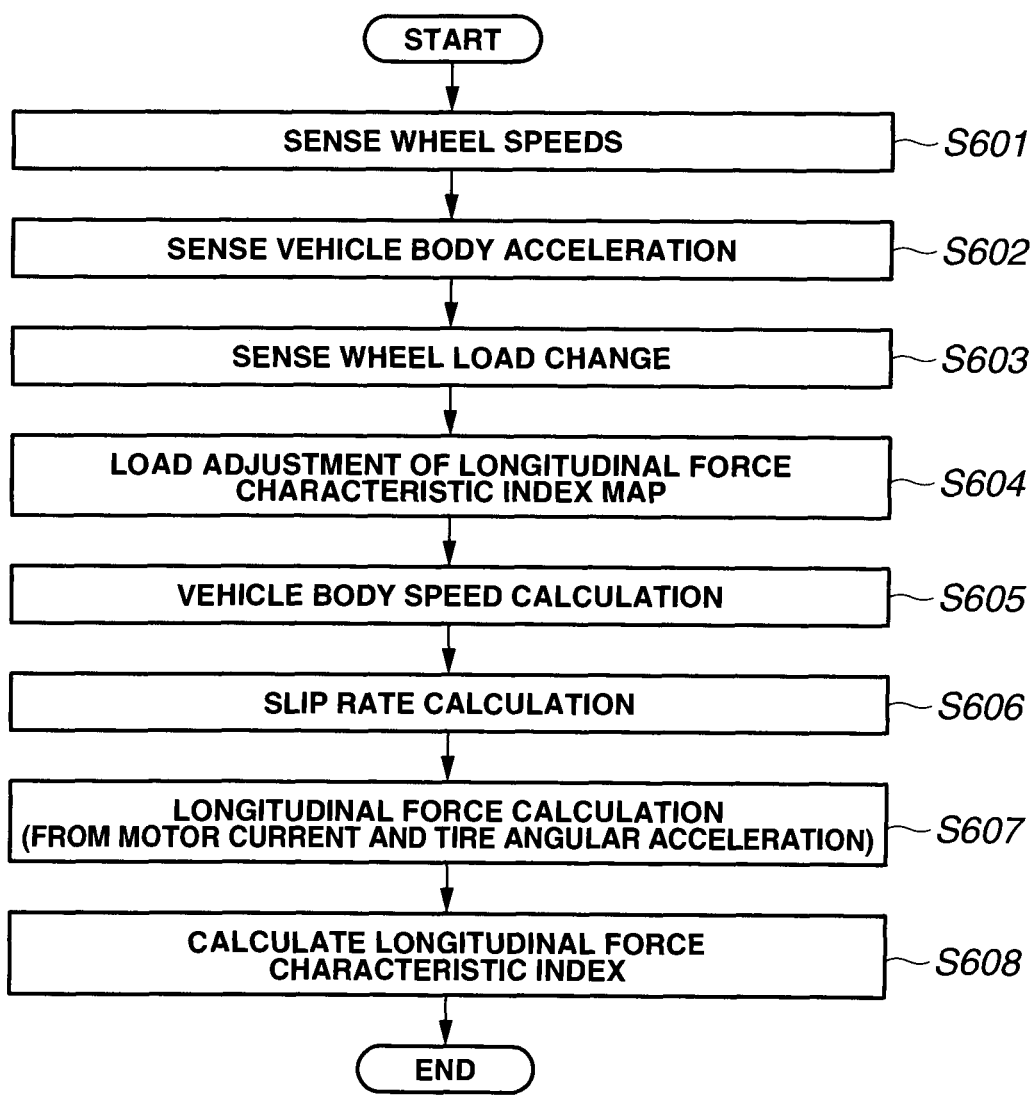
FIG. 38 is a flowchart showing a process of calculating a longitudinal force characteristic index.

FIG. 38 shows the longitudinal force characteristic index calculating process executed at step S501.

As shown in FIG. 38, after a start of the process, at a step S601, the system control section 206 senses the wheel speeds $V_{FL} \sim V_{RR}$ of wheels 207FL~207RR with wheel speed sensing sections 203FL~203RR. At a next step S602, system control unit 6 senses the longitudinal G and lateral G with acceleration sensor 204. At a step S603, system control section 206 senses the wheel load change quantity based on the longitudinal G and lateral G sensed at S602 (corresponding to the operation of wheel load change calculating section 213).

At a step S604, system control section 206 corrects or adjust the longitudinal force characteristic index map in accordance with the wheel load change quantity detected at S603 (corresponding to the operation of load change correction section 216). Then, at a step S605, system control section 206 calculates the vehicle body speed velocity V from wheel speeds $V_{FL} \sim V_{RR}$ sensed at S601 (corresponding to the operation of vehicle body speed calculating section 209). At a step S606, system control section 206 calculates the slip rates $S_{FL}$ and $S_{FR}$ of drive wheels 207FL and 207FR in accordance with wheel speeds $V_{FL} \sim V_{RR}$ determined at S601 and the vehicle body velocity V calculated at S605 (corresponding to the operation of slip rate calculating section 211). At a step S607, system control section 206 calculates the longitudinal forces $F_{xFL}$ and $F_{xFR}$ of drive wheels 207FL and 207FR in accordance with the wheel speeds $V_{FL} \sim V_{RR}$ determined at S601 and the driving torque command Tout (the tire angular acceleration, motor current) outputted to driving motors 205FL and 205FR (corresponding to the operation of lateral force calculating section 212). At a step S608, system control section 206 calculates the longitudinal force characteristic index according to the longitudinal force characteristic index map corrected at S604, from the longitudinal forces $F_{xFL}$ and $F_{xFR}$ calculated at S607 and the slip rates $S_{FL}$ and $S_{FR}$ calculated at S606. Then, system control unit 206 terminates this calculation process (corresponding to the operation of longitudinal force characteristic index calculating section 215). The step S608 may be composed of a substep of determining the ratio of the driving/braking force (longitudinal force) and the slip rate, and a substep of determining the longitudinal force characteristic index (or grip characteristic parameter) from the ratio, according to the predetermined relationship (by the technique of table lookup, calculation of mathematical expression, or by some other technique).

(Actions and Operations)

Actions and operations will be explained.

First, if the driver depresses the accelerator pedal, the driving forces of drive wheels 207FL and 207FR become too great, the tire grip force reaches the limit region, and hence drive wheels 207FL and 207FR spin, then the system considers that the tire grip force is in a limit state (judgment of YES at step S503) and decreases the driving torque command Tout (by the route of S501→S502→S503→S504). By this operation, the system decreases the driving torques produced by driving motors 205FL and 205FR. By repeating this process flow (the flow in FIG. 37), the system decreases the driving torque command Tout until the longitudinal force characteristic index becomes positive (until the answer of S503 becomes NO). Therefore, the driving torques produced by driving motors 205FL and 205FR are further decreased. By so doing, the system can restore the tire grip force from the from the limit region, and thereby prevent undesired spin of drive wheels 207FL and 207FR. This control can be called a grip recovery control.

On the other hand, when the driver depresses the accelerator pedal, the driving forces of drive wheels 207FL and 207FR are increased too much so that, although the tire grip force does not reach the limit region, the longitudinal force characteristic index is decreased to a positive value smaller than the first threshold value, then the system judges that the margin of the tire grip force is small (within the marginal region) (NO at step S503), and slightly decreases the driving torque command Tout (by the route of S503→S506→S507). Through this process, the driving torques produced by driving motors 205FL and 205FR are decreased slightly. By repeatedly executing the process flow, the system decreases the driving torque command Tout until the decrease of the longitudinal force characteristic index stops. Therefore, the driving torques of driving motors 205FL and 205FR are further decreased. By so doing, the system can prevent the margin of the tire grip force up to the limit region from being decreased too much by decrease of the longitudinal force characteristic index (the grip decrease preventing control).

Moreover, when the decrease of the longitudinal force characteristic index is stopped by decrease of the driving torque command Tout, the driving/braking torque at this time point is temporarily retained as the upper limit of the driving torque command Tout (S506→S508). If, in this case, the accelerator opening becomes smaller, the driving torque command Tout is also decreased.

When the tires are in the grip state, the driver depresses the accelerator pedal for acceleration with the maximum acceleration, and the longitudinal force characteristic index is equal to a positive value greater than the second threshold value, then the system considers that the tire grip force is not in the target region (the answer is NO at S503) and increases the driving torque command Tout (by the route of S505→S509→S510→S511). Through this process, the system increases the driving torque produced by driving motors 205FL and 205FR. By repeatedly executing the process flow, the system further increases the driving torque, and increases the acceleration. The target region may be the limit region of the tire grip or may be a region having a margin with respect to the limit region.

When the longitudinal force characteristic index becomes equal to the second threshold value, the system outputs the base driving torque command T to driving motors 205FL and 205FR as a new driving torque command value Tout (S510→S512). Therefore, the driving torque corresponding to the driver's accelerator pedal operation is reduced from the driving motors 205FL and 205FR.

The second embodiment can also be realized by the following configuration. In the illustrated practical example, the longitudinal force characteristic index map is prepared on the basis of the tire characteristic calculated from the tire model. In contrast to this, for example, it is possible to prepare the longitudinal force characteristic index map on the basis of experimental values obtained by using actual tires.

Furthermore, the illustrated example of this embodiment employs the longitudinal force characteristic index map having the coordinates axes of the ratio between the longitudinal force and the slip rate and the ratio between the variation of the longitudinal force and the variation of the slip rate. In contrast to this, it is possible to use a functional expression including, as variables, the ratio between the longitudinal force and the slip rate and the ratio between the variation of the longitudinal force and the variation of the slip rate. In this case, the functional expression is prepared on the basis of the experimental data obtained by using actual tires or the tire characteristics calculated from the tire model. In this way, it is possible to form the functional easily. As the functional expression, it is preferable to use a quadratic or higher polynomial, especially a cubic polynomial. By using this polynomial, it is possible to calculate a value of the longitudinal force characteristic index that is almost equal to an experimental value. In this case, the calculating section constructed on the basis of such a function expression is arranged to receive, as an input, the ratio between the longitudinal force and the slip rate, and to deliver, as an output, the ratio between the variation of the longitudinal force and the variation of the slip rate.

Furthermore, in the illustrated example of this embodiment, the driving/braking force is controlled in accordance with the longitudinal force characteristic index (the process in FIG. 37). However, it is optional to use the longitudinal force characteristic index only for the estimation of the tire friction state or the estimation of the vehicle state, without performing the driving/braking force control. More specifically, by the longitudinal force characteristic index value itself or by comparison with a predetermined threshold value, the system estimates the tire friction state and/or the vehicle state quantity. Then, the estimated tire friction state and/or vehicle state quantity can be used as information for process and/or apparatus for controls other than the driving/braking force control.

Moreover, in the illustrated example, the technique of this embodiment is used for the driving force control for decreasing the driving force when the driving force of drive wheels 207FL and 207FR is excessive. However, the technique of this embodiment is also applicable to the braking force control for decreasing the braking force. For example, the second embodiment can be applied to the braking force control for decreasing the braking force when the braking force becomes excessive. When the longitudinal force characteristic index becomes negative while the braking torque is produced by a wheel, the system designed along the process in FIG. 15 decreases the braking torque gradually until the longitudinal force characteristic index becomes positive. When the longitudinal force characteristic index decreases and becomes equal to a positive value smaller than the first threshold value under the condition in which the wheel is generating the braking force, increase of the braking torque by driving motors 205FL and 205FR is suppressed. When the driver depresses the brake pedal for deceleration with maximum deceleration in the state in which the longitudinal force characteristic index is positive under the condition in which the wheel is generating the braking force, then the system increases the braking torque gradually until the longitudinal force characteristic index becomes equal to a positive value less than or equal to the second threshold value.

Figure 39A:
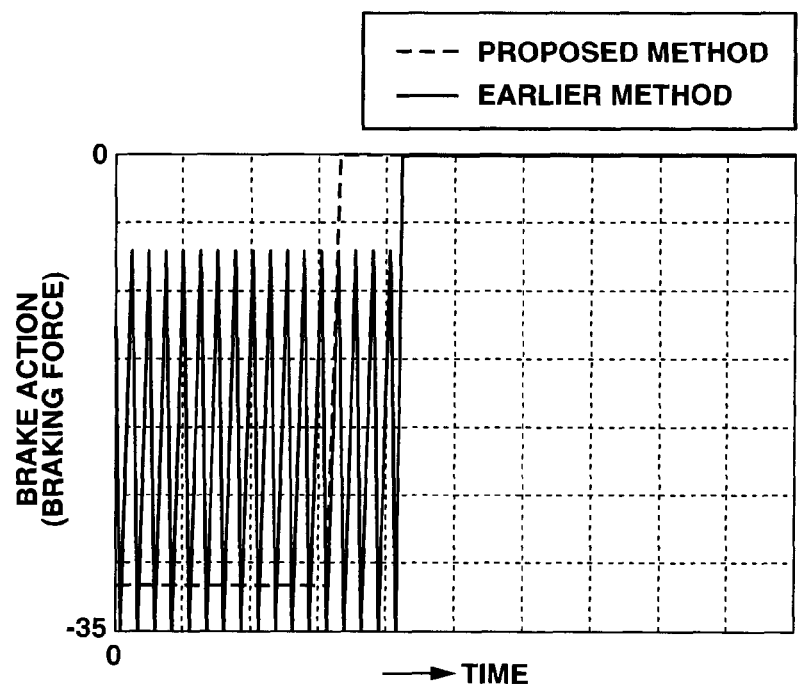
FIG. 39 is a time chart showing operations in a variation example applied to a braking force control.
Figure 39B:
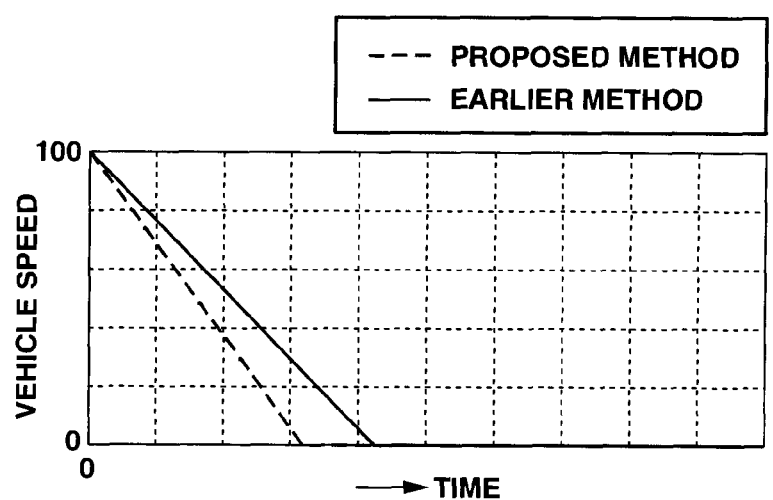

FIG. 39 shows results obtained by performing the above-mentioned braking force control (proposed method) and results of ABS (Antilock Brake System) control of earlier technology (earlier method). These results are obtained by carrying out a marginal or limit braking operation from an initial speed of 100 km/h, and each result is a result of simulation. FIG. 39(a)(or 39A) shows a brake action (braking force) by the control. FIG. 39(b)(or 39B) shows variation of the vehicle speed caused by the control. From these results, it is found that the proposed method can shorten the braking distance by approximately 20% as compared with the earlier method.

In the illustrated example of this embodiment, the vehicle is an electric-drive vehicle. However, the technique of this embodiment is applicable also to a traction control in a vehicle driven by an engine or to a braking force control by hydraulic brake.

Furthermore, in the illustrated example of this embodiment, the vehicle body speed V is calculated based on wheel speeds $V_{FL} \sim V_{RR}$. However, it is optional to correct an estimated value of the vehicle body speed V calculated from wheel speeds $V_{FL} \sim V_{RR}$, by using the sensed value of acceleration sensor 204. Through this correction, the estimation accuracy of vehicle body speed V can be improved.

In this embodiment, longitudinal force calculating section 12 can realize and serve as longitudinal force sensing means for sensing a wheel longitudinal force. Slip rate calculating section 11 can realize and serve as a slip rate sensing means for sensing a wheel slip rate. Longitudinal force characteristic index calculating section 15 can realize and serve as a means for obtaining the ratio between the variation of the longitudinal force and the variation of the slip rate, corresponding to the ratio between the longitudinal force sensed by the longitudinal force sensing means and the slip rate sensed by the slip rate sensing means, by using tire friction state estimating information representing the relationship between the ratio between the wheel longitudinal force and the wheel slip rate and the ratio between the variation of the longitudinal force and the variation of the slip rate. The tire friction state estimating information is information indicating that when the ratio between the longitudinal force and the slip rate is equal among values obtained at various road $\mu$ values, the ratio between the variation of the longitudinal force and the variation of the slip rate are equal among values obtained at the various road $\mu$ values. The longitudinal force characteristic index map realizes and serves as this tire friction state estimating information.

Furthermore, the judgment process of the longitudinal force characteristic index by system control section 206 realizes a tire friction state estimating means for estimating the tire friction state based on the ratio between the variation of the longitudinal force and the variation of the slip rate obtained by the obtaining means. The judgment process of the longitudinal force characteristic index is the process performed at steps S503, S505, S506 and S510 in FIG. 37. The longitudinal (driving/braking) force control process by system control section 206 realizes a driving/braking torque control means for controls the driving/braking torque of the wheel based on the ratio between the variation of the longitudinal force and the variation of the slip rate obtained by the obtaining means. The longitudinal (driving/braking) force control process by system control unit 206 is the process shown in FIG. 37.

In this embodiment, a vehicle state estimating process is achieved by using the information which represents the relationship between the ratio between the wheel longitudinal force and wheel slip rate and the ratio between the longitudinal force variation and the slip rate variation and which indicates that, when the ratio between the longitudinal force and the slip rate is equal among values obtained at various road surface mu values, the ratio between the longitudinal force variation and the slip rate variation are equal among values obtained at the respective road mu values, by determining the ratio between the longitudinal force variation and the slip rate variation corresponding to the ratio between the sensed longitudinal force and the sensed slip rate, and then by estimating the tire friction state based on the obtained ratio between the longitudinal force variation and the slip rate variation.

Furthermore, in this embodiment, a braking/driving force control process of controlling a braking/driving torque of a wheel is achieved by using the information which represents the relationship between the ratio between the wheel longitudinal force and wheel slip rate and the ratio between the longitudinal force variation and the slip rate variation and which indicates that, when the ratio between the longitudinal force and the slip rate is equal among values obtained at various road surface mu values, the ratio between the longitudinal force variation and the slip rate variation are equal among values obtained at the respective road mu values, by determining the ratio between the longitudinal force variation and the slip rate variation corresponding to the ratio between the sensed longitudinal force and the sensed slip rate, and then by controlling the braking/driving torque of the wheel based on the obtained ratio between the longitudinal force variation and the slip rate variation.

In this embodiment, the storage medium such as a memory for storing the longitudinal force characteristic index map serves as a storage medium storing the information to estimate the vehicle state, and a storage medium storing the information representing the relationship between the ratio between the wheel longitudinal force and the wheel slip rate and the ratio between the longitudinal force variation and the slip rate variation, and serves as a storage medium that stores the tire friction state estimation information indicating that, when the ratio between the longitudinal force and the slip rate is equal among values obtained at various road surface mu values, the ratio between the longitudinal force variation and the slip rate variation is equal among values obtained at the respective road surface mu values.

In this embodiment, a vehicle state estimation apparatus or system is realized by providing means for sensing a wheel longitudinal force, a means for sensing a wheel slip rate or slip ratio, a trend estimating means for estimating a trend or tendency of the ratio between the longitudinal force variation and the slip rate variation based on the longitudinal force sensed by the longitudinal force sensing means and the slip rate sensed by the slip rate sensing means, and a friction state judging means for judging the tire friction state of the wheel based on the trend of the ratio estimated by the trend estimating means.

In this embodiment, moreover, a longitudinal force control apparatus or system is realized by providing means for sensing a wheel longitudinal force, a means for sensing a wheel slip rate or slip ratio, a trend estimating means for estimating a trend or tendency of the ratio between the longitudinal force variation and the slip rate variation based on the longitudinal force sensed by the longitudinal force sensing means and the slip rate sensed by the slip rate sensing means, and a braking/driving torque controlling means for controlling the braking/driving torque of the wheel based on the trend of the ratio estimated by the trend estimating means.

The longitudinal force sensing means is achieved by longitudinal force calculating section 212, and the slip rate sensing means is achieved by slip rate calculating section 11. The trend estimating means is achieved by longitudinal force characteristic index calculating section 215. The friction state judging means is realized by correction output calculating section 218. The braking/driving torque controlling means is achieved by longitudinal force characteristic index calculating section 215 and correction output calculating section 218.

Moreover, in this embodiment, a vehicle state estimating process is achieved by estimating the trend of the ratio of the longitudinal force variation and slip rate variation from the ratio of the wheel longitudinal force and wheel slip rate, and by estimating the tire friction state from the result of the estimation. Moreover, in this embodiment, a longitudinal force controlling process is achieved by estimating the trend of the ratio of the longitudinal force variation and slip rate variation from the ratio of the wheel longitudinal force and wheel slip rate, and by controlling the braking/driving torque of the wheel in accordance with the result of the estimation.

(Effects)

The system according to this embodiment can provide the following effects.

(1) The system estimates the longitudinal force characteristic index indicative of the ratio of the longitudinal force variation and the slip rate variation (or the trend of the ratio) on the basis of the ratio between the wheel longitudinal force and wheel slip rate, and judges the drive wheel tire friction state in accordance with the result of the estimation. Thus, if it is possible to sense the wheel longitudinal force and slip rate, the system can determine the ratio between the longitudinal force variation and slip rate variation from the ratio of the longitudinal force and slip rate.

Accordingly, even when the tire grip force is in the limit region, the system can estimate the tire friction state, and the state quantity representing the vehicle state reliably. The relationship between the ratio of the longitudinal force and slip rate and the ratio of the longitudinal force variation and slip rate variation is constant regardless of the road surface mu. Therefore, the system can estimate the tire friction state adequately regardless of the road surface mu, and estimate the vehicle state accurately.

Therefore, unlike the comparative method of earlier technology using the slope of a straight line passing through the origin and the point corresponding to the wheel slip rate of the wheel and the road surface friction coefficient, as the state quantity for controlling the wheel longitudinal force, the system according to this embodiment can estimate the tire friction state and the vehicle motion state adequately even when the grip force of the tire is in the limit region.

(2) The longitudinal force characteristic index map includes the information that, as the ratio between the longitudinal force and slip rate increases, the ratio between the longitudinal force variation and slip rate variation (the partial differential coefficient of the longitudinal force with respect to the slip rate) increases. That is, the map includes the information about the case in which the tire friction state or the vehicle state is in a stable region or a near-stable region. By using the longitudinal force characteristic index map containing such information, the system can determine the ratio between the longitudinal force variation and slip rate variation easily from the ratio between the longitudinal force and slip rate. Consequently, the system can estimate the tire friction state accurately, and control the vehicle driving/braking force adequately. Furthermore, the system can estimate the tire friction state or the vehicle state in the stable region or in the near-stable region, so that the system can carry out a stable driving/braking force control.

(3) The tire friction state (or vehicle state) is estimated by using the longitudinal force characteristic index map representing the characteristic curve in the coordinate system having the ratio between the longitudinal force and slip rate and the ratio between the longitudinal force variation and slip rate variation as the axes, or by using the functional expression having as variables the ratio between the longitudinal force and slip rate and the ratio of the longitudinal force variation and slip rate variation. Therefore, the system can determine the ratio between the longitudinal force variation and slip rate variation easily from the ratio between the longitudinal force and slip rate. Therefore, the system can estimate the tire friction state and the vehicle motion state accurately. Moreover, the system can control the driving/braking force of the vehicle adequately.

(4) On the basis of the wheel load, the longitudinal force characteristic index map is corrected or adjusted. Therefore, the system can improve the estimation accuracy of the longitudinal force characteristic index (the ratio between the longitudinal force variation and slip rate variation).

(5) On the basis of the wheel load, the longitudinal force characteristic index map is adjusted so as to change the size of the characteristic curve of the longitudinal force characteristic index map while holding the shape of the characteristic curve in a similar form. That is, the system adjusts the longitudinal force characteristic index map by utilizing the manner of change of the characteristic curve in which a similar shape is retained. Therefore, the system can improve the estimation accuracy of the longitudinal force characteristic index (the ratio between the longitudinal force variation and slip rate variation.

(6) On the basis of the wheel load, the characteristic curve is corrected or adjusted to a similar form having a different size such that the greatest value of the characteristic curve in the longitudinal force characteristic index map is shifted on a straight line passing through the origin. The greatest value of the characteristic curve in the longitudinal force characteristic index map is the value indicating the ratio between the longitudinal force variation and slip rate variation in the in the linear region in which the longitudinal force varies linearly with the slip rate. By utilizing the property of the shift of this greatest value along the straight line passing through the origin of the longitudinal force characteristic index value map, the system corrects the characteristic curve, so that the system can improve the estimation accuracy of the longitudinal force characteristic index (the ratio of the longitudinal force variation and slip rate variation), and facilitate the correction.

(7) The system estimates the longitudinal force characteristic index indicating the ratio of the longitudinal force variation and slip rate variation from the longitudinal force and slip rate (S501 and S608), and controls the driving/braking force of the wheel in accordance with the result of the estimation (S503~S511).

Therefore, even when the tire grip force is in the limit region, the system can control the driving/braking force of the vehicle adequately. Moreover, the system can control the vehicle driving/braking force adequately regardless of the road surface mu since the relationship of the ratio of the wheel longitudinal force and wheel slip rate and the ratio of the longitudinal force variation and slip rate variation is constant regardless of the road surface mu. Therefore, unlike the earlier method of controlling the wheel driving/braking force based on the slope of a straight line passing through the point corresponding to the wheel slip rate and the road surface friction coefficient and the origin, the system of this embodiment can control the driving/braking force of the vehicle adequately even when the tire grip force is in the limit region.

(8) When the longitudinal force characteristic index becomes negative in the state in which the drive wheel is generating a driving torque, the system decreases the driving torque gradually until the longitudinal force characteristic index becomes positive (S502→S503→S504). Therefore, even in case of wheel spin in the state in which the tire grip force of the tire is in the limit region, the system can decrease the driving force within a required minimum range and stop the wheel spin, so that the driving force can recover promptly. When the tire grip force reaches the limit region and a wheel starts spinning, it is necessary, in general, to decrease the driving torque below the level immediately before the grip force reaches the limit region.

Figure 40:
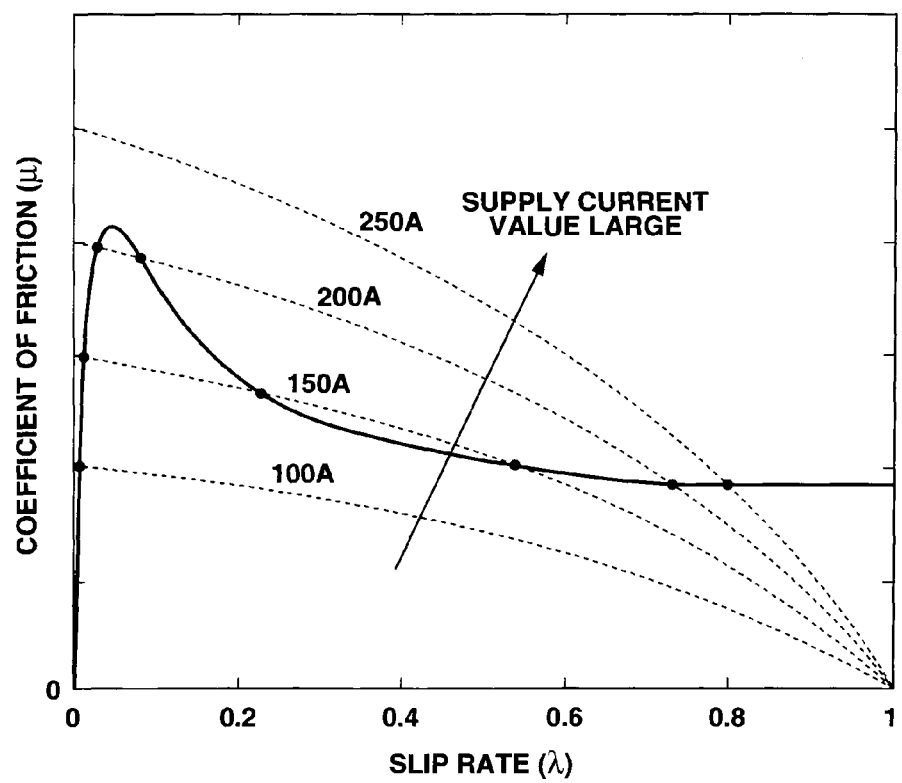
FIG. 40 is a characteristic view for illustrating a relationship between a supply current, the slip rate and the road surface μ.

As shown in FIG. 40, when the slip rate is small (0~0.05), and the tire is in the gripping condition, the driving force produced by the tire is increased as a supply current to driving motors 205FL and 205FR is increased. If the supply current exceeds a certain current value (for instance, 200 A), the tire grip force reaches the limit region and the slip rate increases (for instance, over 0.05), a wheel spin occurs in drive wheels 207FL and 207FR. Once the wheel spin occurs, even if the supply current is reduced to the current value (200 A) just before the occurrence of the wheel spin, the wheel spin does not end immediately. In the case of the characteristic of FIG. 40, in order to restore the tire to the gripping condition, the current has to be reduced to about 100 A.

Figure 41:
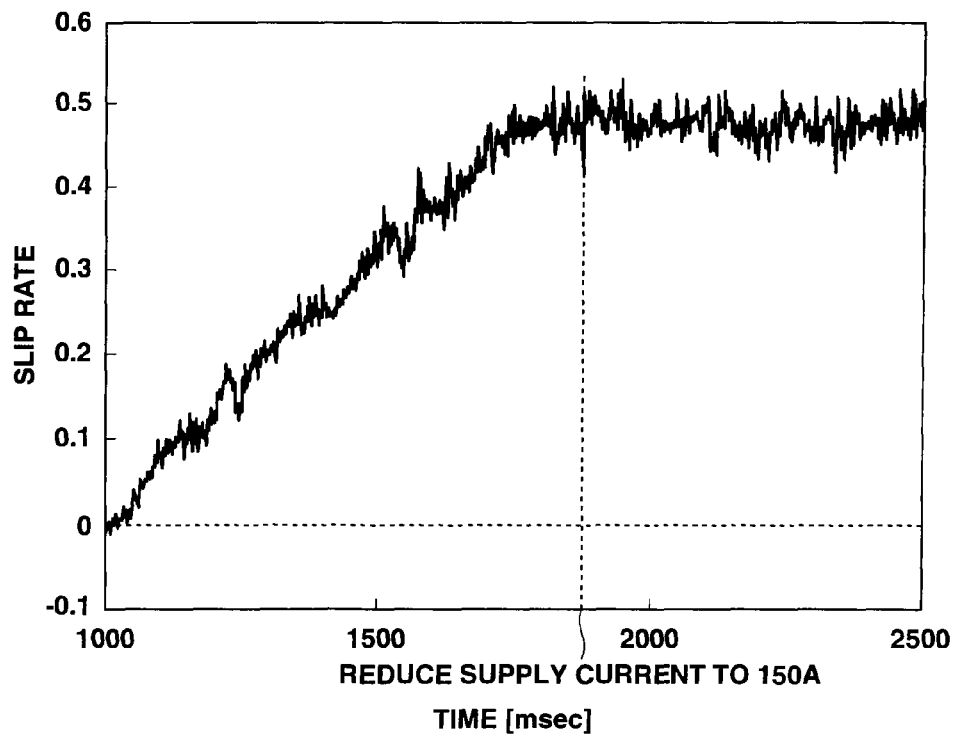
FIG. 41 is a time chart showing variation of the slip rate.

FIG. 41 is a time chart sowing simulation result when the supply current is decreased after the occurrence of wheel spin of drive wheels 207FL and 207FR. In this simulation, the supply current to the driving motors 205FL and 205FR is set at 250 A, and the supply current is reduced to 150 A after the occurrence of the wheel spin of drive wheels 207FL and 207FR. By this time chart, it is revealed that, even if the supply current is reduced to a value of 150 A that is lower than just before the wheel spin occurs, the wheel spin does not end.

The value of the driving torque at the time when the tire grip force reaches the limit region and the value of the driving torque for recovering the tire gripping condition are variable in dependence on the road surface mu. Therefore, since the detection of the road surface mu is difficult, it is necessary, in the case of earlier technology, to decrease the command (current value) greatly to a value which ensures the recovery of the tire gripping condition regardless of the road surface mu. By contrast, without requiring information about the road surface mu, the system according to the embodiment of the present invention can restore the tire to the griping condition with the command value (current value) determined accurately without excess and deficiency.

(9) When the longitudinal force characteristic index becomes negative under the condition in which the wheel is generating the braking torque, the system decreases the braking torque gradually until the longitudinal force characteristic index becomes positive. Therefore, even if the wheel locks under the condition in which the grip force of the tire is in the limit region, the system can decrease the braking force within a required minimum range and thereby release the wheel from the lock, so that the braking force can recover promptly.

(10) When the longitudinal force characteristic index decreases to a smaller positive value smaller than the first threshold value during generation of a driving torque by the drive wheel, the system suppresses the increase of the driving torque by driving motors 205FL and 205FR (S502→S505→S506→S507). Thus, by monitoring the behavior of the longitudinal force characteristic index during generation of the driving force, the system can foresee a sudden or unexpected wheel spin caused in dependence on the road condition. Accordingly, the system can prevent the occurrence of unexpected wheel spin in the low road surface μ condition, and stabilize the output of the driving force.

(11) When the longitudinal force characteristic index decreases to a smaller positive value smaller than the first threshold value during generation of the braking force by the wheel, the system suppresses the increase of the braking torque by driving motors 205FL and 205FR. By monitoring the behavior of the longitudinal force characteristic index during generation of the braking forced, the system can foresee a sudden or unexpected lock caused in dependence on the road surface condition. Accordingly, the system can prevent the occurrence of an unexpected lock in the low road surface μ condition, and stabilize the output of the braking force.

(12) When the longitudinal force characteristic index is positive at the time of generation of the driving torque by the drive wheel, and the accelerator pedal is depressed for acceleration with maximum acceleration, the system increase the driving torque gradually until the longitudinal force characteristic index becomes equal to a positive value less than or equal to the second threshold value (S503→S505→S509→S510→S511). Thus, by performing the control for controlling the longitudinal force characteristic index toward zero at the time of the maximum driving command, the system can perform the driving force control by making full use of the capacity of the tire to the limit.

However, the wheel spins if the longitudinal force characteristic index becomes negative. Accordingly, to restore the tire to the gripping condition, the driving torque has to be decreased below the level just before the grip force reaches the limit region. However, this leads to a reduction of the driving force. Therefore, it is preferable to use, as a target value of the longitudinal force characteristic index, the second threshold value involving a margin in consideration of the accuracy of controlled system, namely a positive value close to zero, to make the longitudinal force characteristic index positive securely. For example, in the earlier technology arranged to perform the driving/braking control so as to control the slip rate to a value in the vicinity of 20%, the tire generates a maximum driving force at a time just before the occurrence of a tire lock, that is, the time when the longitudinal force characteristic index becomes equal to zero.

(13) When the longitudinal force characteristic index is positive at the time of generation of the braking torque by the wheel, and the brake pedal is depressed for deceleration with maximum deceleration, the system increase the braking torque gradually until the longitudinal force characteristic index becomes equal to a positive value less than or equal to the second threshold value. Thus, by performing the control for controlling the longitudinal force characteristic index toward zero at the time of the maximum braking command, the system can perform the braking force control by making full use of the capacity of the tire to the limit.

However, the wheel locks if the longitudinal force characteristic index becomes negative. Accordingly, to restore the tire to the gripping condition, the driving torque has to be decreased below the level just before the grip force reaches the limit region. However, this leads to a reduction of the driving force. Therefore, it is preferable to use, as a target value, the second threshold value involving a margin in consideration of the accuracy of controlled system, namely a positive value close to zero, to make the longitudinal force characteristic index positive securely.

In the second embodiment, the ratio (Fx/S) of longitudinal force (braking/driving force) Fx and the slip rate or ratio S (λ) corresponds to the input which is the ratio of the wheel force and the wheel slipping or slip degree; the slope of tangent to the tire characteristic curve determined by longitudinal force Fx and slip rate S corresponds to the output which is the grip characteristic parameter representing the wheel grip characteristic; the relationship of FIG. 28 corresponds to the relationship between the input and output, and the curve of FIG. 28 corresponds to the grip characteristic curve. In FIG. 28, the point at which the grip characteristic curve intersects the horizontal axis can be called a crossover point. At this crossover point, the grip characteristic parameter (the tire characteristic curve tangent slope) is equal to a critical parameter value, and the ratio of longitudinal force Fx and slip rate S is equal to a critical ratio value. In this example, the critical parameter value is equal to zero. When the ratio of the longitudinal force and the slip rate increases from the critical ratio value, the grip characteristic curve extends from the crossover point to an end point. At the end point, the grip characteristic parameter is equal to a greatest parameter value. As shown in FIG. 31, the grip characteristic curve is modified in accordance with variation of the wheel load so that the end point is shifted on and along an oblique straight line passing through the origin. In this modification, the grip characteristic curve is modified in dependence on the wheel load so as to form a family of curves extending curvilinearly along one another without intersecting with one another in the region greater than the critical ratio value. When the wheel load becomes greater, the relationship between the input and output is modified so that the end point is shifted along the straight line passing through the origin in a direction away from the origin, and the crossover point is shifted on and along the horizontal axis of FIG. 31 in a direction away from the origin.

(Third Embodiment)

(Fundamental Principle Underlying Third Embodiment)

First, explanation is directed to technology on which the third embodiment is based.

Figure 50:
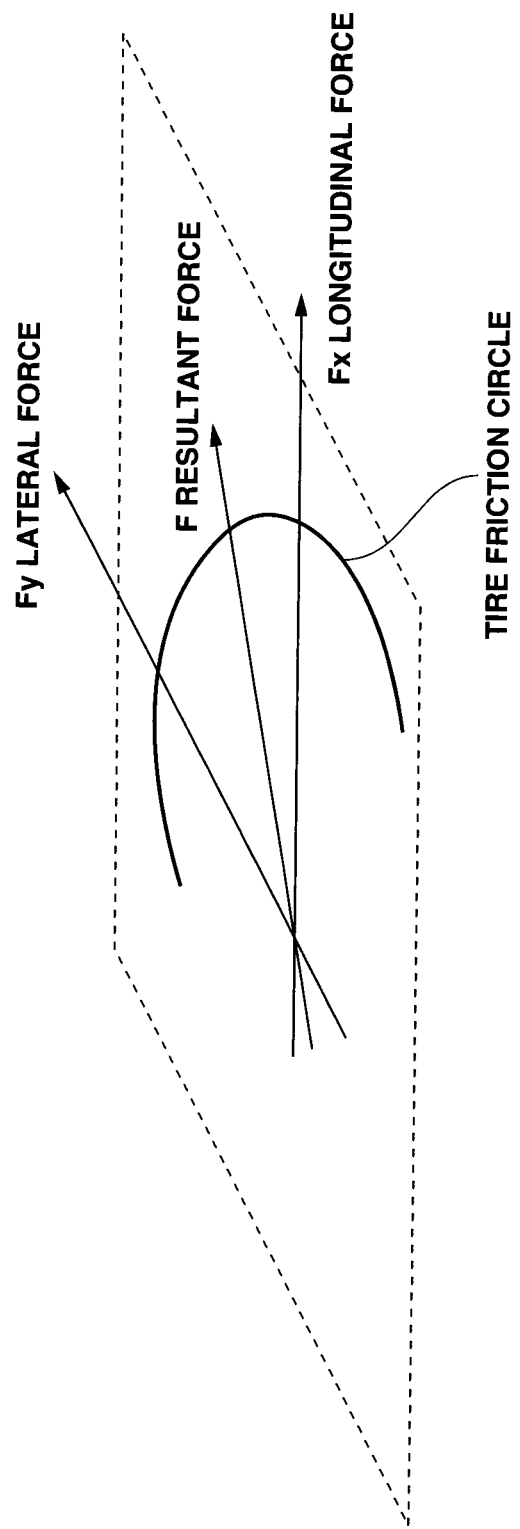
FIG. 50 is a view for illustrating technology underlying a third embodiment of the present invention, and more specifically a view showing a friction circuit in an orthogonal coordinate plane representing the braking/driving force (longitudinal force) Fx along an X axis, and the lateral force Fy along a Y axis.

FIG. 50 shows a friction circle described on an orthogonal coordinate plane represented by an X axis expressing a longitudinal or drive/brake force Fx and a Y axis expressing a lateral force Fy. The longitudinal force Fx and lateral force Fy are forces acting from a tire to a ground surface.

The tire friction circle shows a frictional limit to which a tire can maintain a friction state in a ground contact surface. The frictional limit is not yet reached, and the tire is in the state sustaining the friction state when the value of lateral force Fy, longitudinal force Fx or a resultant force resulting from lateral force Fy and longitudinal force Fx is within the friction circle (hereinafter, the lateral force Fy, longitudinal force and the resulting force of the lateral and longitudinal forces are generically referred to as a wheel force, as a generic term). When the value of the wheel force is equal to the friction circle, the tire is in the state producing a greatest frictional force. When an external force applied to the tire in the tire-ground contact surface is greater than the friction circle, the tire is in the state in which the friction state between the tire and the ground surface is lost, and a relative displacement between the tire and the ground source becomes greater, that is, the tire is in a so-called slipping state. Therefore, it is possible to judge that, as the magnitude of the wheel force approaches the radius of the friction circle, the frictional force approaches the greatest value which can be produced by the tire (the friction limit). In this way, it is possible theoretically to determine a margin, or the degree of margin or room, to the friction limit. However, the detection of the size of the tire friction circle is difficult in practice, and it is not possible hitherto to determine the margin to the friction limit based on the above-mentioned theory.

The size of the friction circle is determined by the greatest value of the frictional force between the tire and ground contact surface. The earlier technique hitherto known can only estimate the greatest value of the frictional force in the state exceeding the friction limit. Therefore, the system of the earlier technique cannot estimate the greatest value of the frictional force before the friction limit is reached, and to know the margin to the friction limit in the state before the friction limit, so that it is difficult to control the tire frictional force so as to prevent the friction limit from being reached. This embodiment of the present invention makes it possible to determine the margin to the friction limit directly without depending on the frictional force. The margin (or the degree of margin) to the friction limit is the slope of a tangent line on a tire characteristic curve as mentioned before regarding the first and second embodiments (represented by a grip characteristic parameter).

Next, the explanation is directed to a method for showing the margin to the friction limit with respect to the resultant force of the longitudinal force Fx and lateral force Fy.

Figure 51:
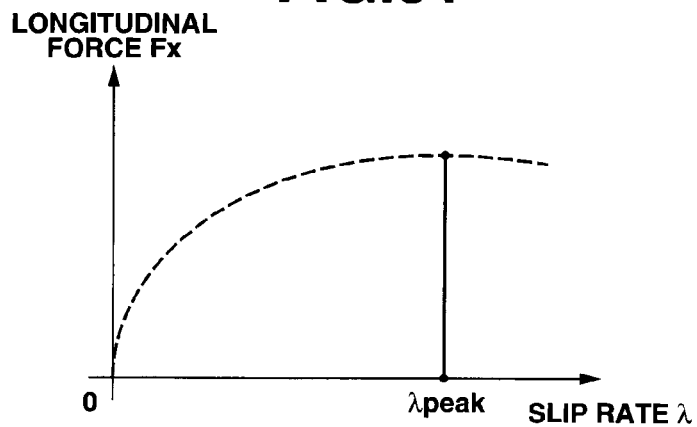
FIG. 51 is a view for illustrating a process of showing a relationship between the longitudinal force and the slip rate in a three dimensional coordinate system in the technology underlying the third embodiment.
Figure 52:
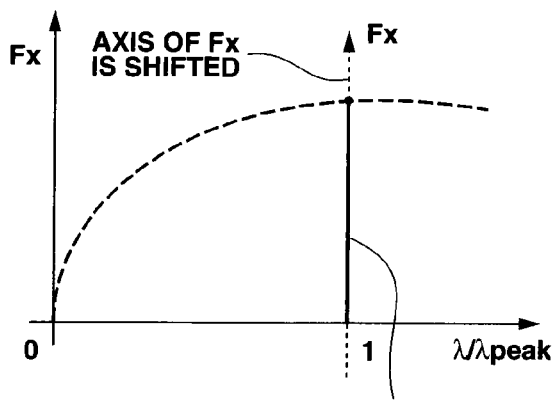
FIG. 52 is a view for illustrating the process of showing the relationship between the longitudinal force and the slip rate in the three dimensional coordinate system in the technology underlying the third embodiment, and more specifically a view showing a relationship the longitudinal force Fx and a nondimensionalized variable λ/λpeak (nondimensional longitudinal slip degree) so that the slip rate at which the longitudinal force becomes a peak is set equal to one.
Figure 53:
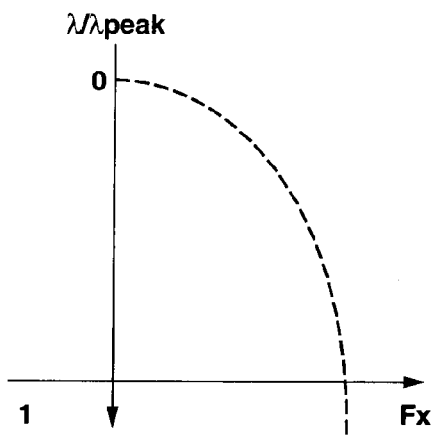
FIG. 53 is a view for illustrating the technology underlying the third embodiment, and more specifically a view obtained by rotating FIG. 52 by 90 degrees.
Figure 54:
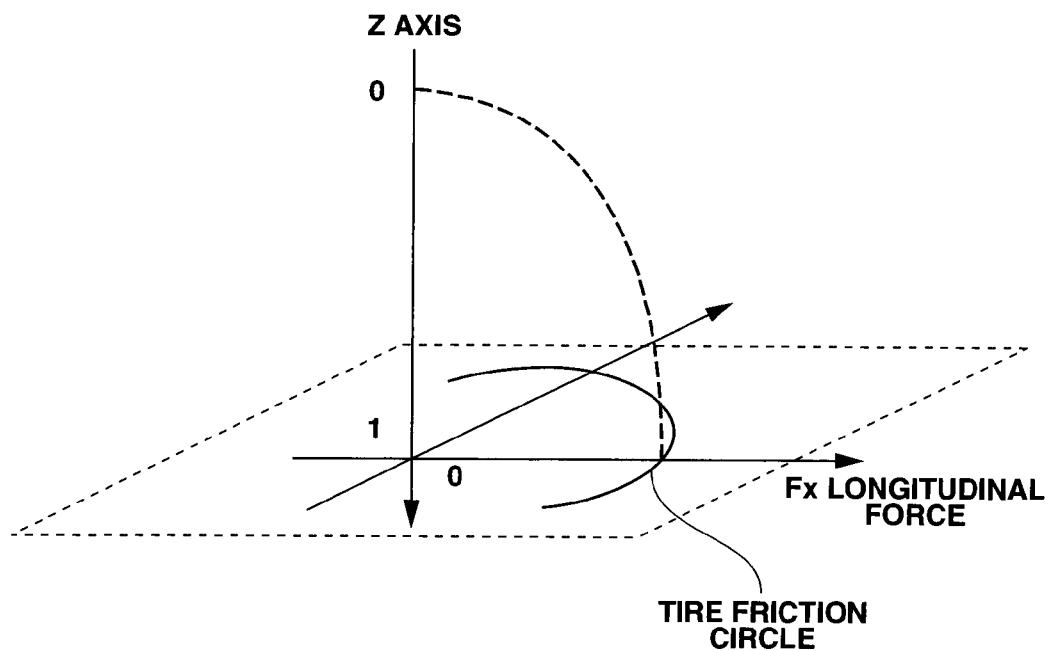
FIG. 54 is a view for illustrating the technology underlying the third embodiment, and more specifically a view showing FIG. 53 in one quadrant of the three dimensional coordinate system.

As shown in FIGS. 51~54, the relationship between the longitudinal force and the slip rate (or slip ratio) is depicted in a three dimensional coordinate system. In the relationship between the longitudinal force Fx and the slip rate λ, the slip rate at which the longitudinal force Fx becomes greatest is defined as λpeak, as shown in FIG. 51. Then, as shown in FIG. 52, the axis of slip rate is transformed into a non-dimensional axis of λ/λ peak which is made non-dimensional by setting λpeak equal to one. Thereafter, the relationship line between longitudinal force Fx and λ/λ peak is depicted in one quadrant of the three dimensional coordinate system, as shown in FIGS. 53 and 54. In FIG. 52, the slip rate is nondimensionalized so that the slip rate at which the longitudinal force reaches a peak is made equal to one, and the axis of Fx is shifted to the position at which the quantity of the slip rate is equal to one. FIG. 53 is obtained by rotating FIG. 52 through 90 degrees.

Figure 55:
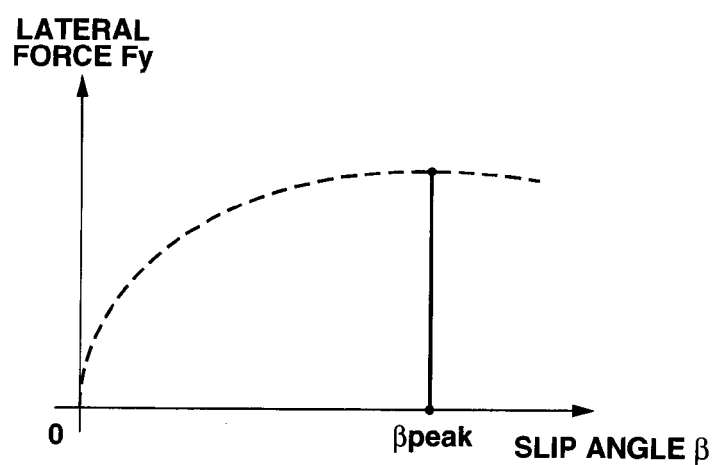
FIG. 55 is a view for illustrating the process of representing the relationship between the lateral force and the slip angle in a three dimensional coordinate system in the technology underlying the third embodiment.
Figure 56:
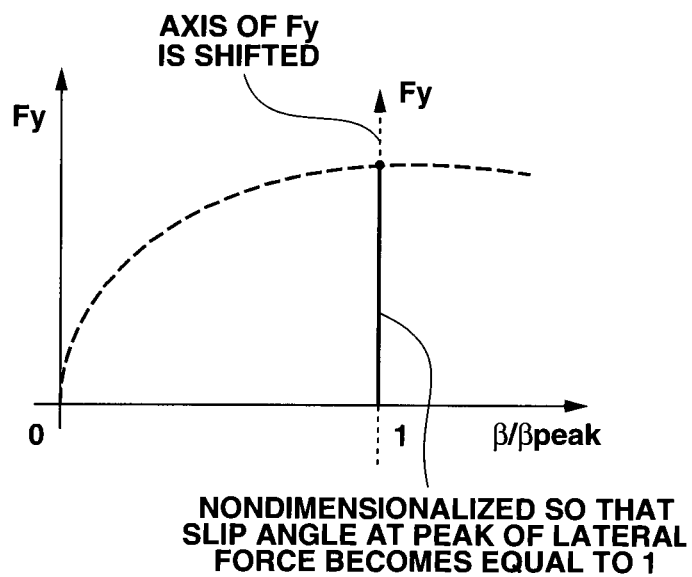
FIG. 56 is a view for illustrating the process of representing the relationship between the lateral force and the slip angle in the three dimensional coordinate system in the technology underlying the third embodiment, and showing the relationship between the lateral force Fy and a variable β/βpeak nondimensionalized so that the slip angle at which the lateral force forms a peak is equal to one.
Figure 57:
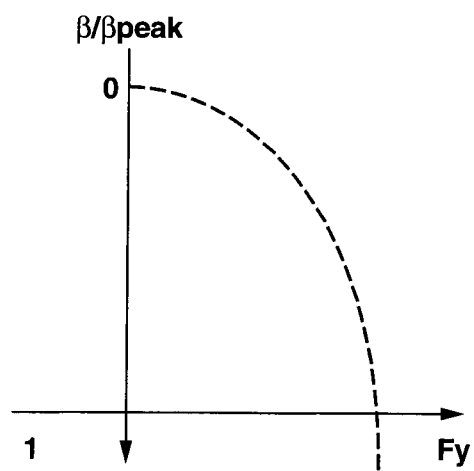
FIG. 57 is a view for illustrating the technology underlying the third embodiment, and more specifically a view obtained by rotating FIG. 56 by 90 degrees.
Figure 58:
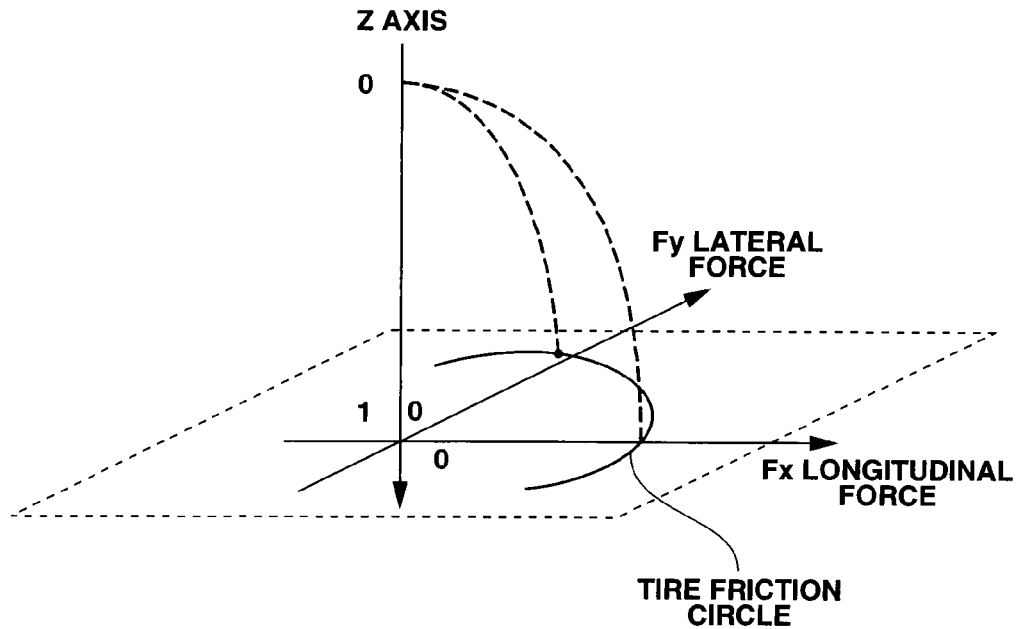
FIG. 58 is a view showing FIG. 57 in another quadrant of the three dimensional coordinate system different from the quadrant of the before-mentioned relationship line between longitudinal force Fx and λ/λpeak.

Then, as shown in FIGS. 55~58, the relationship between the lateral force and the slip angle is depicted in the three dimensional coordinate system. In the relationship between the lateral force Fy and the slip angle β, the slip angle at which the lateral force Fy becomes greatest is defined as λpeak, as shown in FIG. 55. Then, as shown in FIG. 56, the axis of slip angle β is transformed into a non-dimension axis of β/βpeak which is made non-dimensional by setting βpeak to one. Thereafter, as shown in FIGS. 57 and 58, the relationship line is depicted in another quadrant of the three dimensional coordinate system different from the quadrant of the before-mentioned relationship line between longitudinal force Fx and λ/λpeak. In FIG. 56, the slip angle is nondimensionalized so that the slip angle at which the lateral force reaches a peak is made equal to one, and the axis of Fy is shifted to the position at which the quantity of the slip angle is equal to one. FIG. 57 is obtained by rotating FIG. 56 through 90 degrees.

Figure 59:
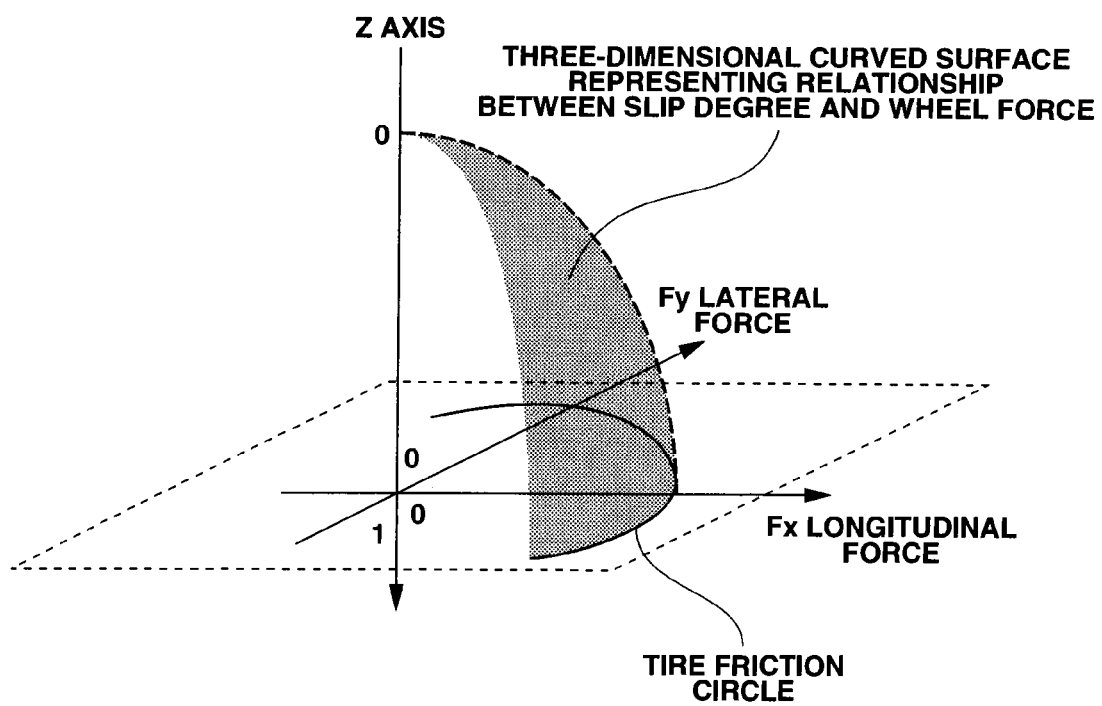
FIG. 59 is a view showing a three dimensional curved surface representing the relationship between the slipping degree and the wheel force, obtained from FIG. 58.

In the three-dimensional coordinate system of FIG. 58, a three-dimensional curved surface is obtained as shown in FIG. 59 by complementarily inserting an ellipse for each value along the z axis, between the relationship line of the longitudinal force and the slip rate (in the Fx-Z plane) and the relationship line of the lateral force and the slip angle (in the Fy-Z plane). This three-dimensional curved surface is a three-dimensional curved surface representing a relationship between a slip degree and a wheel force. The slip degree (Z) is used as a generic concept for naming generically the slip rate λ attributable to longitudinal force Fx and the slip angle β attributable to lateral force Fy. Accordingly, the Z axis shown in FIG. 59 is an axis representing the slip degree. In FIG. 59, the three-dimensional curved surface representing the relationship between the slip degree and the wheel force is shown partly only for a ¼ part and a little more of the entire circumference. However, the three-dimensional curved surface extends over the entire circumference in practice. Therefore, in this case, the three-dimensional curved surface representing the relationship between the slip degree and the wheel force is dome-shaped or hemispherical.

Figure 60:
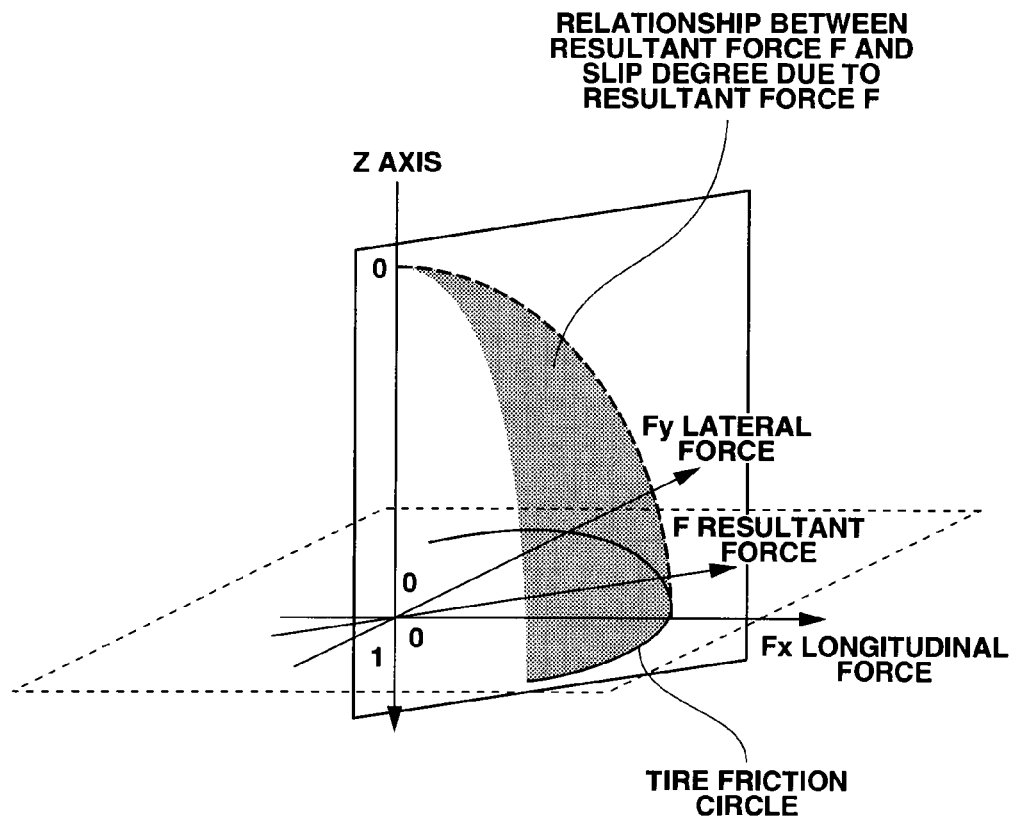
FIG. 60 is a view showing an intersection line between the three dimensional curved surface representing the relationship between the slipping degree and the wheel force, and a plane containing a vector of a resultant force of the longitudinal force Fx and lateral force Fy, and a Z axis.
Figure 61:
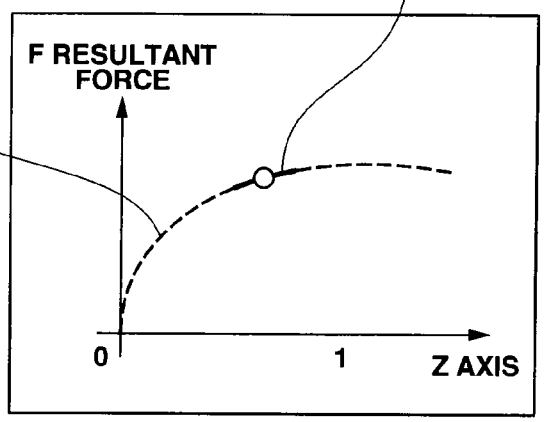
FIG. 61 is a view showing a tire characteristic curve representing a relationship between the resultant force and the slipping degree due to the resultant force, obtained by rotating the intersection line of FIG. 60 through 90 degrees. The slope of tangent to the tire characteristic curve represents a margin to the tire friction limit.

As shown in FIG. 59, it is possible to depict the slip rate λ and slip angle β which are different in the unit of measurement in the same coordinate system by nondimensionalization into λ/λpeak and β/β peak, respectively. Therefore, the curved surface formed between the Fx-Z plane containing the Fx axis and Z axis, and the Fy-Z plane containing the Fy axis and Z axis represents a set of relationship lines between the resultant force F of the longitudinal force Fx and lateral force Fy, and the slip degree attributable to the resultant force F, as shown in FIG. 60. The slip degree attributable to the resultant force F is a concept formed by combining the slip rate λ and slip angle β. In the three-dimensional coordinate system, there are a countless number of combinations of the magnitude and direction of the resultant force resulting from different combinations of the scalar quantity and direction of longitudinal force Fx and the scalar quantity and direction of lateral force Fy. In this practical example, the wheel force (F) may act in any direction over 360 degrees around the Z axis, and the illustrated practical example is adapted for a10 directions. The relationship between the resultant force F and the slip degree attributable to the resultant force F is shown in the plane containing the Z axis and the resultant force F in FIG. 60. FIG. 61 is obtained by rotating this plane through 90 degrees. There are a countless number of planes containing the Z axis and resultant force F depending on the direction of the resultant force F around the Z axis, and these planes form a sheaf of planes having the Z axis as the axis. Each plane includes a two-dimensional characteristic curve as shown in FIG. 61.

The following is explanation on the margin (or the degree of margin) of the resultant force F to the friction limit in the three-dimensional coordinate system. The tire characteristic curve shown in FIG. 61 is a line of intersection between the three-dimensional curved surface representing the relationship between the slip degree and the wheel force as shown in FIG. 60 and the flat plane containing the vector of resultant force F and the Z axis. As the slope of a tangent line to the tire characteristic curve of FIG. 61 becomes closer to zero from a positive value, the condition becomes closer to the friction limit. Therefore, if the slope of the tangent line to the tire characteristic curve is sensed, then it is possible to determine the margin to the friction limit in the state before the friction limit is reached. When the slope of the tangent line to the tire characteristic curve of FIG. 61 is negative, the tire is in the state in which the frictional force is saturated, that is, the slip state.

Figure 62:
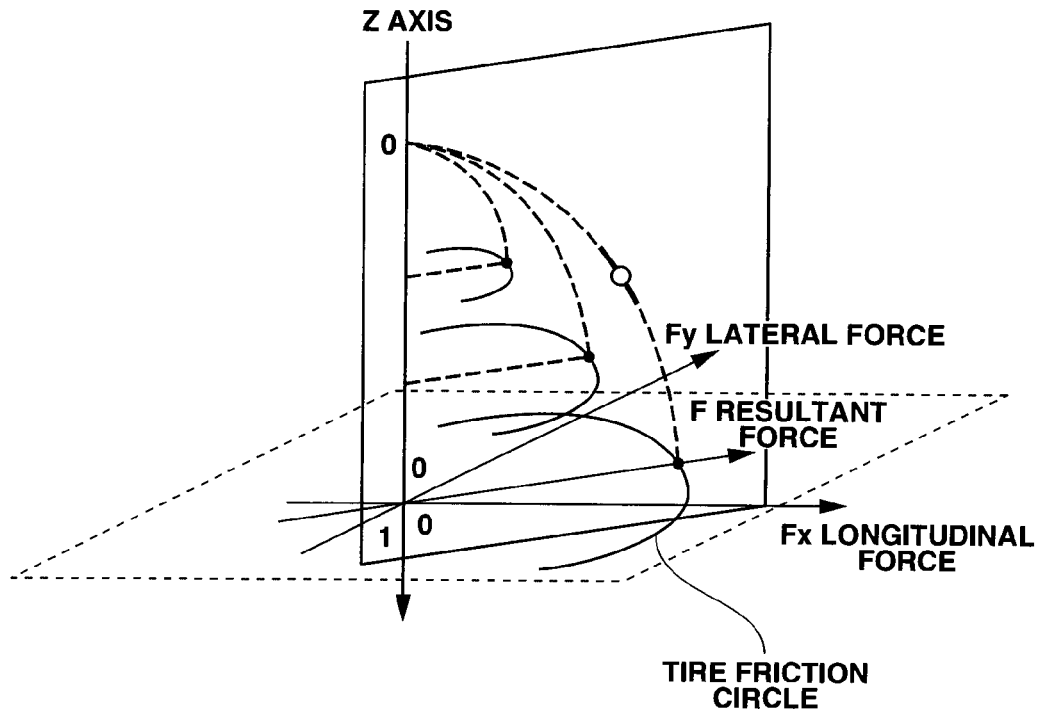
FIG. 62 is a view for illustrating the technology underlying the third embodiment, and more specifically a view for showing tire friction circles of different sizes in the three dimensional coordinate system.
Figure 63:
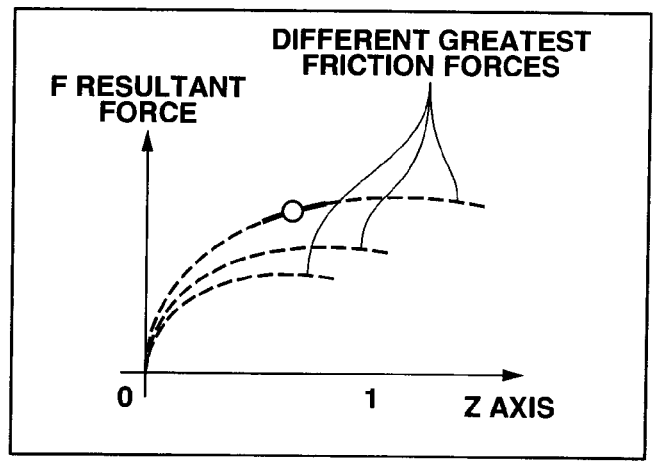
FIG. 63 is a view for illustrating the technology underlying the third embodiment and more specifically a view sowing variation of the tire characteristic curve due to the difference in magnitude of the greatest friction force determining the size of the friction circle.

However, as mentioned before, the size of the tire friction circle is determined by the greatest value of the friction force between the tire and the ground contact surface (hereinafter referred to as "greatest friction force"). Therefore, as shown in FIGS. 62 and 63, the tire characteristic curve changes in dependence on the magnitude of the greatest friction force. Since it is not possible to estimate the greatest value of the friction force before the friction limit is reached, as mentioned before, the application to the vehicle control is not feasible if nothing is done.

Figure 64:
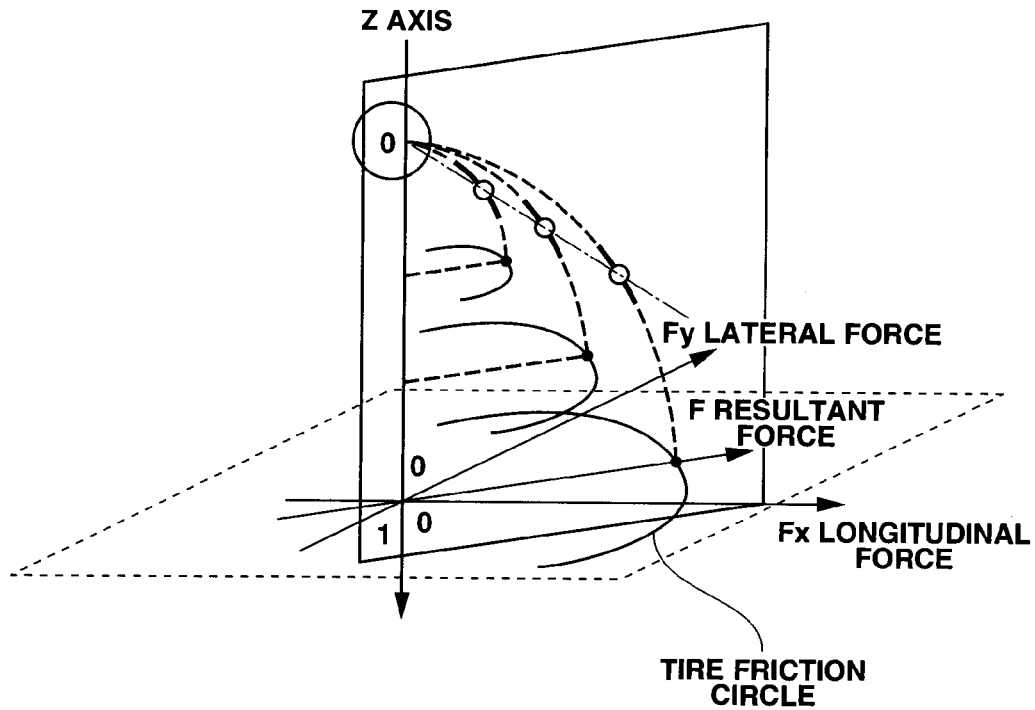
FIG. 64 is a view of the three dimensional coordinate system for showing that the slope at an intersection point between the tire characteristic curve and a straight line passing through the origin O (the point at which the slipping degree and wheel force are both equal to zero) is constant without regard to the magnitude of the greatest friction force.
Figure 65:
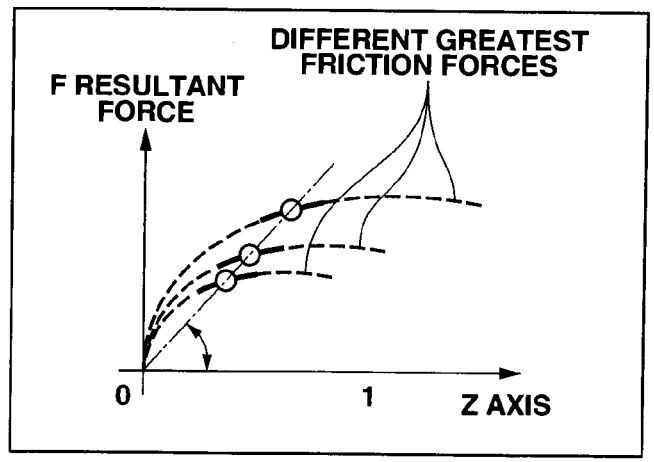
FIG. 65 is a view of the two dimensional coordinate system for showing that the slope at an intersection point between the tire characteristic curve and a straight line passing through the origin O (the point at which the slipping degree and wheel force are both equal to zero) is constant without regard to the magnitude of the greatest friction force.
Figure 66:
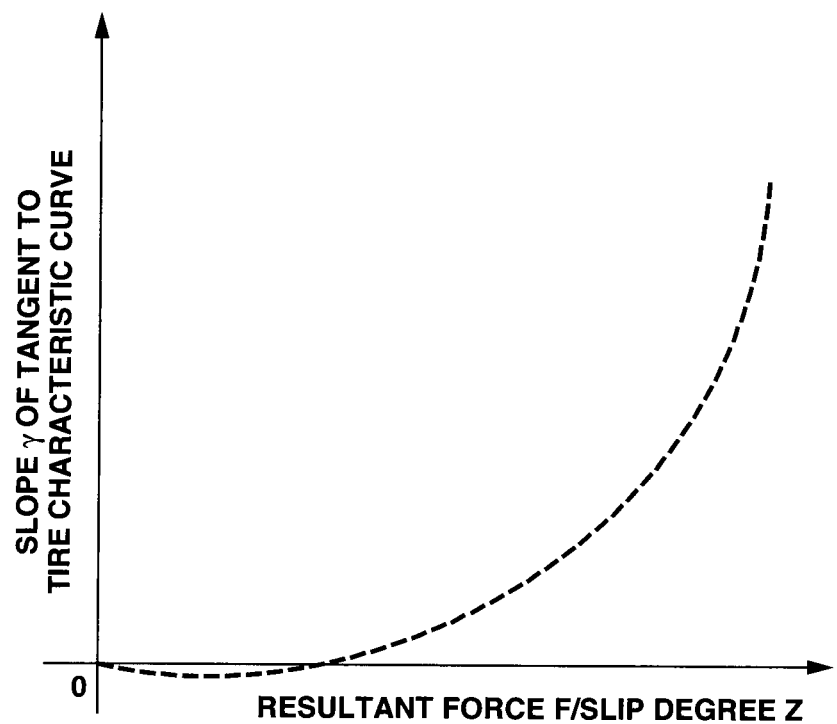
FIG. 66 is a view for illustrating the technology underlying the third embodiment, and more specifically a view showing the relationship between the slope of tangent to the tire characteristic curve and the ratio of the resultant force and the slipping degree.

As shown in FIGS. 64 and 65, the slope at a point of intersection between the tire characteristic curve and a straight line (shown by a one dot chain line in FIG. 64) passing through the origin O (at which the slip degree and the wheel force are both equal to zero) is constant irrespective of the magnitude of the greatest friction force. With the use of this property, a single concentrated characteristic that is not dependent on the greatest friction force is obtained as shown in FIG. 66, by rearranging the slope of the tangent line on the tire characteristic curve with respect to the ratio of the resultant force F and slip degree Z. By preparing the characteristic of FIG. 66 beforehand, it is possible to determine the value of the slope of the tangent line to the tire characteristic curve if the magnitude of the resultant force F and the slip degree can be determined. That is, it is possible to determine the margin to the friction limit without using the greatest friction force.

The resultant force F and slip degree Z are determined in the following manner. The resultant force F can be determined according to a following mathematical expression (28) from longitudinal force Fx and lateral force Fy.

[Math 28]

$$F = \sqrt{Fy^2 + Fx^2} \qquad (28)$$

The slip degree Z is a value S/Speak obtained by combining λ/λ peak obtained by normalization of slip rate λ and β/βpeak obtained by normalization of slip angle β. Slip degree Z can be determined according to a following mathematical formula (29).

[Math 29]

$$Z = S/S_{PeakDry} = \sqrt{\left(\frac{\beta}{\beta_{PeakDry}}\right)^2 + \left(\frac{\lambda}{\lambda_{PeakDry}}\right)^2} \qquad (29)$$

In this equation, SPeakDry represents a value of the slip degree when the tire reaches the friction limit on a reference road surface (which is a dry road surface, in this example), and the slip degree SPeakDry is a constant stored in the system. Similarly, the quantities βPeakDry and λPeakDry represent values obtained when the pure lateral force or pure longitudinal force is saturated (cf. FIG. 55 and FIG. 51).

Figure 67:
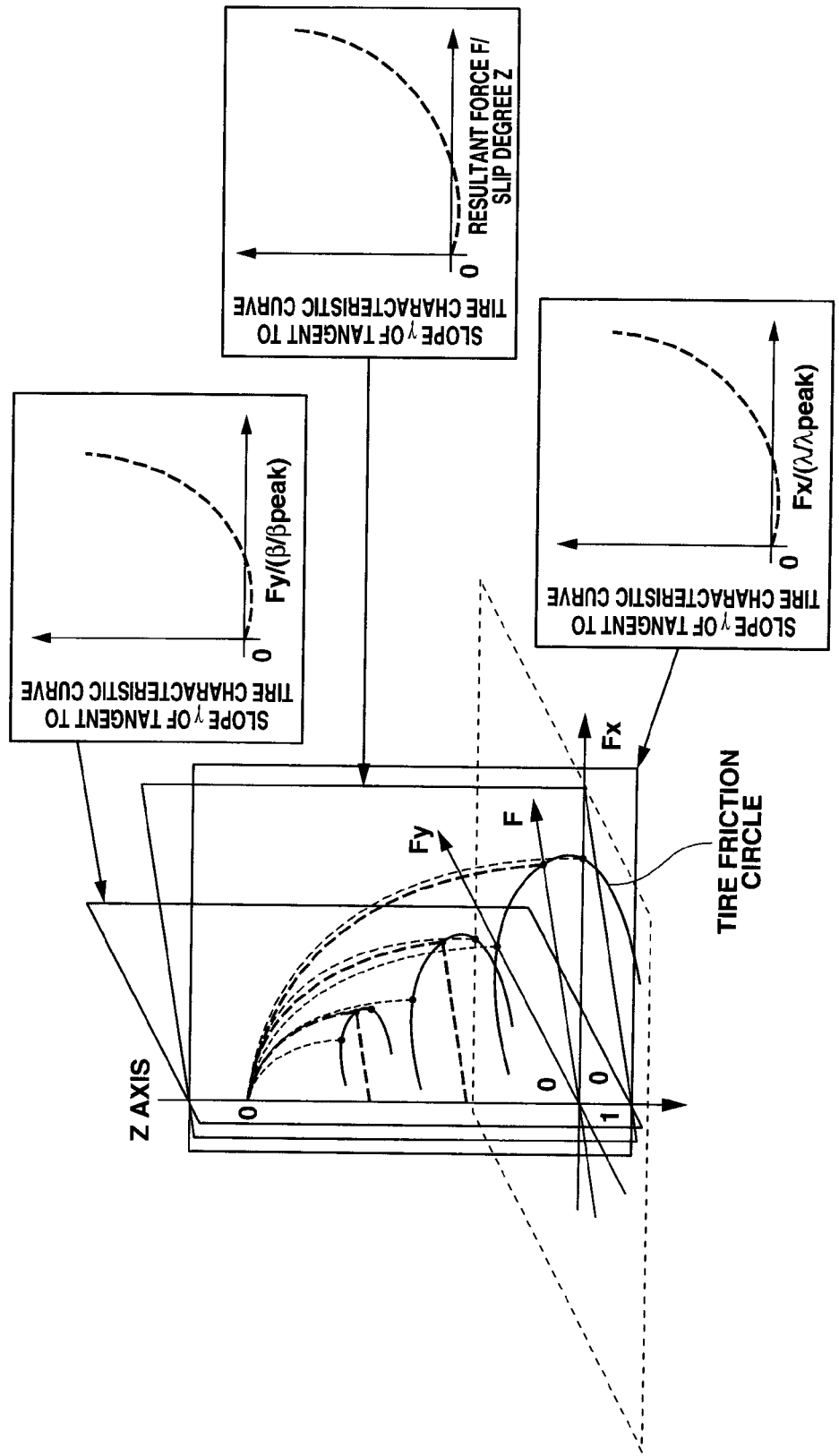
FIG. 67 is a view showing the relationship between the slope of tangent to one of a plurality of tire characteristic curves existing in dependence on the direction of the resultant force, and the ratio of the resultant force and the slipping degree.

Since the magnitude and direction of the resultant force F in the three-dimensional coordinate axes can assume a countless number of values because of different combinations of values of the scalar quantity and direction of longitudinal force Fx and the scalar quantity and direction of lateral force Fy, there are innumerable forms of the relationship, shown in FIG. 66, between "resultant force F/slip degree Z" and "slope of tangent to tire characteristic curve" in a countless number corresponding to the number of the directions of the resultant force F, as shown in FIG. 67. Accordingly, the innumerable forms of the relationship between "resultant force F/slip degree Z" and "slope of tangent to tire characteristic curve" are shown collectively in one three-dimensional coordinate system.

Figure 68:
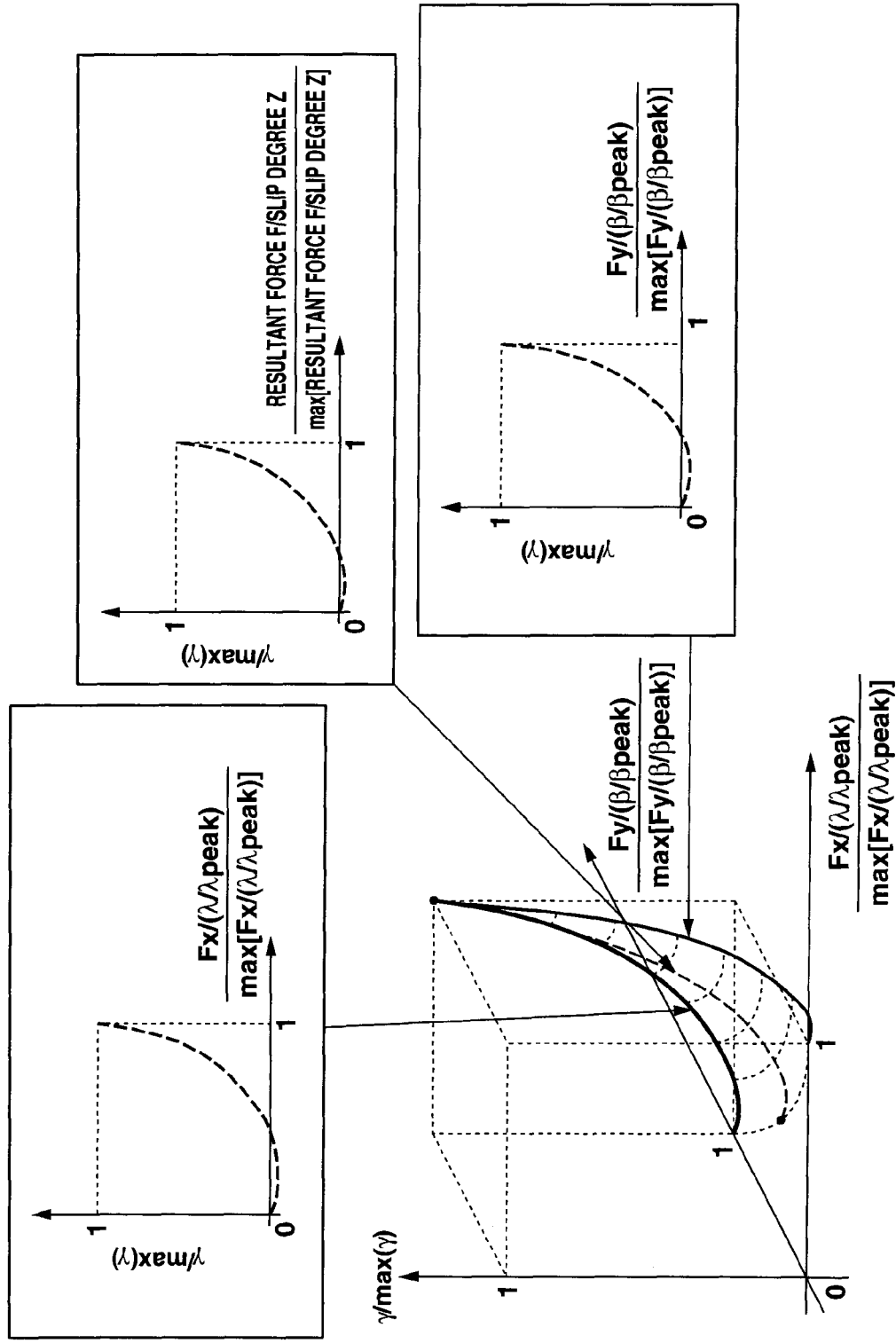
FIG. 68 is a view for illustrating the technology underlying the third embodiment, and more specifically a view showing many relationships of FIG. 67 collectively in the three dimensional coordinate system.
Figure 69:
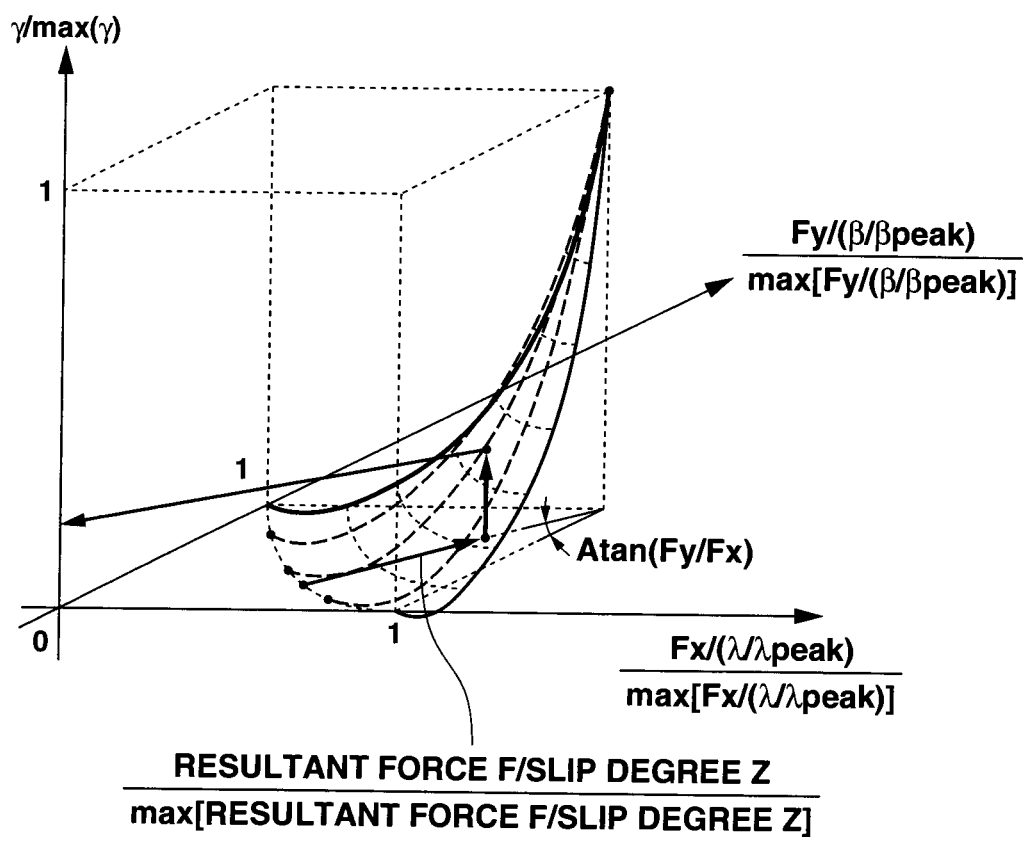
FIG. 69 is a view for illustrating the technology underlying the third embodiment, and more specifically a view showing the relationship between the slope γ of tangent to the tire characteristic curve and the force F/slipping degree Z, in the form of a curved surface.

As shown in FIG. 68, in the relationship between "the resultant force F/slip degree Z and the slope γ of tangent to the tire characteristic curve", the axis representing "resultant force F/slip degree Z" is nondimensionalized with the greatest value of "resultant force F/slip degree Z" so as to make the maximum value of "resultant force F/slip degree Z" equal to one. Furthermore, the axis representing "slope γ (gamma) of tangent to tire characteristic curve" is normalized with the greatest value of "slope γ of tangent to tire characteristic curve" so as to make the greatest value of "slope γ of tangent to tire characteristic curve" equal to one. The relationship of the normalized "resultant force F/slip degree Z" and the normalized "slope γ of tangent to tire characteristic curve" is shown in the three-dimensional coordinate system as shown in FIG. 68. In this way, it is possible to depict the relationship between "slope γ of tangent to tire characteristic curve" and "resultant force F/slip degree Z" in the form of a curved surface as shown in FIG. 69. With the use of this curved surface prepared preliminarily, it is possible to determine "normalized value γ/max(γ) of the slope of tangent to tire characteristic curve" by determining a quotient resulting from division of "resultant force F/slip degree Z" by "max (resultant force F/slip degree Z)". As γ/max(γ) becomes closer to zero from positive, the condition approaches the tire friction limit. Namely, it is possible to know the margin to the friction limit without using the tire frictional force. When γ/max(γ) becomes negative in FIG. 69, the condition is in the state in which the frictional force is saturated, that is the slipping state.

Figure 70:
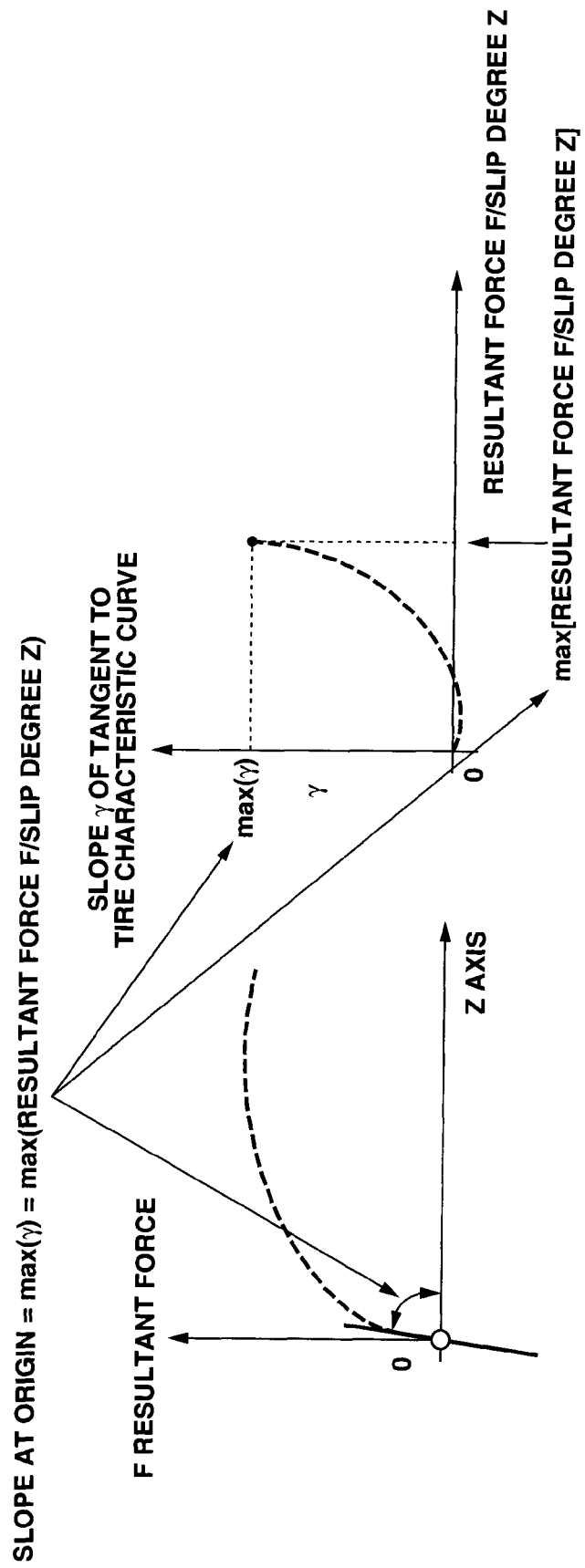
FIG. 70 is a view for illustrating the technology underlying the third embodiment, and more specifically a view showing max(resultant force F/slipping degree Z) and max(γ).

The quantities "max (resultant force F/slip degree Z)" and "max(γ)" are determined in the following manner. As shown in FIG. 70, max (resultant force F/slip degree Z) and max(γ) are the slope of tangent to the relationship curve between resultant force F and slip degree Z at the origin. This slope is invariable even if the frictional force acting on the tire contact surface varies. Therefore, it is easy to prepare the value of this slope preliminarily, and the max(resultant force F/slip degree Z) and max(γ) are set equal to the value of this slope. The quantity max(resultant force F/slip degree Z) is a constant of a fixed value corresponding to Fy/Fx ratio (the direction of the resultant force). It can be expressed as a function of Fy/Fx (the direction of the resultant force). The quantity max(resultant force F/slip degree Z) represents the greatest value of the slope of the wheel force/slip degree in the direction in which the wheel force is produced, and represents the slope in the linear state (corresponding to Cp in the linear region in the case in which only the lateral force is produced). The value of max(γ) is treated as a constant irrespective of whether the slip state is linear or nonlinear. However, max(γ) is varied when Fy/Fx ratio (the direction of the resultant force) is varied. This value is information item which is calculated (or measured) preliminarily and stored in an estimator.

Practical Example Utilizing the Fundamental Principle

The following is explanation on a vehicle behavior control based on the above-mentioned fundamental principle.

(Construction)

Figure 71:
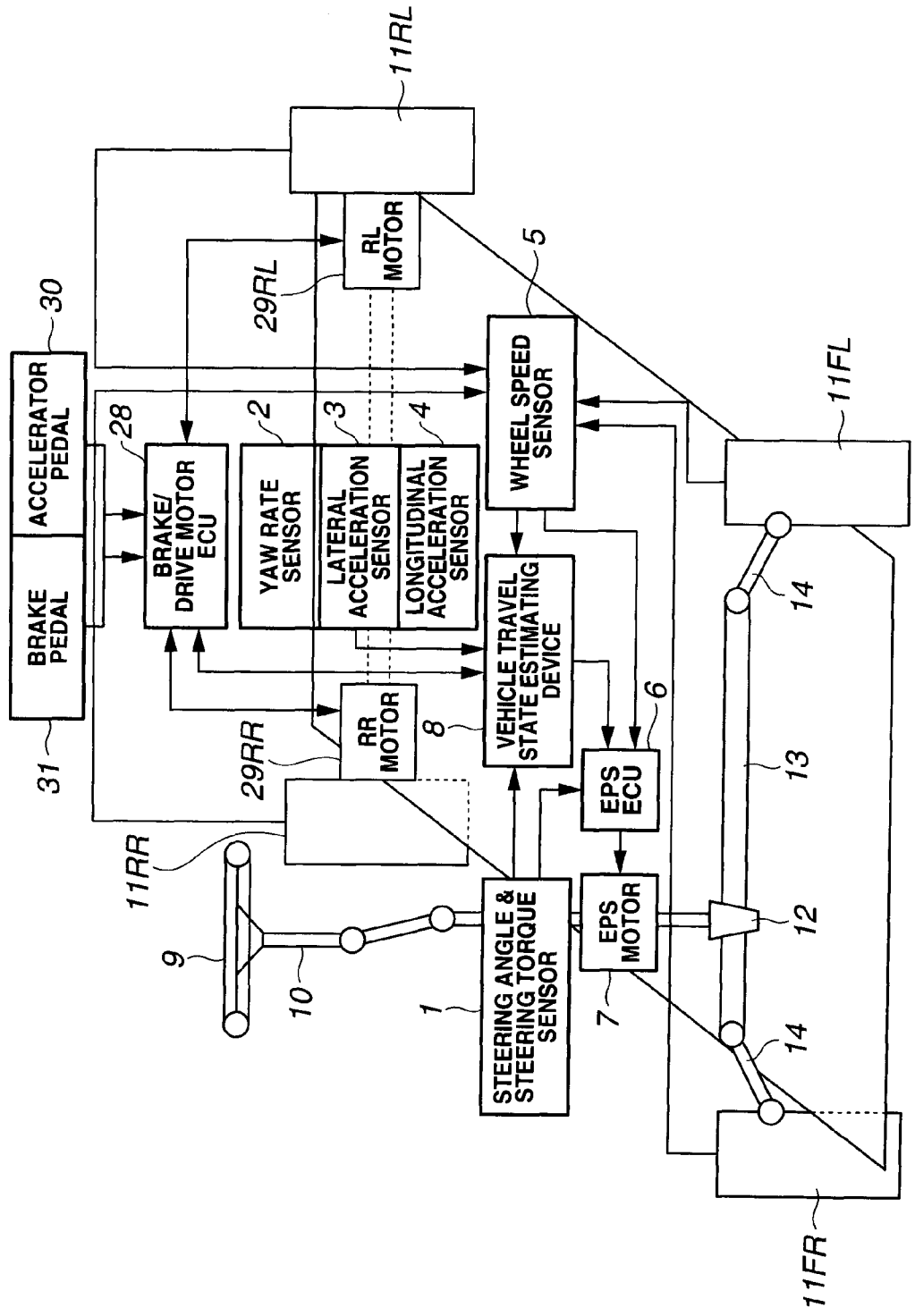
FIG. 71 is a schematic view showing the construction of a vehicle in a practical example according to the third embodiment.

FIG. 71 is a view schematically showing the construction of a vehicle in one practical example according to the third embodiment. In this practical example, the vehicle is an FR drive type vehicle arranged to drive rear wheels with motors 29RR and 29RL and to steer the vehicle with front wheels 11FR and 11FL, as shown in FIG. 71.

As shown in FIG. 71, the vehicle includes a brake/drive motor ECU (Electronic Control Unit) 28 configured to impart brake/drive torque to rear wheels 11RL and 11RR, electric actuators 29RL and 29RR which are brake/drive force control devices, and an EPSECU 6 configured to control an electric power steering system (EPS). In this practical example, the vehicle body travel state estimating device 8 estimates a vehicle traveling state in accordance with the results of sensor operations of a steering angle sensor 1, a yaw rate sensor 2, a lateral acceleration sensor 3, a longitudinal acceleration sensor 4 and a wheel speed sensor 5, and a longitudinal (brake/drive) force (force applied by a tire onto a road surface) estimated by brake/drive motor ECU 28. In accordance with the results of the estimation, the vehicle body travel state estimating device 8 outputs a brake/drive torque correction command to electric actuators 29FL and 29RR through brake/drive motor ECU 28. The brake/drive torque correction command is a command or control signal for performing a control to restrain unstable vehicle behavior. The unstable vehicle behavior indicates spinning of a tire due to the application of excessive drive torque, a lock (sliding without revolving) of a tire due to the application of excessive brake torque, and skid of a vehicle body (spin out, drift out).

In accordance with a steering torque sensed by steering angle & torque sensor 1, EPSECU 6 outputs a steering assist command to EPS motor 7. This steering assist command is a command signal to achieve the steering assistance. Moreover, in accordance with an unstable behavior restraint assist command (mentioned later), EPSECU 6 outputs a steering assist correction command to EPS motor 7. The steering assist correction command is a command signal to restrain the unstable behavior of the vehicle.

In accordance with the steering assist command and the steering assist correction command outputted from EPSECU 6, the EPS motor 7 imparts a rotation torque to steering shaft 10. By so doing, EPS motor 7 assists the steering movement of left and right front wheels 11FL and 11FR through a rack and pinion mechanism (pinion 12 and a rack 13) connected with the steering shaft 10, tie rods 14 and knuckle arms.

In a normal state (when the judgment of vehicle body travel state estimating device 8 is that the vehicle travel state is stable), the brake/drive motor ECU 28 controls the electric actuators 29FL and 29RR on the basis of signals inputted through accelerator pedal 30 and brake pedal 31 from the driver.

When vehicle body travel state estimating device 8 judges that the vehicle behavior comes close to an unstable state or the vehicle behavior is in the unstable state, then vehicle body travel state estimating device 8 outputs the brake/drive torque correction command, and the brake/drive motor ECU 28 calculates the brake/drive torque by addition to the input signals from accelerator 30 and brake 31, or overwriting, and controls the electric actuators 29FL and 29RR. Moreover, in the case of the judgment that the vehicle behavior comes close to an unstable state or the vehicle behavior is in the unstable state, EPSECU 6 outputs the steering assist correction command to correct the steering assist command delivered to EPS motor 7, in addition to, or in place of, the before-mentioned brake/drive torque correction command.

Figure 72:
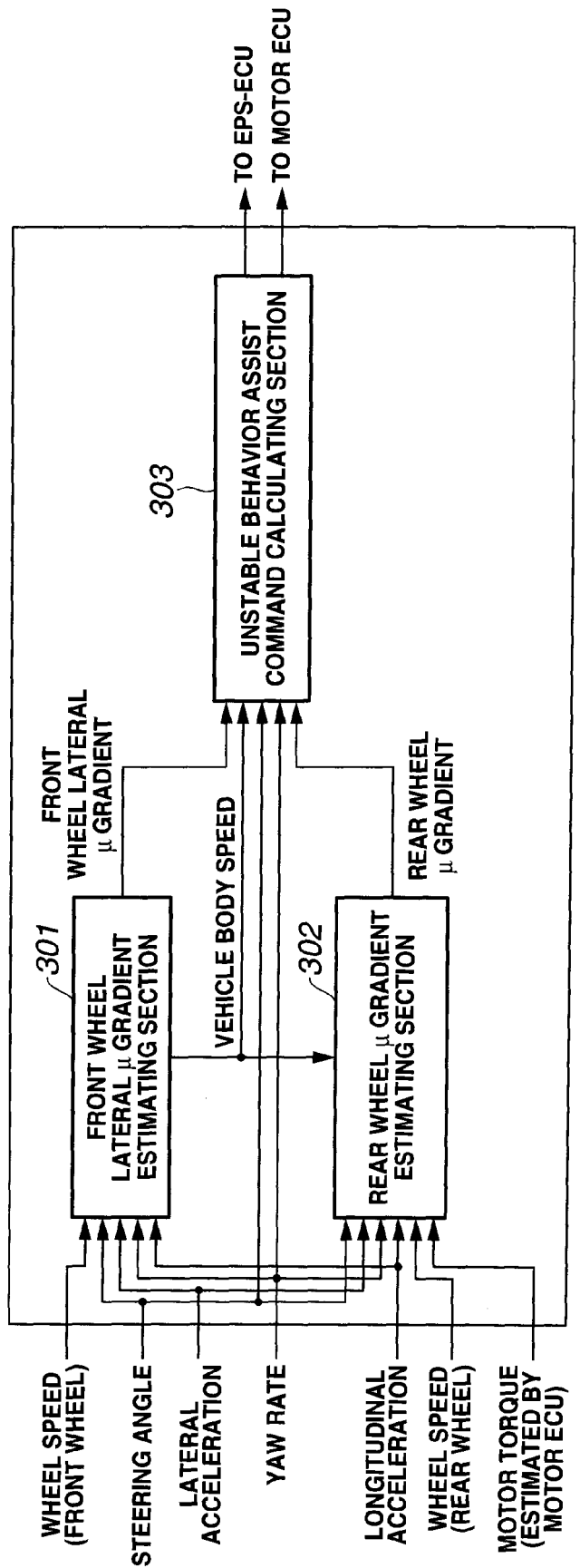
FIG. 72 is a view showing the whole of a vehicle travel state estimating device of FIG. 71.
Figure 75:
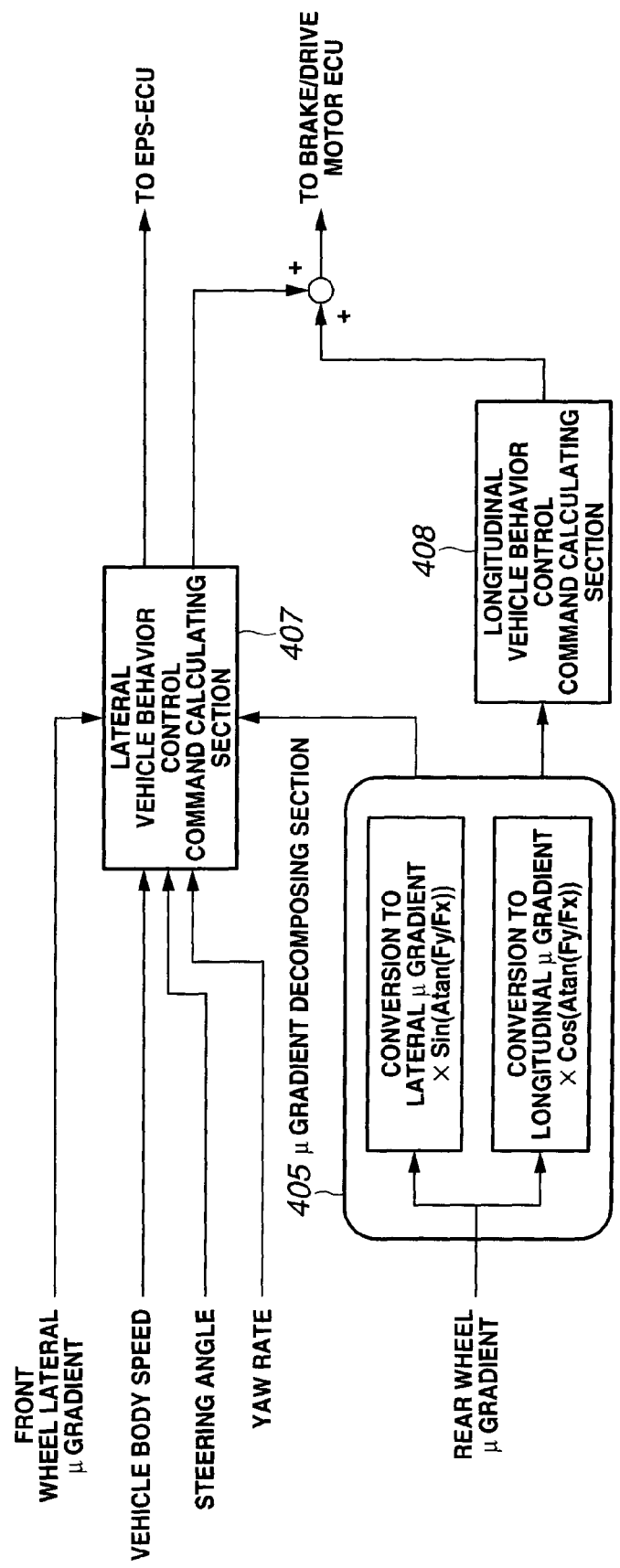
FIG. 75 is a view showing the construction of an unstable behavior assist command calculating section 303 shown in FIG. 72.

FIG. 72 shows the internal configuration of the vehicle travel state estimating device 8 of this practical example. As shown in FIG. 72, vehicle travel state estimating device 8 includes a front wheel lateral direction mu gradient estimating section 301 (FIGS. 73 and 74), a rear wheel mu gradient estimating section 302 (FIGS. 76 and 77) and an unstable behavior assist command calculating section 303 (FIG. 75).

Figure 73:
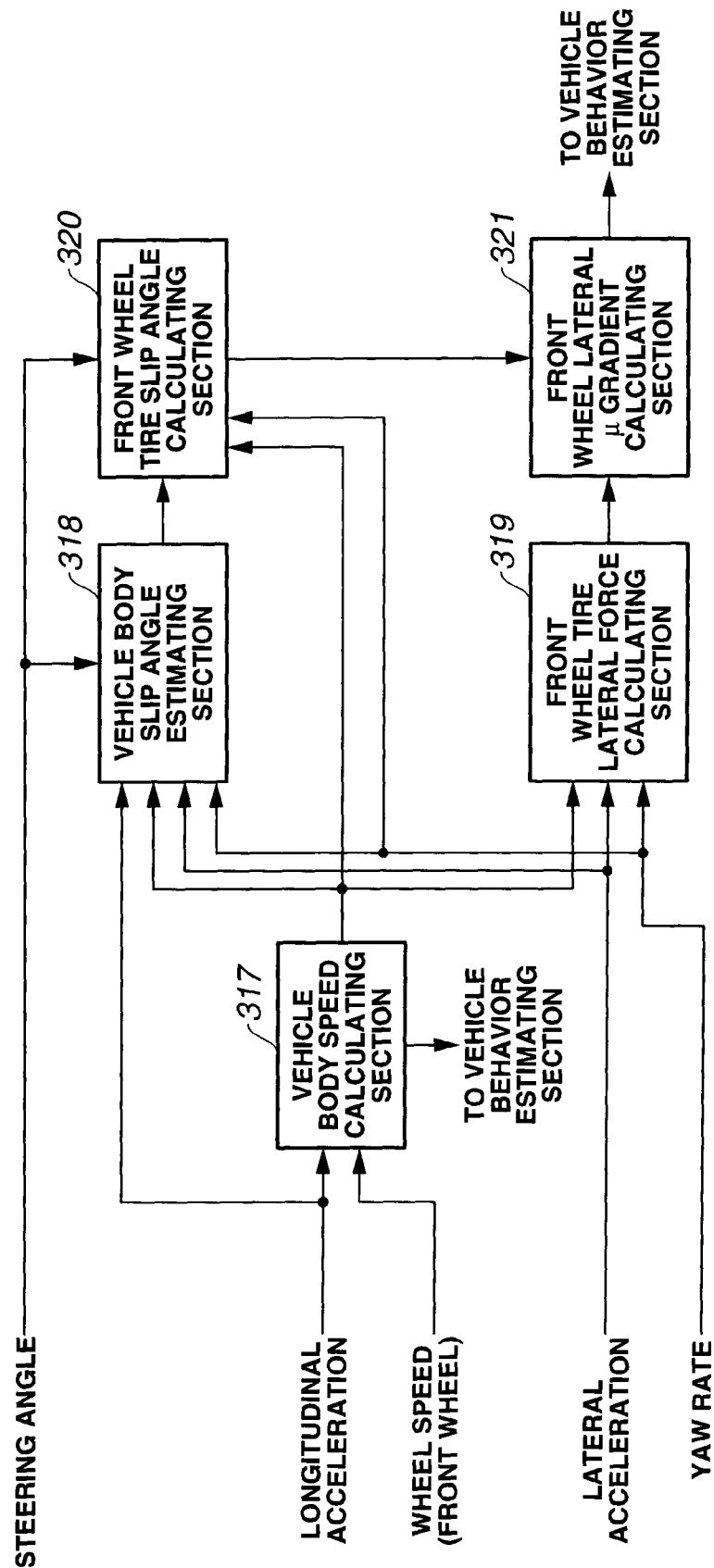
FIG. 73 is a view showing an estimation logic of a front wheel lateral mu gradient estimating section 301 in the vehicle travel state estimating device of FIG. 72.
Figure 74:
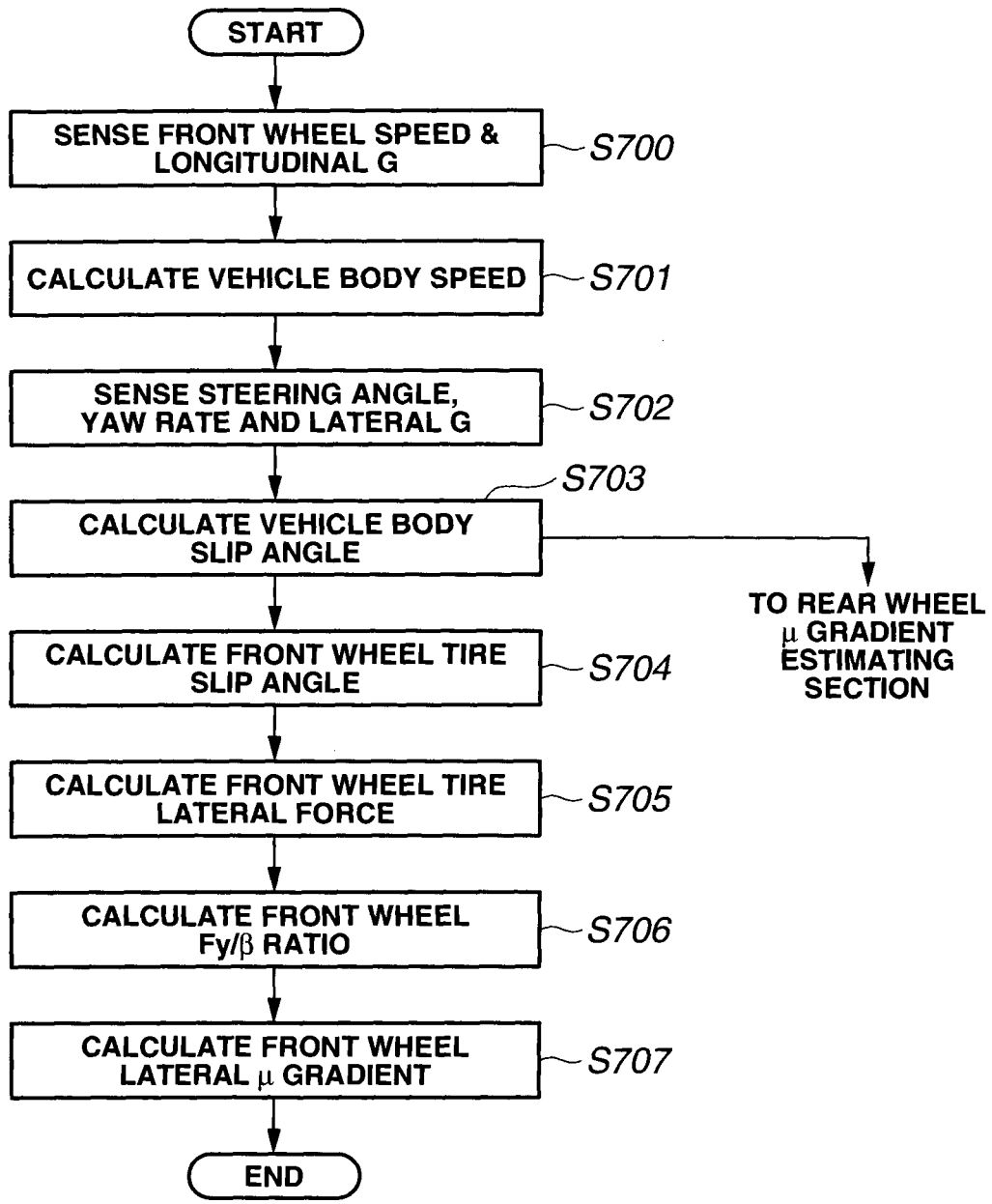
FIG. 74 is a flowchart of the front wheel lateral mu gradient estimating section.

As shown in FIG. 73, front wheel lateral μ gradient estimating section 301 includes a vehicle body speed calculating section 317, a vehicle body slip angle estimating section 318, a front wheel tire slip angle calculating section 320, a front wheel tire lateral force calculating section 319 and a front wheel lateral μ gradient calculating section 321.

Vehicle body speed calculating section 317 (corresponding to S701 in FIG. 74) estimates a vehicle body speed in accordance with the wheel speeds sensed by wheel speed sensor 5 and the longitudinal acceleration sensed by longitudinal acceleration sensor 4 (S700). Vehicle body speed calculating section 317 delivers the result of the estimation to vehicle body slip angle estimating section 318 and front wheel tire lateral force calculating section 319. In particular, vehicle body speed calculating section 317 calculates a mean value of the wheel speeds of driven wheels 11FL and 11FR, and sets this mean value as a base value of the vehicle body speed. Vehicle body speed calculating section 317 modifies the base value in accordance with longitudinal acceleration. In particular, vehicle body speed calculating section 317 modifies the base value of the vehicle body speed so as to remove influence of errors due to tire spin at the time of rapid acceleration and tire lock at the time of hard braking. Vehicle body speed calculating section 317 sets the thus-modified value as the result of the estimation of the vehicle body speed.

Vehicle body slip angle estimating section 318 estimates a side slip angle (slip angle) in accordance with the steering angle sensed by steering angle sensor 1, the yaw rate sensed by yaw rate sensor 2, the lateral acceleration sensed by lateral acceleration sensor 3 (S702), the longitudinal acceleration sensed by longitudinal acceleration sensor 4, and the vehicle body speed calculated by vehicle body speed calculating section 317 (S703).

Vehicle body slip angle estimating section 318 of this practical example is constructed in the same manner as vehicle body slip angle estimating section 17 shown in FIG. 11 according to the first embodiment. Vehicle body slip angle estimating section 318 includes a linear two-input observer 25 estimating one or more vehicle state variables (vehicle side slip angle $\beta$, slip angle $\beta$). With this construction, the vehicle body slip angle estimating section 318 estimates the vehicle side slip angle (slip angle) $\beta$ in the before-mentioned manner.

Front wheel tire slip angle calculating section 320 calculates a front wheel slip angle $\beta f$ (S704) in accordance with the steering angle (tire steer angle $\delta$) sensed by steering angle sensor 1, yaw rate $\gamma$ sensed by yaw rate sensor 2, vehicle body speed V calculated by vehicle body speed calculating section 317, and vehicle side slip angle (vehicle slip angle) $\beta$ calculated by vehicle body slip angle estimating section 318, according to the before-mentioned equation (13). Front wheel tire slip angle calculating section 320 outputs the calculated front wheel slip angle $\beta f$ to front wheel lateral $\mu$ gradient calculating section 321.

Front wheel tire lateral force calculating section 319 calculates a front wheel lateral force Fyf (S705) in accordance with yaw rate $\gamma$ sensed by yaw rate sensor 2, and lateral acceleration Gy sensed by lateral acceleration sensor 3, according to the before-mentioned equation (14). The yaw rate $\gamma$ and lateral accelerations Gy are variables as shown in FIG. 15. Front wheel tire lateral force calculating section 319 delivers the calculated lateral force Fyf to front wheel lateral $\mu$ gradient calculating section 321.

Front wheel lateral $\mu$ gradient calculating section 321 estimates the trend of a ratio of a variation (or change or variation quantity) of slip angle $\beta f$ and a variation (or change or variation quantity) of tire lateral force Fyf, in accordance with the front wheel slip angle $\beta f$ calculated by front wheel tire slip angle calculating section 320 and the front wheel tire lateral force Fyf calculated by front wheel tire lateral force calculating section 319. This trend is the slope of a tangent to the tire characteristic curve. In the following explanation, this trend is also referred to as a lateral force characteristic index (or index value) or a front wheel lateral $\mu$ gradient. Front wheel lateral p gradient calculating section 321 has a characteristic graph similar to the characteristic shown in FIG. 5, in the form of a map. In this case, the lateral force Fy in the map of FIG. 5 is a resultant force of the lateral forces produced, respectively, in the left and right front wheels. On the basis of the map of FIG. 5 (a total lateral force characteristic index map of the front two wheels), the front wheel lateral force $\mu$ gradient calculating section 321 estimates a front wheel lateral $\mu$ gradient (or lateral force characteristic index) Kf, as the above-mentioned trend. In a flowchart of FIG. 74, the front wheel lateral $\mu$ gradient calculating section 321 determines a ratio of the front wheel lateral force and the front wheel slip angle (S706), and the front wheel lateral $\mu$ gradient calculating section 321 determines, from this ratio, the front wheel lateral mu gradient (or lateral force characteristic index) Kf (S707), on the basis of the map of FIG. 5 (the total lateral force characteristic index map of the front two wheels).

Figure 76:
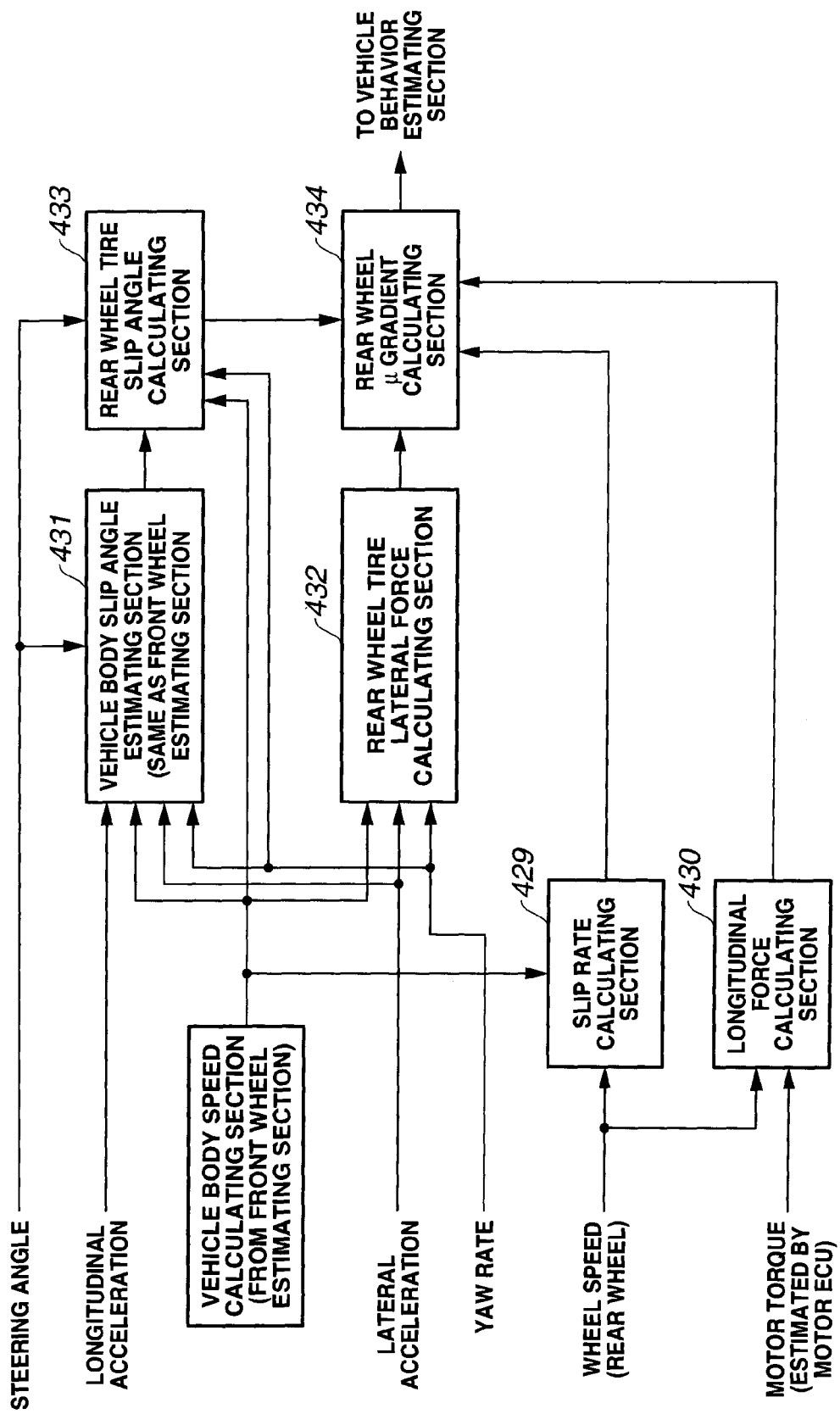
FIG. 76 is a view showing the construction of a rear wheel mu gradient estimating section 302 in the vehicle travel state estimating device of FIG. 72.

As shown in FIG. 76, the rear wheel $\mu$ gradient estimating section 202 includes a vehicle body slip angle estimating section 431, a rear wheel tire slip angle calculating section 433, a rear wheel tire lateral force calculating section 432, a rear wheel $\mu$ gradient calculating section 434, a slip rate calculating section 429, and a longitudinal (brake/drive) force calculating section 430.

Vehicle body slip angle estimating section 431 outputs the vehicle body slip angle $\beta$ by performing the same operations as the operations of the vehicle body slip angle estimating section 318 in front wheel lateral $\mu$ gradient estimating section 301 shown in FIG. 73. (In the example of FIG. 77, the vehicle body slip angle is obtained from front wheel lateral $\mu$ gradient estimating section 301 (step S801)).

Figure 77:
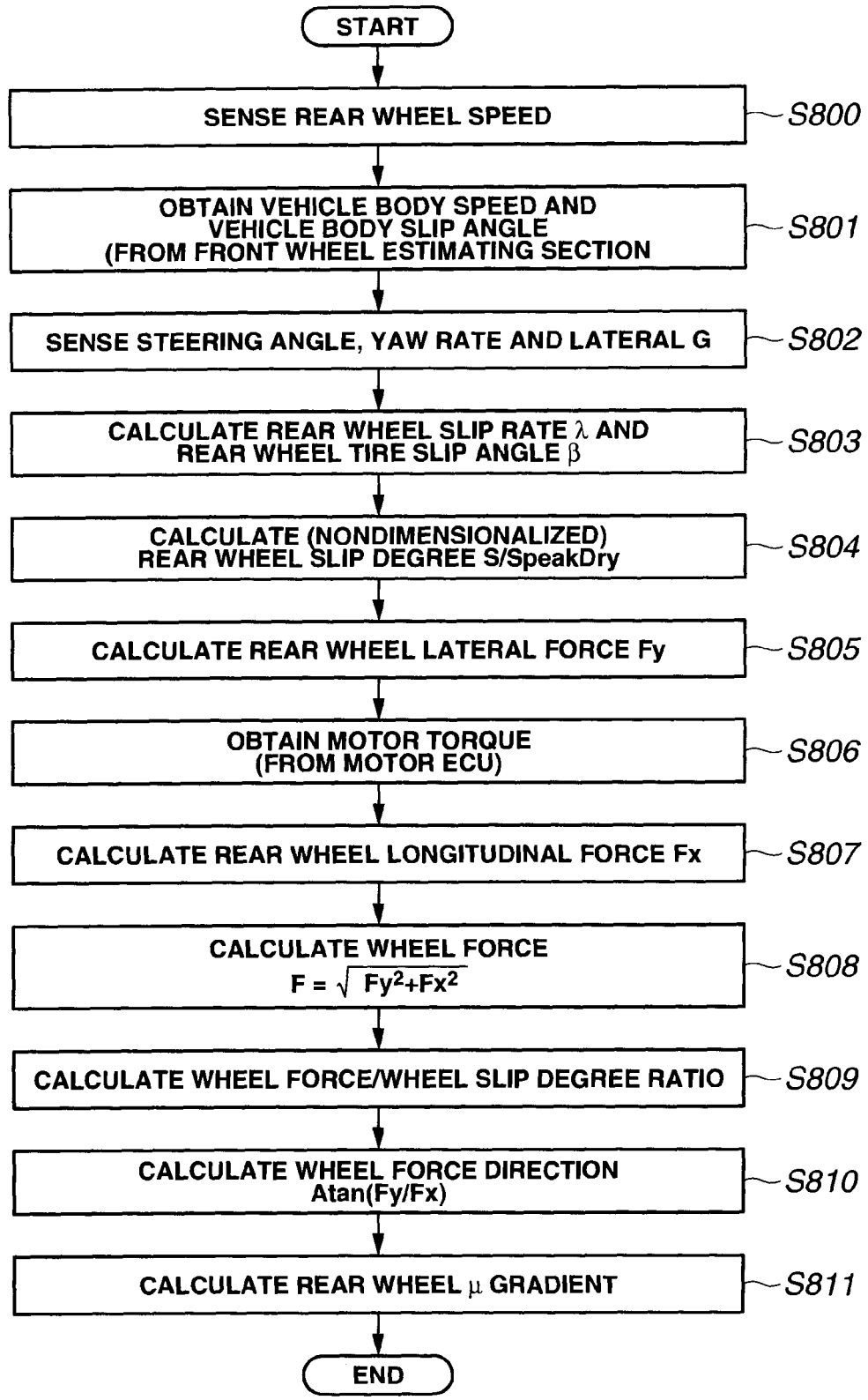
FIG. 77 is a flowchart for the rear wheel mu gradient estimating section 302.

Slip rate calculating section 429 calculates a rear wheel slip rate (or slip ratio) $\lambda r$ from the wheel speed determined by averaging the wheel speeds of the rear left and right wheels obtained from wheel speed sensor 5 at step S800 of FIG. 77, and the vehicle body speed V calculated in front wheel lateral $\mu$ gradient estimating section 301. (Step S803 in FIG. 77)

Rear wheel tire slip angle calculating section 433 calculates a rear wheel slip angle $\beta r$ according to the before-mentioned equation (13), in accordance with the steering angle (tire steer angle $\delta$) sensed by steering angle sensor 1, yaw rate $\gamma$ sensed by yaw rate sensor 2 (S802), vehicle body speed V calculated in front wheel lateral $\mu$ gradient estimating section 301, and vehicle side slip angle (vehicle slip angle) $\beta$ calculated by vehicle body slip angle estimating section 431. Rear wheel tire slip angle calculating section 433 outputs the calculated rear wheel slip angle $\beta r$ to rear wheel mu gradient calculating section 434. (Step S803 in FIG. 77)

Rear wheel mu gradient calculating section 434 calculates the wheel slip degree Z by using the above-mentioned equation (29). In particular, the rear wheel tire slip angle $\beta r$ is substituted for $\beta$ in equation (29), and the rear wheel slip rate $\lambda r$ is substituted for $\lambda$. (Step S804 in FIG. 77)

Rear wheel tire lateral force calculating section 432 calculates the rear wheel lateral force Fyr according to the before-mentioned equation (14), in accordance with yaw rate y sensed by yaw rate sensor 2 and lateral acceleration Gy (S802) sensed by lateral acceleration sensor 3. Yaw rate $\gamma$ and lateral acceleration Gy are quantities as shown in FIG. 15. Rear wheel tire lateral force calculating section 432 outputs the calculated lateral force Fyr, to rear wheel $\mu$ gradient calculating section 434. (Step S805 in FIG. 77)

Longitudinal force calculating section 430 calculates the rear wheel longitudinal force Fxr, in accordance with the motor torque estimated by brake/drive motor ECU 28 of FIG. 71, and the wheel speed determined by averaging the rear left and right wheel speeds sensed by wheel speed sensor 5. (Steps S806 and S807 in FIG. 77)

Rear wheel $\mu$ gradient calculating section 434 calculates the resultant force F according to the before-mentioned equation (28), from the inputted rear wheel lateral force Fyr and rear wheel longitudinal force Fxr. In particular, Fyr and Fxr are substituted, respectively, for Fy and Fx in equation (28). (Step S808 in FIG. 77)

Then, rear wheel μ gradient calculating section 434 calculates a wheel force direction σ according to a following equation (30). In particular, Fyr and Fxr are substituted, respectively, for Fy and Fx in equation (30). In equation (30), Atan is an abbreviation of arctangent.

[Math 30]

$$\sigma = A\tan(Fy/Fx) \quad (30)$$

Rear wheel μ gradient calculating section 434 outputs a value of γ/max(γ) which is a normalized quantity of the slope of tangent to the tire characteristic curve, by using the calculated resultant force F, wheel slip degree Z and wheel force direction σ, and the map shown in FIG. 69. The quantity γ/max(γ) corresponds to the before-mentioned μ gradient, and it is possible to judge the tire approaches the friction limit as γ/max(γ) varies from 1 closer to 0. (Steps S809 to S811 in FIG. 77)

Unstable behavior assist command calculating section 303 of FIG. 72 has the following configuration. As, shown in FIG. 75, unstable behavior assist command calculating section 303 includes a μ gradient decomposing section 405, a lateral vehicle behavior estimating section 407 and a longitudinal vehicle behavior estimating section 408.

The μ gradient decomposing section 405 decomposes the rear wheel μ gradient outputted from rear wheel μ gradient estimating section 302, into a component in the tire rotational direction (hereinafter referred to as a longitudinal component) and a component in the axle direction (hereafter referred to as a lateral component). The rear wheel μ gradient tire longitudinal component Krx is calculated by using a following mathematical expression (31), and the rear wheel p gradient tire lateral component Kry is calculated by using a following mathematical expression (32).

[Math 31]

Rear wheel μ gradient tire longitudinal component
$$Krx = \text{rear wheel } \mu \text{ gradient} \times \cos(A\tan(Fy/Fx)) \quad (31)$$

[Math 32]

Rear wheel μ gradient tire lateral component $Kry$=rear wheel μ gradient×Sin($A$ tan($Fy/Fx$)) (32)

Lateral vehicle behavior control command calculating section 407 calculates the static margin SM according to the before-mentioned mathematical expression (15), in accordance with the quantity Kfy' which is an output of front lateral μ gradient estimating section 301 obtained by nondimensionalization of front wheel lateral μ gradient, and the lateral component Kry of the rear wheel μ gradient which is an output of rear wheel μ gradient estimating section 302. In this example, Kfy' is substituted for Kf in expression (15), and Kry is substituted for Kr.

Static margin SM is a quantity representing the ease of occurrence of drift out. That is, the lateral vehicle behavior control command calculating section 407 judges the saturation state of the tire lateral force in accordance with the lateral force characteristic indexes Kfy' and Kry of the front and rear wheels, and calculates static margin SM so that static margin becomes smaller when the gripping state of the front wheels 11FL and 11FR reaches the limit (the tire lateral force becomes saturated) and the lateral force characteristic index Kf becomes equal to zero or a negative value. Thus, the static margin SM calculated by lateral vehicle behavior control command calculating section 407 becomes smaller when the state in which the lateral force is not increased by an increase of the slip angle (the lateral acceleration is saturated), and the tendency to drift out is increased.

Furthermore, lateral vehicle behavior control command calculating section 407 determines, in accordance with the calculated static margin SM, whether the turning (or cornering) characteristic is understeer tendency, oversteer tendency or neutral steer tendency. Specifically, lateral vehicle behavior control command calculating section 407 judges: that the turning characteristic is understeer when static margin SM is positive (SM>0); that the turning characteristic is oversteer when static margin SM is negative (SM<0); and that the turning characteristic is neutral steer when static margin SM is equal to zero (SM=0). In accordance with the thus-estimated turning characteristic, the lateral vehicle behavior control command calculating section 407 outputs the brake/drive torque correction command to brake/drive motor ECU. Therefore, the control system can estimate the dynamic lateral force characteristic index during motion of the vehicle, and control the vehicle behavior adequately.

When the estimated turning characteristic is oversteer, the brake/drive force control device for imparting the brake/drive (longitudinal) forces to the front and rear wheels is controlled in such a manner as to decrease the driving force of the wheel on the turning outside (or the outer side of the turn) as compared to the wheel on the turning inside (or the inner side of the turn), or to increase the braking force of the wheel on the turning outside as compared to the wheel on the turning inside. By so doing, the control system can restrain an unstable vehicle behavior more adequately.

When the estimated turning characteristic is understeer, the control system controls the brake/drive force control device for imparting the braking/driving forces to the front and rear wheels in such a manner as to decrease the driving force of the wheel on the turning inside as compared to the wheel on the turning outside or to increase the braking force of the wheel on the turning inside as compared to the wheel on the turning outside. By so doing, the control system can restrain an unstable vehicle behavior more adequately.

In the case of a torque-split type 4WD vehicle capable of distributing the torque between the front and rear wheels in a front wheel drive vehicle, for example, the control system controls the front and rear torque distribution toward the 2WD tendency to restrain the oversteer tendency when the turning characteristic is estimated to be oversteer. By so doing, the control system can restrain an unstable vehicle behavior more adequately.

When the turning characteristic is estimated to be understeer, then the control system controls the front and rear torque distribution toward the 4WD tendency to restrain the understeer tendency. By so doing, the control system can restrain an unstable vehicle behavior more adequately.

Moreover, in the case of a vehicle provided with a rear wheel steering actuator configured to control the rear wheel steer angle, as an example, the control system restrains a vehicle behavior by performing a counter-steering operation when SM<0 (SM is the static margin) and $C_{PR}<C_{PR}^*$ ($C_{PR}^*$ represents a value when the grip of the rear decreases clearly) in the case of the turning characteristic being estimated to be oversteer. By so doing, the control system can restrain an unstable vehicle behavior more adequately.

When the estimated turning characteristic is understeer, the control system controls the front wheel or rear wheel steer angle in a direction to vary static margin SM toward SM≈0

(SM is approximately equal to zero). By so doing, the control system can restrain an unstable vehicle behavior more adequately.

As another example, lateral vehicle behavior control command calculating section 407 outputs the unstable behavior assist restraining command to EPSCPU 6 while static margin SM is negative (SM<0), so that the estimated turning characteristic is oversteer, and at the same time the rear wheel lateral μ gradient is smaller than or equal to a predetermined value, a value in the vicinity of zero, for example. This unstable behavior restraining assist command is a command signal to control the output of EPS motor 7 in a direction to decrease the slip angle βr of rear wheels 11RL and 11RR.

Figure 78:
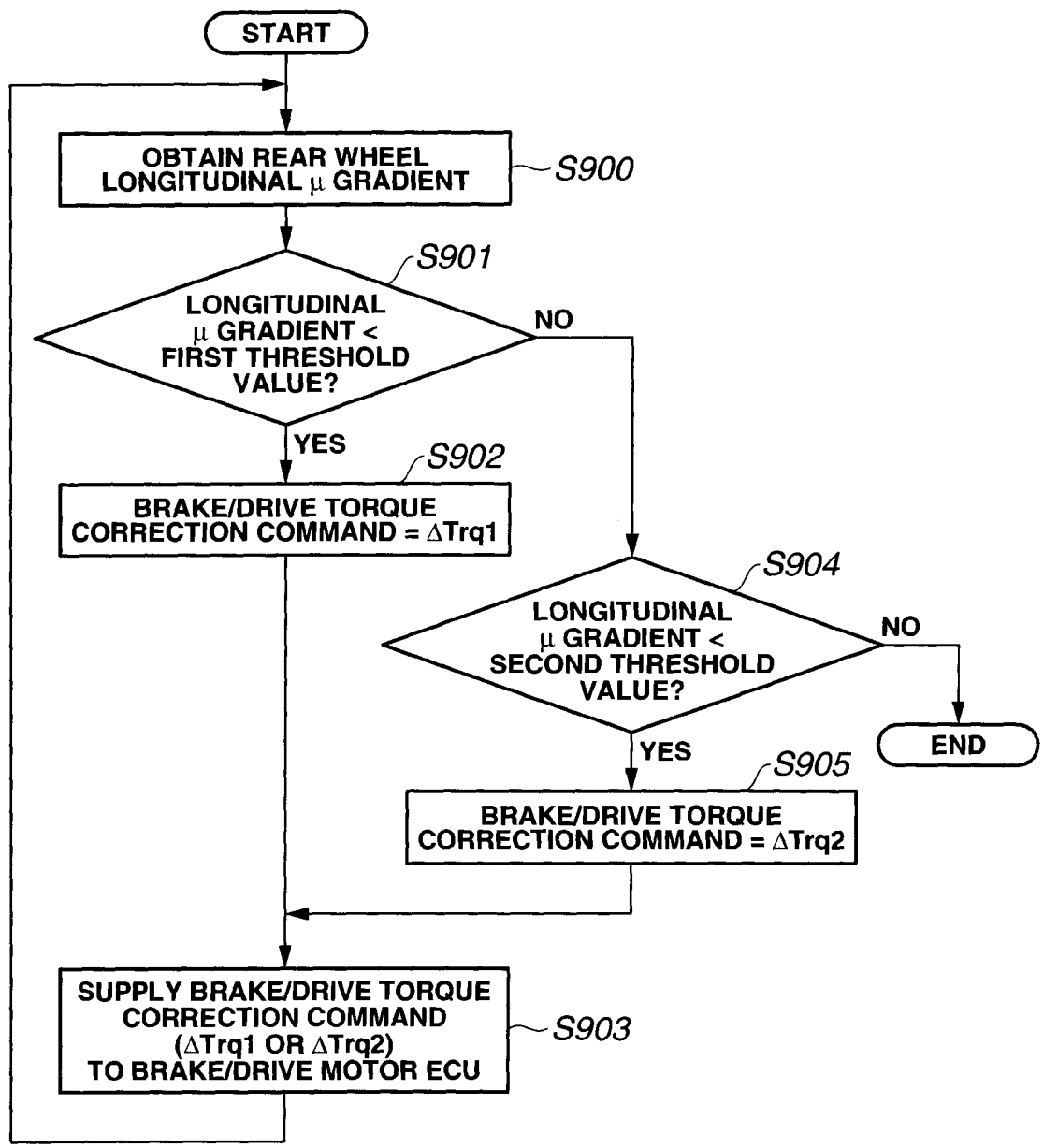
FIG. 78 is a flowchart showing a control flow of a longitudinal vehicle behavior control command calculating section 408 shown in FIG. 75.

Longitudinal vehicle behavior control command calculating section 408 outputs a brake/drive torque correction command to brake/drive motor ECU in accordance with the longitudinal μ gradient of the rear wheels which are drive wheels. FIG. 78 is a view used for explaining the control flow of longitudinal vehicle behavior control command calculating section 408.

At step S900, section 408 obtains the rear wheel longitudinal μ gradient outputted from the μ gradient decomposing section 405 of FIG. 75. At S901, section 408 compares the obtained longitudinal μ gradient with a first threshold value. When longitudinal μ gradient is smaller than the first threshold value, then section 408 sets the brake/drive torque correction command equal to ΔTrq1, at S902. Then, at S903, section 408 outputs the brake/drive correction command ΔTrq1, to brake/drive motor ECU 28. When longitudinal μ gradient is greater than the first threshold value at S901, then section 408 further compares the longitudinal μ gradient with a second threshold value at S904. When longitudinal μ gradient is smaller than the second threshold value at S904, section 408 sets the brake/drive torque correction command equal to ΔTrq2, and section 408 outputs the brake/drive correction command, to brake/drive motor ECU 28 at S903. When longitudinal μ gradient is greater than the second threshold value at S904, the brake/drive torque correction command is not outputted. The second threshold value is greater than the first threshold value, and ΔTrq1 is greater than ΔTrq2. With this relation, by varying the output of the brake/drive torque with discrimination among a stage at which longitudinal μ gradient is in a region close to zero or negative at or beyond the friction limit, a stage at which longitudinal μ gradient is close to one closely in the gripping state, and a stage at which longitudinal μ gradient is in a region intermediate between both regions, the control system can produce the brake/drive torque effectively in a region very close to the tire friction limit in the intermediate stage, and controls the brake/drive torque to regain the gripping state immediately in the near zero and negative regions at or beyond the friction limit. In the region close to one close to the gripping state, the control system outputs the brake/drive torque faithful to the driver's input, without performing the correction of the brake/drive torque, so that the system does not provide an unnatural feeling.

Figure 79:
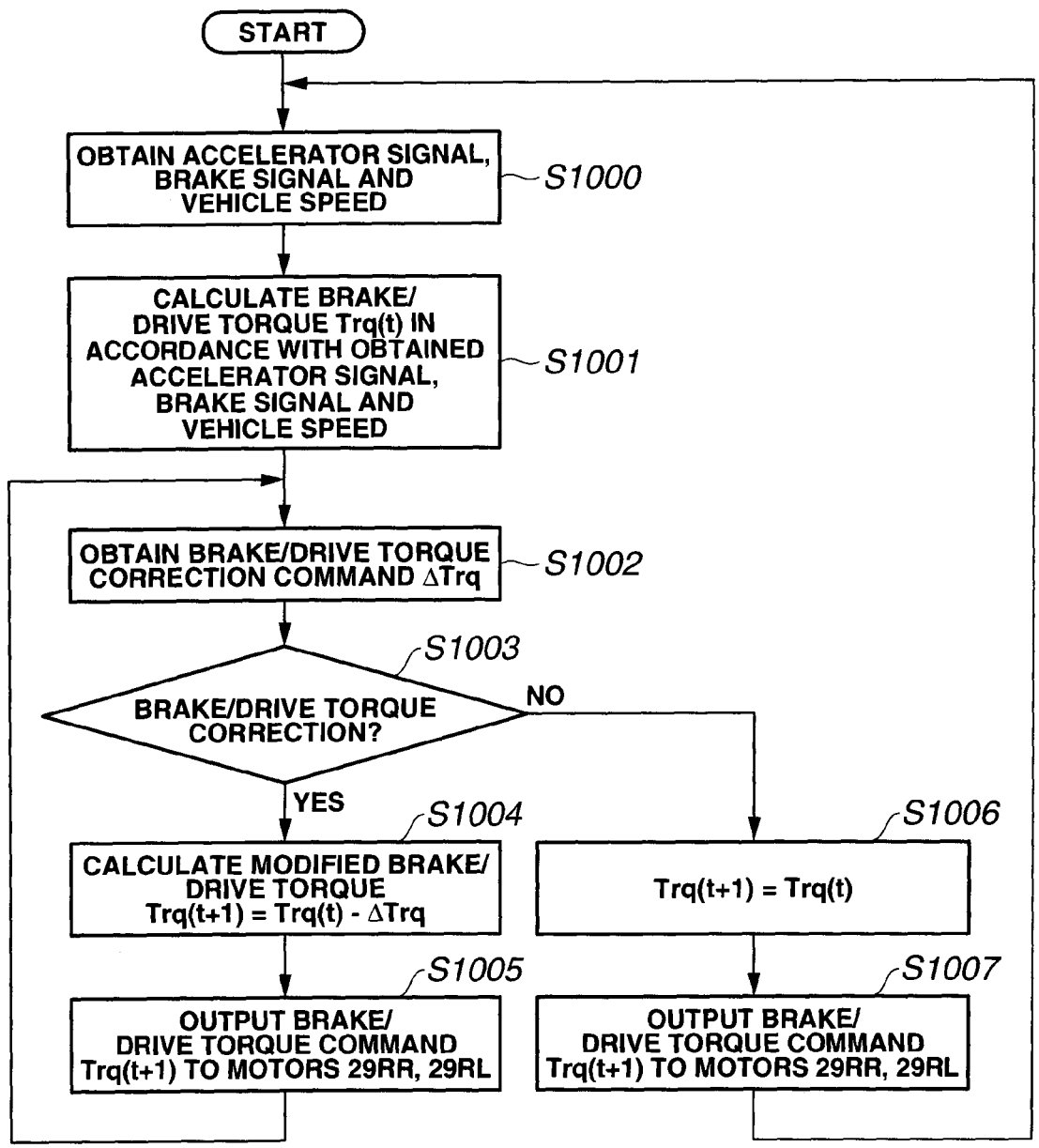
FIG. 79 is a flowchart showing a control flow of a motor ECU 28 of FIG. 71.

FIG. 79 shows the control flow provided in motor ECU 28 to which the brake/drive torque control command ΔTrq is inputted from longitudinal vehicle behavior control command calculating section 408. When there is no brake/drive torque correction command at S1003, the motor ECU 28 determines the command value of the brake/drive torque only from the accelerator signal, brake signal, and the vehicle speed information at S1006 and S1007. When there is the brake/drive torque correction command at S1003, the motor ECU 28 modifies the command value of the brake/drive torque determined only from the accelerator signal, brake signal, and the vehicle speed information, with the brake/drive torque correction command ΔTrq at S1004 and S1005. The third embodiment is not limited to the illustrated practical example, and various modifications and variations are possible within the purview of the third embodiment.

Figure 80:
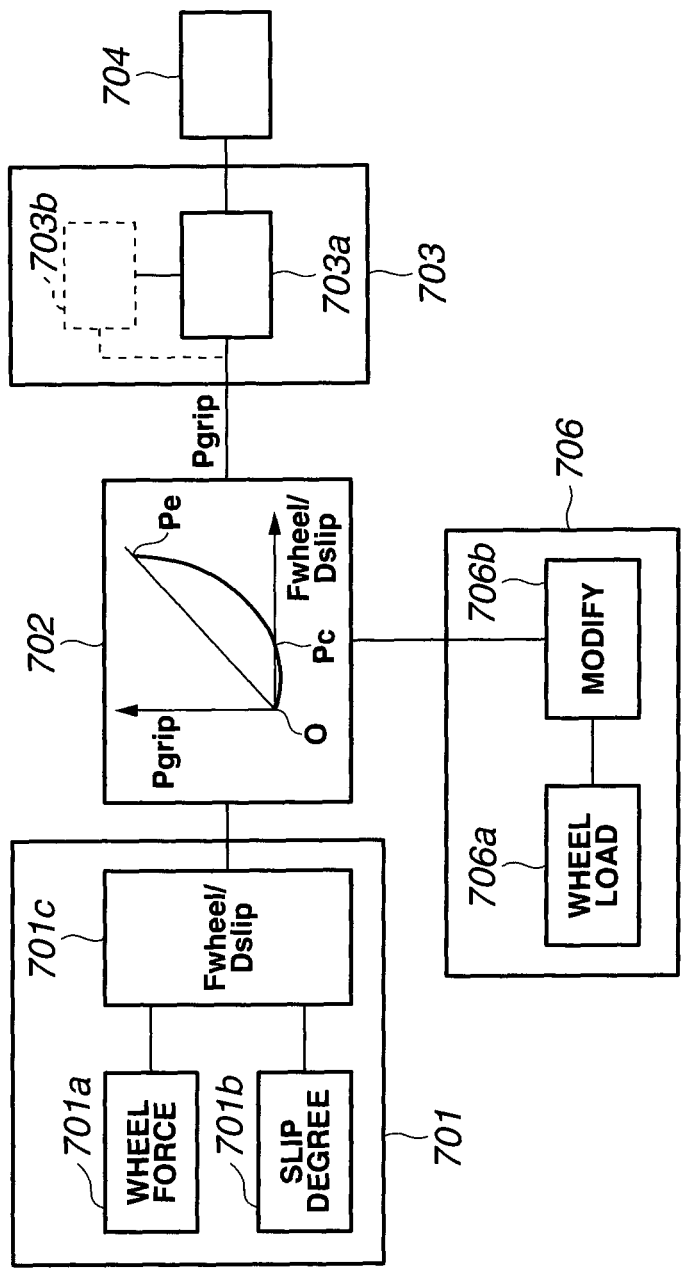
FIG. 80 is a schematic view showing apparatus according to the first embodiment, the second embodiment and/or the third embodiment.

Although the apparatus according to the first, second and third embodiments can be constructed in various configurations, it is possible to consider the apparatus according to the first, second and third embodiments as an estimating apparatus as shown in FIG. 80, as an example. The apparatus of FIG. 80 includes at least a main section 702, which can serve as a function generator determining an output from an input according to a predetermined relationship. The input is a ratio of a wheel force (Fwheel) acting on a wheel in a ground contact surface, to a wheel slip degree (Dslip) of the wheel. The output is a grip characteristic parameter (Pgrip) representing a road surface gripping characteristic of the wheel or the margin up to the frictional limit. It is possible to consider that main section 702 corresponds to the output section (output determining section). Moreover, it is possible to consider that the means for estimating the grip characteristic is a means for performing at least the function of this main section. The apparatus including only main section 702 may be a storage device or storage medium for storing the predetermined relationship.

The apparatus shown in FIG. 80 may further include an input section (or input setting section) 701. Input section 701 may include a wheel force sensing section 701*a* sensing the wheel force (Fwheel) and a slip degree sensing section 701*b* sensing the wheel slip degree (Dslip). In the illustrated examples, wheel force sensing section 701*a* estimates the wheel force by calculation, and slip degree sensing section 701*b* estimates the slip degree by calculation. Input section 701 may further include a dividing section 701*c* determining the ratio of wheel force (Fwheel) to wheel slip degree (Dslip). It is possible to consider that the grip characteristic estimating means includes the function of the dividing section.

The apparatus of FIG. 80 may further include a processing section 703 which estimates the vehicle state or vehicle behavior in accordance with the grip characteristic parameter (Pgrip), or controls the vehicle. The processing section 703 can function as a control section. The apparatus of FIG. 8 may further include an actuating section 704, which includes an actuator for the vehicle control and/or an indicator or display for indicating the vehicle state (or warning device). Actuating section 704 may be a vehicle control system or a controller of the vehicle control system.

Processing section 703 may include at least one of a first section 703*a* and a second section 703*b*. Second section 703*b* can function as a stability estimating section. In this case, second section 703*b* serving as the stability estimating section determines a stability parameter representing the vehicle stability, from a grip characteristic parameter or a plurality of grip characteristic parameters of one or more wheels. First section 703*a* can function as a vehicle stability control section. First section 703*a* may be configured to transmit either or both of the grip characteristic parameter and the stability parameter, to actuating section 704, or configured to produce a control signal for controlling the vehicle in accordance with either or both of the grip characteristic parameter and the stability parameter, and to send the control signal to actuating section 704.

The apparatus of FIG. 80 may further include an adjusting section 706 adjusting the predetermined relationship of main section 702. In the example shown in FIG. 80, adjusting section 706 includes a wheel load sensing section 706*a* and a modifying section 706*b*. Wheel load sensing section 706*a* determines a wheel load of a wheel. Modifying section 706*b* modifies the relationship between the input and the output, in accordance with the wheel load.

Wheel force sensing section 701a may be configured to determine the wheel force from the longitudinal force and lateral force acting on the wheel. Slip degree sensing section 701b may be configured to determine the wheel slip degree from the longitudinal slip degree and the lateral slip degree of the wheel. In the illustrated example according to the third embodiment, the longitudinal slip degree is a nondimensional (or dimensionless) longitudinal slip degree obtained by dividing the wheel slip rate by a reference rate (such as λpeakdry), and the lateral slip degree is a nondimensional (or dimensionless) lateral slip degree obtained by dividing the wheel slip angle by a reference angle (such as βpeakdry).

The input of main section 702 may be a nondimensional (or dimensionless) input. In this case, the dividing section 701c may be configured to determine the nondimensional input by dividing the ratio of the wheel force and the wheel slip degree by a reference ratio (such as max(F/Z)). Moreover, main section 702 may be configured to determine the relationship between the input and the output, in accordance with the direction of the wheel force (σ).

In addition to the effects and advantages of the first and second embodiments, the third embodiment can provide following effects and advantages. The tire frictional state of a wheel is judged in accordance with the resultant force of the lateral force and longitudinal force of the wheel. Therefore, the system can estimate the wheel tire friction state adequately even in a traveling situation in which the lateral force and longitudinal force act simultaneously in the tire ground contact surface, and the distribution of the lateral and longitudinal forces is varying moment by moment.

In the illustrated practical examples of the first, second and third embodiments, the method of estimating a contact ground surface grip characteristic of a wheel of a vehicle on a ground contact surface comprises an input step (or input setting step) of setting an input representing a ratio of a wheel force and a wheel slip degree of the wheel, and an output step (or output determining step) of determining an output representing a grip characteristic parameter, from the input according to a predetermined relationship between the input and the output.

The method of estimating the contact ground surface grip characteristic may further comprise a control step. In the control step, a grip recovery control (such as S504) for increasing the grip characteristic parameter beyond a critical parameter value in a critical region in which the grip characteristic parameter is lower than or equal to the critical parameter value. In a marginal region in which the grip characteristic parameter is greater than the critical parameter value, but smaller than a first parameter threshold value which is greater than the critical parameter value, a grip decrease preventing control (such as S506, S507, S508) for preventing a decrease of the grip characteristic parameter toward the critical parameter value is performed.

The method for estimating the grip characteristic in the ground contact surface may further comprise a stability estimating step of estimating a vehicle stability parameter representing a vehicle stability, from the grip characteristic parameter. In this case, for example: the input step sets the ratio of the wheel force and wheel slip degree of a first wheel of the vehicle and the ratio of the wheel force and wheel slip degree of a second wheel; the output step determines the grip characteristic parameter of the first wheel from the ratio of the wheel force and wheel slip degree of the first wheel and the grip characteristic parameter of the second wheel from the ratio of the wheel force and wheel slip degree of the second wheel; and the stability estimating step can determine the vehicle stability parameter from the grip characteristic parameter of the first wheel and the grip characteristic parameter of the second wheel. This method may further comprise a vehicle stability controlling step. The vehicle stability controlling step (such as S108, S406, S407) is a step of controlling the vehicle in accordance with the vehicle stability parameter.

This method may further comprise a wheel load sensing step of sensing a wheel load of the wheel, and a modifying step of modifying the relationship between the input and the output, in accordance with the wheel load.

The input step may comprise a wheel force sensing substep of determining the wheel force, a wheel slip degree sensing substep of determining the wheel slip degree, and a dividing substep of determining the ratio of the wheel force and the wheel slip degree by diving the wheel force determined at the wheel force sensing substep, by the wheel slip degree determined at the wheel slip degree sensing substep.

In the method for estimating the grip characteristic, the wheel force may be a lateral force, or a longitudinal force, or an oblique force in an oblique direction. In this method, the wheel force may shift to the oblique direction away from the lateral direction and the longitudinal direction of the wheel, and the output step may be a step of determining the grip characteristic parameter in accordance with the direction of the wheel force. The input step may comprise a step of determining the wheel force from the longitudinal force and lateral force acting on the wheel.

The input step may comprise a step of determining the wheel slip degree from a longitudinal slip degree of the wheel in the longitudinal direction and a lateral slip degree in the lateral direction. In this case, the longitudinal slip degree may be a nondimensional longitudinal slip degree obtained by dividing the a wheel slip rate by a reference rate (such as λpeakdry), and the lateral slip degree may be a nondimensional lateral slip degree obtained by dividing a wheel slip angle by a reference angle (such as βpeakdry). In this case, the input step may comprise a step of determining the nondimensional longitudinal slip degree and a step of determining the nondimensional lateral slip degree. The input may be a nondimensional input. In this case, the input step may comprise a step of determining the nondimensional input by dividing the ratio of the wheel force and wheel slip degree, by a reference ratio (such as max(F/Z)).

The output step may comprise a step of determining the relationship between the input and output, in accordance with the direction of the wheel force. When the relationship between the input and output is represented by a three dimensional curved surface in a three dimensional coordinate system having a first axis representing the ratio of the lateral force and the lateral slip degree, a second axis representing the ratio of the longitudinal force and the longitudinal slip degree and a third axis representing the grip characteristic parameter, the output step may comprise a step of determining a two dimensional relationship from the relationship between the input and output represented by the three dimensional curved surface, in accordance with the direction of the wheel force, and a step of determining the output from the input according to the two dimensional relationship.

The method for estimating the grip characteristic may further comprise a vehicle behavior estimating step of estimating a vehicle behavior from the grip characteristic parameter. The vehicle behavior estimating step may comprise a decomposing step of decomposing the grip characteristic parameter into a lateral component in the lateral direction and a longitudinal component in the longitudinal direction, a lateral behavior estimating step of estimating a lateral behavior of the vehicle in the lateral direction in accordance with the lateral component, and a longitudinal behavior estimating step of estimating a longitudinal behavior of the vehicle in the longitudinal direction in accordance with the longitudinal component. The lateral behavior estimating step may be a step of estimating the lateral behavior of the vehicle in the lateral direction in accordance with the lateral component of the grip characteristic parameter of a first wheel and the grip characteristic parameter of a second wheel.

It is optional to provide information to the driver by using the output representing the grip characteristic parameter. As a means or device for supplying information to the driver, for example, there are: a means, such as a buzzer, for providing audible stimulus; a means, such as a warning light or a display for displaying a warning mark on a navigation screen, for providing visual stimulus; and a means for providing tactual stimulus by changing a reaction of a brake or accelerator pedal, or changing a steering reaction of a steering wheel. Furthermore, it is optional to vary the magnitude of the audible, visual or tactile stimulus or the frequency of repetition of audible, visual or tactile stimuli, in accordance with the magnitude of the grip characteristic parameter.

The present application is based on Japanese Patent Applications Nos. 2007-108072, 2007-108071, 2008-007163, 2007-108070, 2007-108073 and 2008-007162. The contents of these patent applications are herein incorporated by reference.

The invention claimed is:

1. An apparatus for estimating a gripping characteristic of a vehicle wheel of a vehicle on a ground contact surface, comprising:
   an input section configured to set an input representing a ratio of a wheel force acting on the vehicle wheel in the ground contact surface, to a wheel slipping degree of the vehicle wheel; and
   an output section configured to determine, from the input, an output representing a grip characteristic parameter indicative of the gripping characteristic of the vehicle wheel,
   wherein the grip characteristic parameter is a rate of change of the wheel force with respect to change in the slipping degree, and
   wherein the output section is configured to determine the grip characteristic parameter without regard to a friction coefficient of the ground contact surface.

2. The apparatus as claimed in claim 1, wherein the output section is configured to determine the grip characteristic parameter from the ratio of the wheel force to the wheel slipping degree in a nonlinear region in which the wheel force varies nonlinearly with the wheel slipping degree.

3. The apparatus as claimed in claim 1, wherein:
   the output section is configured to determine the grip characteristic parameter from the ratio of the wheel force to the slipping degree according to a predetermined nonlinear relationship between an input variable represented by the input and an output variable represented by the output, and
   the grip characteristic parameter represents a margin to a friction limit.

4. The apparatus as claimed in claim 3, wherein the predetermined nonlinear relationship between the input variable and the output variable is in the form of one of a characteristic curve and a mathematical formula.

5. The apparatus as claimed in claim 1, wherein:
   the wheel slipping degree is a degree of slip of the vehicle wheel relative to the ground contact surface in a direction of the wheel force and the grip characteristic parameter is a variable representing a gripping ability of the vehicle wheel, and
   the output section is configured to determine the grip characteristic parameter only from the ratio of the wheel force to the wheel slipping degree, without regard to a friction coefficient of the ground contact surface.

6. The apparatus as claimed in claim 1, wherein:
   the wheel slipping degree is a quantity representing a relative velocity vector of the vehicle wheel relative to the ground contact surface, and
   the output section is configured to determine the grip characteristic parameter only from the ratio of the wheel force to the wheel slipping degree.

7. The apparatus as claimed in claim 1, wherein:
   the wheel force is a tire force acting on a tire of the vehicle wheel,
   the ratio of the wheel force to the slipping degree is a ratio of the tire force to the wheel slipping degree,
   the grip characteristic parameter represents a gradient of a tire characteristic curve of the tire force with respect to the wheel slipping degree, and
   the output section is configured to determine the gradient of the tire characteristic curve from the ratio of the wheel force and the slipping degree, without using a friction coefficient of the ground contact surface.

8. The apparatus as claimed in claim 7, wherein:
   the tire characteristic curve includes a linear segment in which the tire force increases substantially linearly from zero as an absolute value of the wheel slipping degree increases from zero in a smaller slip region of the wheel slipping degree, and a nonlinear segment in which the tire force increases nonlinearly as the absolute value of the wheel slipping degree increases in a greater slip region in which the wheel slipping degree increases beyond the smaller slip region,
   the grip characteristic parameter increases from zero to a greatest parameter value as the ratio of the wheel force and the slipping degree increases,
   the greatest parameter value represents the gradient of the linear segment of the tire characteristic curve, and
   the output section is configured to determine the gradient of the nonlinear segment of the tire characteristic curve from the ratio of the wheel force to the wheel slipping degree.

9. The apparatus as claimed in claim 7, wherein:
   the tire characteristic curve of the tire force with respect to the wheel slipping degree includes a higher friction tire characteristic curve for a higher friction road surface having a higher friction coefficient, and a lower friction tire characteristic curve for a lower friction road surface having a lower friction coefficient lower than the higher friction coefficient, the grip characteristic parameter represents a gradient of at least one of the higher friction tire characteristic and the lower friction tire characteristic,
   the input section is configured to determine a current value of the ratio of the wheel force to the wheel slipping degree from a current value of the tire force and a current value of the wheel slipping degree, and
   the output section is configured to determine a current value of the grip characteristic parameter from the current value of the ratio of the wheel force to the wheel slipping degree, and to set a value of the gradient of the higher friction tire characteristic curve corresponding to the current value of the tire force and the current value of the wheel slipping degree, and a value of the gradient of the lower friction tire characteristic curve corresponding to the current value of the tire force and the current value of the wheel slipping degree, equal to each other, and equal to the current value of the grip characteristic parameter.

10. The apparatus as claimed in claim 7, wherein the tire characteristic curve is a characteristic curve representing a tire characteristic dependent on a road surface friction coefficient, and the output section is configured to determine the gradient of the tire characteristic curve from the ratio of the wheel force to the wheel slipping degree without using the road surface friction coefficient.

11. The apparatus as claimed in claim 1, wherein the grip characteristic parameter is a function that increases when the ratio of the wheel force and the wheel slipping degree increases from a predetermined critical ratio value.

12. The apparatus as claimed in claim 11, wherein the grip characteristic parameter increases nonlinearly with increase of the ratio of the wheel force to the wheel slipping degree in a greater ratio region greater than the predetermined critical ratio value so that a rate of increase of the grip characteristic parameter with respect to an increase of the ratio of the wheel force to the wheel slipping degree increases as the ratio of the wheel force to the wheel slipping degree increases from the predetermined critical ratio value.

13. The apparatus as claimed in claim 11, wherein:
the grip characteristic parameter is equal to a predetermined critical parameter value when the ratio of the wheel force to the wheel slipping degree is equal to the predetermined critical ratio value,
the grip characteristic parameter decreases below the critical parameter value as the ratio of the wheel force and the slipping degree decreases below the critical ratio value, and
the grip characteristic parameter increases above the critical parameter value as the ratio of the wheel force to the wheel slipping degree increases above the critical ratio value.

14. The apparatus as claimed in claim 13, wherein the apparatus further comprises:
a controlling section to perform a grip recovery control to increase the grip characteristic parameter above the critical parameter value in a critical region in which the grip characteristic parameter is smaller than or equal to the critical parameter value, and
a grip decrease preventing control to prevent a decrease of the grip characteristic parameter toward the critical parameter value when the grip characteristic parameter is in a marginal region in which the grip characteristic parameter is greater than the critical parameter value but smaller than a predetermined first threshold parameter value which is greater than the critical parameter value.

15. The apparatus as claimed in claim 14, wherein the controlling section is configured to perform a grip state control when the grip characteristic parameter is greater than the first threshold parameter value.

16. The apparatus as claimed in claim 1, wherein the apparatus further comprises a stability estimating section to determine a vehicle stability parameter representing a vehicle stability, from the grip characteristic parameter.

17. The apparatus as claimed in claim 16, wherein:
the input section is configured to determine the ratio of the wheel force to the wheel slipping degree of a first wheel of the vehicle, and the ratio of the wheel force to the wheel slipping degree of a second wheel of the vehicle,
the output section is configured to determine the grip characteristic parameter of the first wheel from the ratio of the wheel force to the wheel slipping degree of the first wheel and the grip characteristic parameter of the second wheel from the ratio of the wheel force to the wheel slipping degree of the second wheel, and
the stability estimating section is configured to determine the vehicle stability parameter from the grip characteristic parameter of the first wheel and the grip characteristic parameter of the second wheel.

18. The apparatus as claimed in claim 17, wherein the first wheel and the second wheel of the vehicle are front and rear wheels, or left and right wheels of the vehicle.

19. The apparatus as claimed in claim 16, wherein the apparatus further comprises a vehicle stability control section to control the vehicle in accordance with the vehicle stability parameter.

20. The apparatus as claimed in claim 1, wherein the apparatus further comprises a wheel load sensing section to sense a wheel load of the vehicle wheel, and a modifying section to modify the relationship between the input and the output in accordance with the wheel load.

21. The apparatus as claimed in claim 20, wherein:
the relationship between the input and the output is a functional relationship which is expressible by a grip characteristic curve in a plane coordinate system including a first axis expressing the ratio of the wheel force to the wheel slipping degree, and a second axis expressing the grip characteristic parameter,
the grip characteristic curve intersects the first axis at a crossover point where the ratio of the wheel force and the slipping degree is equal to a critical ratio value and the grip characteristic parameter is equal to a critical parameter value,
the grip characteristic curve extends from the crossover point to an end point at which the grip characteristic parameter is equal to a greatest parameter value, and
the modifying section is configured to shift the end point of the characteristic curve on a straight line passing through an origin at which the first axis and the second axis intersect each other, in accordance with variation of the wheel load.

22. The apparatus as claimed in claim 21, wherein the modifying section is configured to modify the grip characteristic curve with an increase in the wheel load to shift the end point away from the origin along the straight line passing through the origin at which the first and second axes intersect each other, and to shift the crossover point along the first axis away from the origin.

23. The apparatus as claimed in claim 20, wherein the modifying section is configured to modify the grip characteristic curve to form a family of curves extending curvilinearly along one another without intersecting in a region greater than a critical ratio value.

24. The apparatus as claimed in claim 1, wherein the input section comprises a wheel force sensing section configured to determine the wheel force, a wheel slipping degree sensing section configured to determine the wheel slipping degree, and a dividing section configured to determine the ratio of the wheel force and the wheel slipping degree by dividing the wheel force determined by the wheel force sensing section, by the wheel slipping degree determined by the wheel slipping degree sensing section.

25. The apparatus as claimed in claim 1, wherein the wheel force is a lateral force, the wheel slipping degree is a wheel slip angle, and the ratio of the wheel force to the wheel slipping degree is a ratio of the lateral force to the wheel slip angle.

26. The apparatus as claimed in claim 25, wherein the apparatus further comprises a vehicle control section configured to control a vehicle behavior of the vehicle in accordance with the grip characteristic parameter.

27. The apparatus as claimed in claim 26, wherein:
the apparatus further comprises an actuator to control a vehicle turning behavior, and the vehicle control section is configured to control the actuator.

28. The apparatus as claimed in claim 27, wherein the actuator includes at least one of a steering force assist actuator configured to assist a steering force of a vehicle driver, a longitudinal force control actuator configured to control longitudinal forces of left and right wheels of the vehicle, and a wheel steer angle control actuator configured to control a wheel steer angle of the vehicle.

29. The apparatus as claimed in claim 27, wherein the vehicle control section is configured to control the actuator in a manner to increase the grip characteristic parameter when the grip characteristic parameter decreases.

30. The apparatus as claimed in claim 27, wherein the vehicle control section is configured to control the actuator in a manner to increase the wheel slip angle when the grip characteristic parameter decreases.

31. The apparatus as claimed in claim 27, wherein the vehicle control section includes a turning characteristic estimating section configured to estimate a vehicle turning characteristic from the grip characteristic parameter, and a turning behavior controlling section configured to control the actuator in accordance with the vehicle turning characteristic.

32. The apparatus as claimed in claim 31, wherein:
the turning characteristic estimating section is configured to estimate at least one of a vehicle drift out tendency and a vehicle spin out tendency from the grip characteristic parameter, and
the turning behavior controlling section is configured to control the actuator in a manner to decrease the tendency estimated.

33. The apparatus as claimed in claim 1, wherein the wheel force is a longitudinal force, the wheel slipping degree is a wheel slip rate, and the ratio of the wheel force to the wheel slipping degree is a ratio of the longitudinal force to the wheel slip rate.

34. The apparatus as claimed in claim 33, wherein the apparatus further comprises a torque control section configured to control a wheel torque of the wheel in accordance with the grip characteristic parameter.

35. The apparatus as claimed in claim 34, wherein:
the apparatus further comprises an actuator configured to control the wheel torque, and
the torque control section is configured to control the actuator.

36. The apparatus as claimed in claim 35, wherein the torque control section is configured to control the actuator in a manner to decrease the wheel torque until the grip characteristic parameter becomes greater than a predetermined critical parameter value when the grip characteristic parameter becomes lower than the predetermined critical parameter value.

37. The apparatus as claimed in claim 36, wherein the predetermined critical parameter value is equal to zero.

38. The apparatus as claimed in claim 36, wherein the torque control section is configured to control the actuator in a manner to restrain an increase of the wheel torque when the grip characteristic parameter is in a region greater than the predetermined critical parameter value and smaller than a predetermined threshold value.

39. The apparatus as claimed in claim 36, wherein the torque control section is configured to control the actuator in a manner to increase the wheel torque until the grip characteristic parameter becomes smaller than a predetermined threshold value upon receipt of a request of a vehicle driver to increase the longitudinal force when the grip characteristic parameter is greater than the predetermined critical parameter value.

40. The apparatus as claimed in claim 33, wherein the longitudinal force is one of a driving force and a braking force.

41. The apparatus as claimed in claim 1, wherein the output section is configured to determine the grip characteristic parameter in accordance with a direction of the wheel force when the wheel force acts in an oblique direction away from a lateral direction and a longitudinal direction of the wheel.

42. The apparatus as claimed in claim 41, wherein the input section is configured to determine the wheel force from the longitudinal force and the lateral force acting on the wheel.

43. The apparatus as claimed in claim 41, wherein the input section is configured to determine the wheel slipping degree from a longitudinal slip degree and a lateral slip degree of the wheel.

44. The apparatus as claimed in claim 43, wherein the longitudinal slip degree is a nondimensional longitudinal slip degree obtained by dividing a wheel slip rate by a reference rate, and the lateral slip degree is a nondimensional lateral slip degree obtained by dividing a slip angle of the wheel by a reference angle.

45. The apparatus as claimed in claim 41, wherein the input is a nondimensional input, and the input section is configured to determine the nondimensional input by dividing the ratio of the wheel force to the wheel slipping degree by a reference ratio.

46. The apparatus as claimed in claim 41, wherein the output section is configured to determine the relationship between the input and the output in accordance with the direction of the wheel force, and to determine the output from the input according to the determined relationship.

47. The apparatus as claimed in claim 41, wherein the output section is configured to determine the output from the input according to a predetermined relationship between the input and the output, and the relationship between the input and the output is expressed by a three dimensional curved surface in a three dimensional coordinate system having a first axis representing a ratio of a wheel lateral force to a wheel lateral slip degree, a second axis representing a ratio of a wheel longitudinal force to a wheel longitudinal slip degree, and a third axis representing the grip characteristic parameter.

48. The apparatus as claimed in claim 47, wherein the output section is configured to determine a two dimensional relationship from the relationship between the input and output expressed by the three dimensional curved surface, in accordance with the direction of the wheel force, and to determine the output from the input according to the two dimensional relationship.

49. The apparatus as claimed in claim 41, wherein the apparatus further comprises a vehicle behavior estimating section configured to estimate a vehicle behavior in accordance with the grip characteristic parameter.

50. The apparatus as claimed in claim 49, wherein the vehicle behavior estimating section includes a decomposing section configured to decompose the grip characteristic parameter into a lateral component in the lateral direction and a longitudinal component in the longitudinal direction, a lateral behavior estimating section configured to estimate a lateral behavior of the vehicle in the lateral direction in accordance with the lateral component, and a longitudinal behavior estimating section configured to estimate a longitudinal behavior of the vehicle in the longitudinal direction in accordance with the longitudinal component.

51. The apparatus as claimed in claim 50, wherein:
the grip characteristic parameter is a first grip characteristic parameter, and the lateral behavior estimating section is configured to estimate the lateral behavior of the vehicle in the lateral direction in accordance with (i) the lateral component of the grip characteristic parameter, and (ii) a second grip characteristic parameter, which is a grip characteristic parameter of a second wheel.

52. The apparatus as claimed in claim 50, wherein the apparatus further comprises an actuating section configured to receive a control signal from at least one of the lateral behavior estimating section and the longitudinal behavior estimating section and configured to control at least one of a vehicle lateral behavior and a vehicle longitudinal behavior.

53. The apparatus as claimed in claim 1, wherein the output section is configured to determine the grip characteristic parameter in accordance with a direction of the wheel force.

54. The apparatus as claimed in claim 1, wherein:
the input section is configured to set, (i) as the input, a first input representing a first ratio of a first wheel force acting on the vehicle wheel in the ground contact surface in a first direction, to a first wheel slipping degree of the vehicle wheel in the first direction, and (ii) a second input representing a second ratio of a second wheel force acting on the vehicle wheel in the ground contact surface in a second direction different from the first direction, to a second wheel slipping degree of the vehicle wheel in the second direction, and
the output section is configured to determine, from the first and second inputs, the output representing the grip characteristic parameter indicative of the gripping characteristic of the vehicle wheel.

55. The apparatus as claimed in claim 54, wherein the input section includes (i) a first input subsection configured to set, as the input, the first input representing the first ratio of the first wheel force to the first wheel slipping degree, and (ii) a second input subsection configured to set the second input representing the second ratio of the second wheel force to the second wheel slipping degree.

56. The apparatus as claimed in claim 54, wherein:
the first direction is a longitudinal direction,
the second direction is a lateral direction,
the first wheel force is a longitudinal force in the longitudinal direction,
the first wheel slipping degree is a longitudinal wheel slipping degree represented by a wheel slip rate,
the second wheel force is a lateral force, and
the second wheel slipping degree is a lateral wheel slipping degree represented by a wheel slip angle.

57. The apparatus as claimed in claim 54, wherein:
the output section is configured to determine, from the first and second inputs, the output representing the grip characteristic parameter indicative of the gripping characteristic of the vehicle wheel, according to a predetermined relationship among the first and second inputs and the output, and
the relationship among the first and second inputs and the output is a relationship which can be expressed by a three dimensional curved surface in a three dimensional coordinate system having a first axis representing the first ratio of the first wheel force to the first wheel slipping degree, a second axis representing the second ratio of the second wheel force to the second wheel slipping degree, and a third axis representing the grip characteristic parameter.

58. A method for estimating a gripping characteristic of a vehicle wheel of a vehicle on a ground contact surface, comprising:

an input step of setting an input representing a ratio of a wheel force acting on the vehicle wheel in the ground contact surface, to a wheel slipping degree of the vehicle wheel; and
an output step of determining, from the input, an output representing a grip characteristic parameter indicative of the gripping characteristic of the vehicle wheel,
wherein the grip characteristic parameter is a rate of change of the wheel force with respect to change in the slipping degree, and
wherein, in the output step, the grip characteristic parameter is determined without regard to a friction coefficient of the ground contact surface.

59. The method as claimed in claim 58, wherein the method further comprises a control step of controlling the vehicle in accordance with the grip characteristic parameter of the output.

60. The method as claimed in claim 58, wherein the method further comprises a step of determining a vehicle stability parameter representing a stability of the vehicle in accordance with the grip characteristic parameter of the output.

61. The method as claimed in claim 60, wherein the method further comprises a stability control step of controlling the vehicle in accordance with the vehicle stability parameter.

62. An apparatus for estimating a vehicle state, comprising:
gripping characteristic estimating means for determining an output from an input according to a predetermined relationship between the input and the output, the input being a ratio of a wheel force acting on a vehicle wheel in a ground contact surface, to a wheel slipping degree of the vehicle wheel, and the output being a grip characteristic parameter indicative of a margin to a road surface grip limit of the vehicle wheel,
wherein the grip characteristic parameter a rate of change of the wheel force with respect to change in the slipping degree, and
wherein the grip characteristic parameter is determined without e ard to a friction coefficient of the ground contact surface.

63. The apparatus as claimed in claim 62, wherein the apparatus further comprises wheel force sensing means for sensing the wheel force, and wheel slip degree sensing means for sensing the wheel slipping degree.

64. The apparatus as claimed in claim 63, wherein the apparatus further comprises friction condition estimating means for determining a parameter representing a friction condition between the vehicle wheel and the ground contact surface, in accordance with the grip characteristic parameter.

65. An apparatus for estimating a vehicle stability parameter representing a vehicle stability, comprising:
an input section configured to set an input representing a ratio of a wheel force acting on a wheel in a ground contact surface, to a wheel slipping degree of the wheel; and
an output section configured to determine, from the input, an output representing a grip characteristic parameter indicative of a gripping characteristic of the wheel,
wherein the grip characteristic parameter is a rate of change of the wheel force with respect to change in the slipping degree, and
wherein the output section is configured to determine the grip characteristic parameter without regard to a friction coefficient of the ground contact surface.

* * * * *